(12) United States Patent
Persoons

(10) Patent No.: US 7,104,186 B2
(45) Date of Patent: Sep. 12, 2006

(54) FOOD PACKAGE HOLDER

(75) Inventor: Gustaaf Persoons, Brecht (BE)

(73) Assignee: FMC Technologies, Inc., Houston, TX (US)

( * ) Notice: Subject to any disclaimer, the term of this patent is extended or adjusted under 35 U.S.C. 154(b) by 203 days.

(21) Appl. No.: 10/631,492

(22) Filed: Jul. 30, 2003

(65) Prior Publication Data
US 2004/0079669 A1    Apr. 29, 2004

Related U.S. Application Data

(60) Provisional application No. 60/402,874, filed on Aug. 9, 2002.

(51) Int. Cl.
*A47J 27/18* (2006.01)
(52) U.S. Cl. .............. 99/371; 99/369; 99/448; 100/295
(58) Field of Classification Search ........... 99/371, 99/349, 369, 443 R, 483, 448; 100/287, 100/211, 265, 266, 267, 268, 295, 296; 248/636, 248/611, 613; 206/477, 480, 483, 1.5, 499; 269/221, 222, 223
See application file for complete search history.

(56) References Cited

U.S. PATENT DOCUMENTS

| | | | |
|---|---|---|---|
| 1,334,588 A | * | 3/1920 | Bartelstone ............... 100/255 |
| 3,155,030 A | * | 11/1964 | Curtis ...................... 100/194 |
| 4,003,302 A | | 1/1977 | Mencacci et al. |
| 4,085,668 A | | 4/1978 | Mughannam |
| 4,456,142 A | * | 6/1984 | Burling ................. 220/4.28 |
| 5,381,726 A | | 1/1995 | Roumagnac et al. |
| 5,687,639 A | * | 11/1997 | Planck et al. ............ 99/369 |

FOREIGN PATENT DOCUMENTS

| | | |
|---|---|---|
| EP | 0 551 129 B1 | 7/1993 |
| FR | 2 605 226 A1 | 4/1988 |
| JP | 06 237744 A | 8/1994 |

* cited by examiner

*Primary Examiner*—Reginald L. Alexander
(74) *Attorney, Agent, or Firm*—Christensen O'Connor Johnson Kindness pllc

(57) ABSTRACT

An apparatus is provided for substantially maintaining a position of a plurality of packages (30) between a pair of trays (102 and 104) inside the drum of an agitating retort when the agitation process is applied to the packages. When the first tray (102) is stacked on the second tray (104), a volume formed between the first and second trays. Within the volume, a first positioning system (106) for holding the packages (30) in a desired position is coupled to one of the trays. The packages (30) are positioned within the volume and retained in the desired position by the first positioning system. A second positioning system (114) may be employed to hold the packages at the opposite end of the packages from the first positioning system. The second positioning system (114) may include a resilient pad that grips the adjacent portion of the packages.

64 Claims, 34 Drawing Sheets

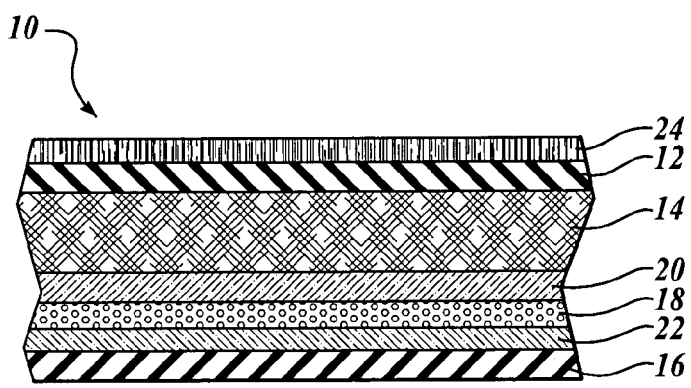
*Fig.1.*
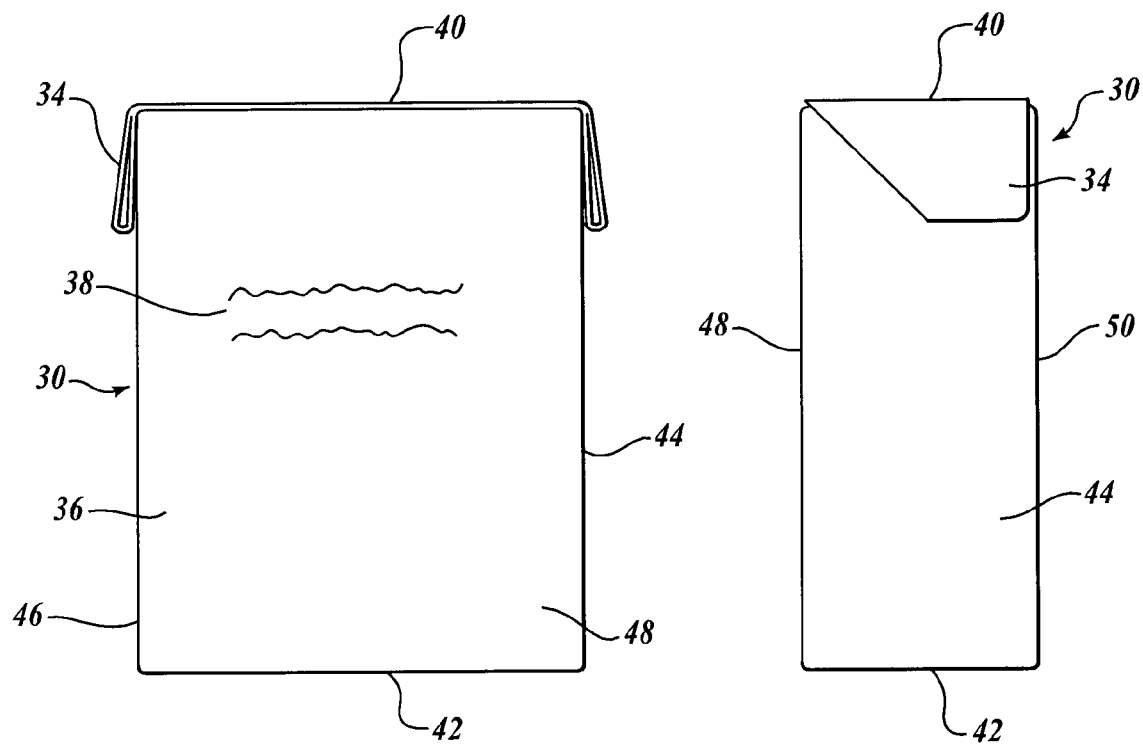
*Fig.2A.* *Fig.2B.*

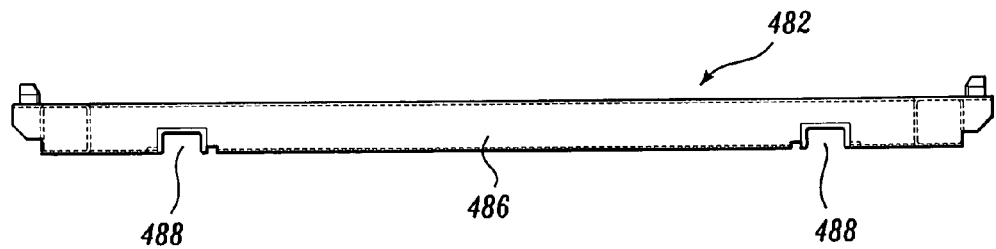
Fig.16B2.
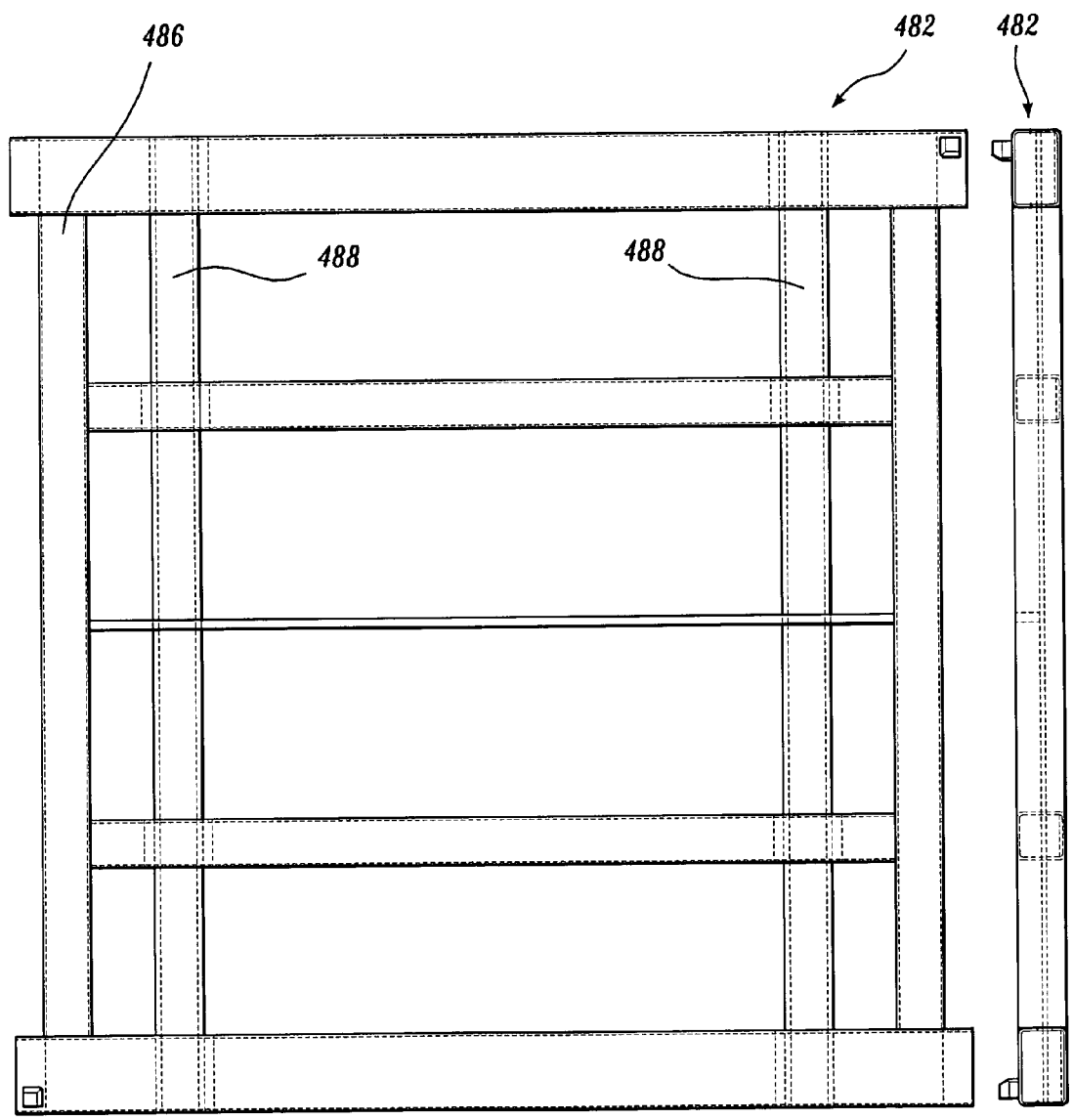
Fig.16B1.
Fig.16B3.

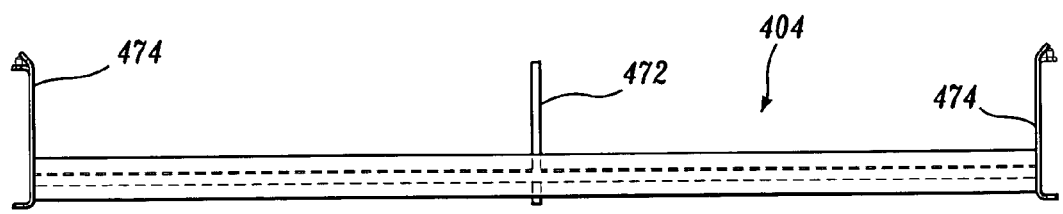
Fig.16C2.
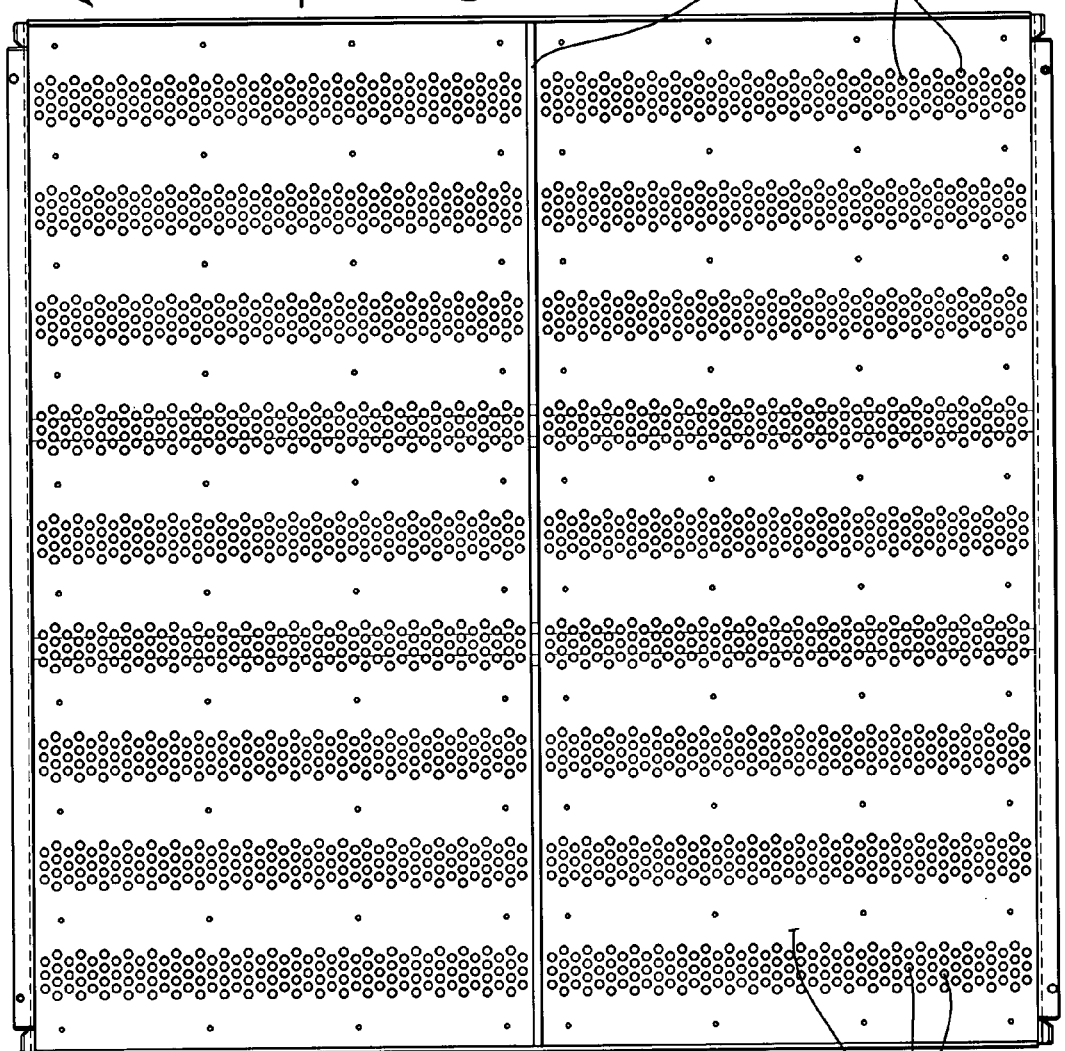
Fig.16C1.
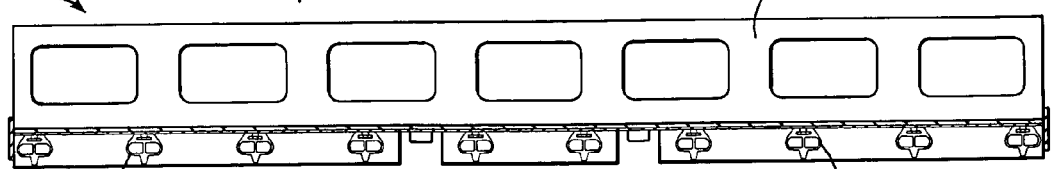
Fig.16C3.

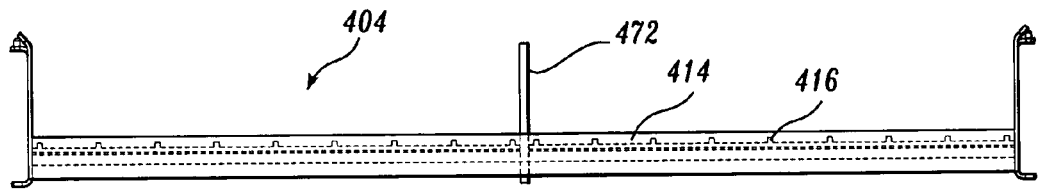
*Fig.16D2.*
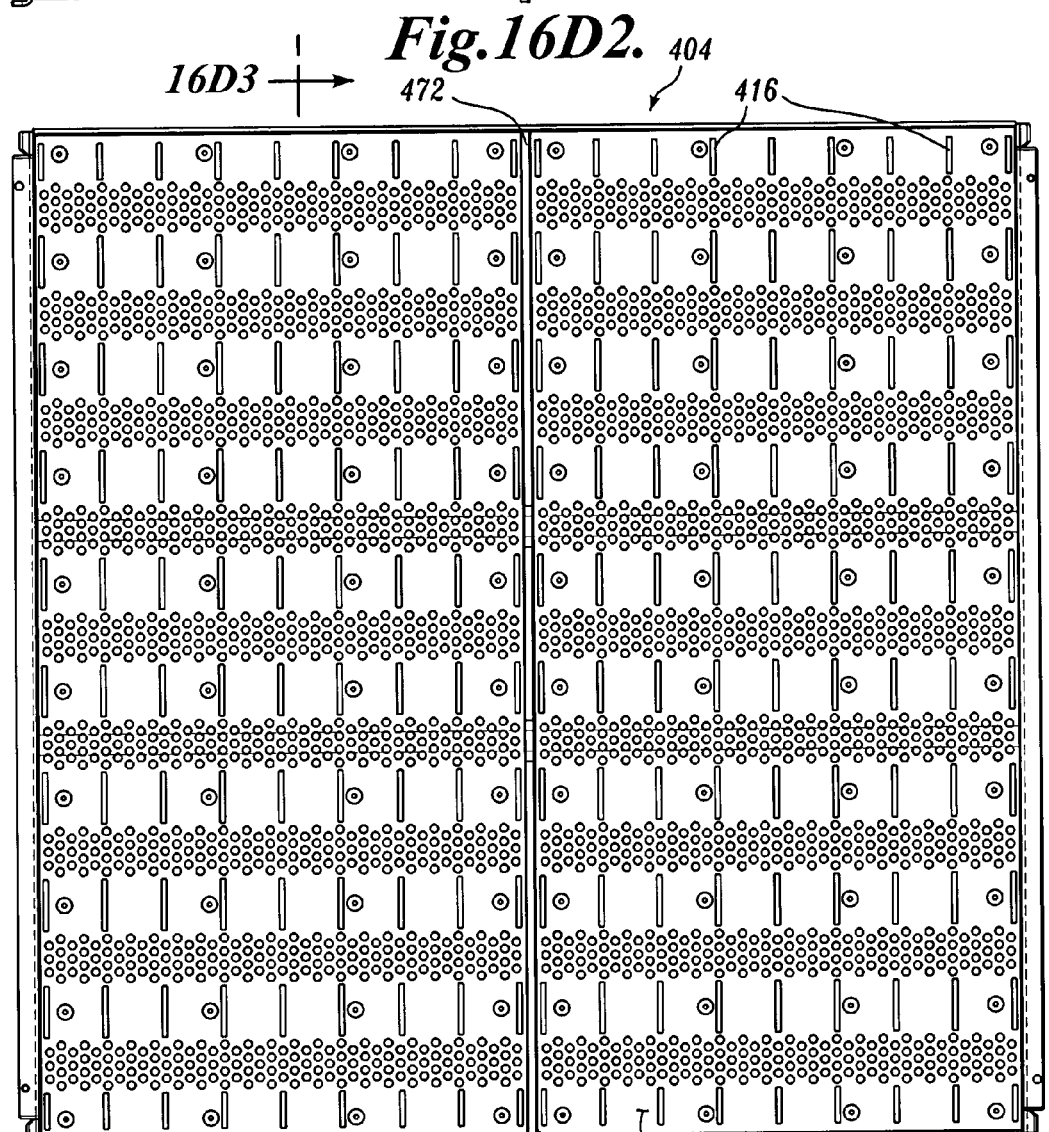
*Fig.16D1.*
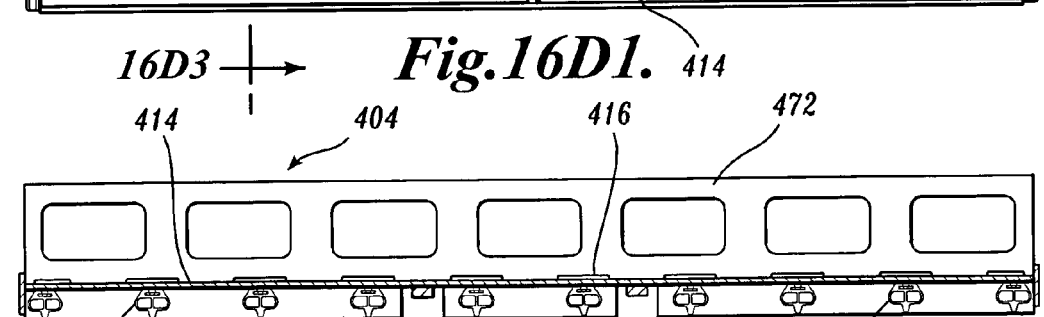
*Fig.16D3.*

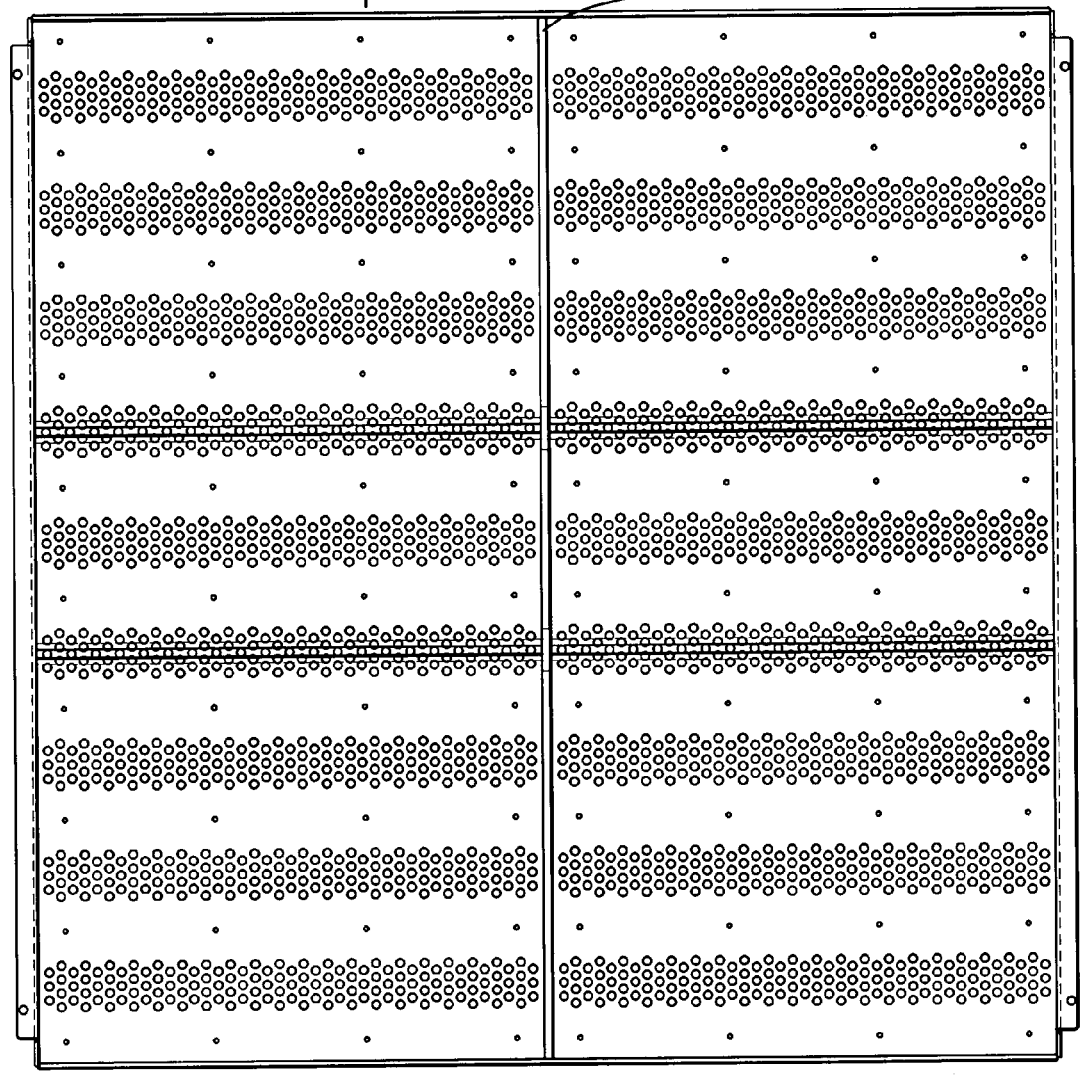
Fig.16E2.
Fig.16E1.
Fig.16E3.

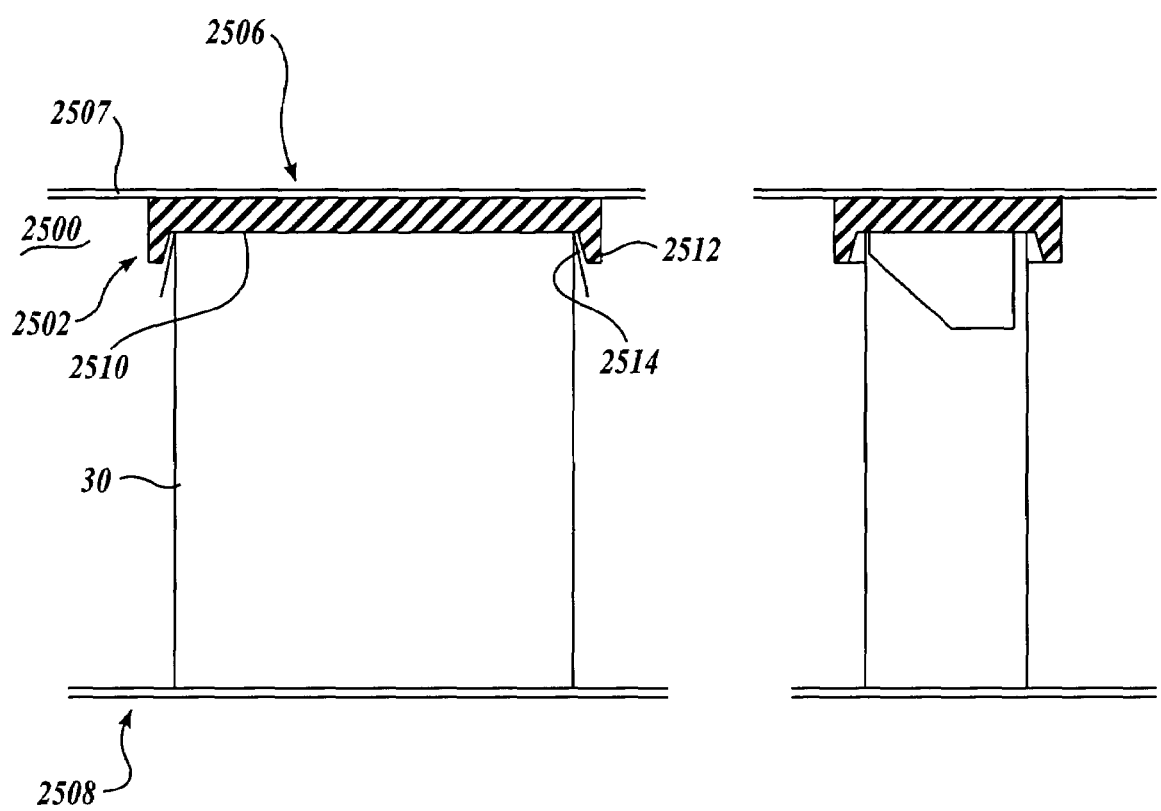
*Fig.32.*  *Fig.33.*

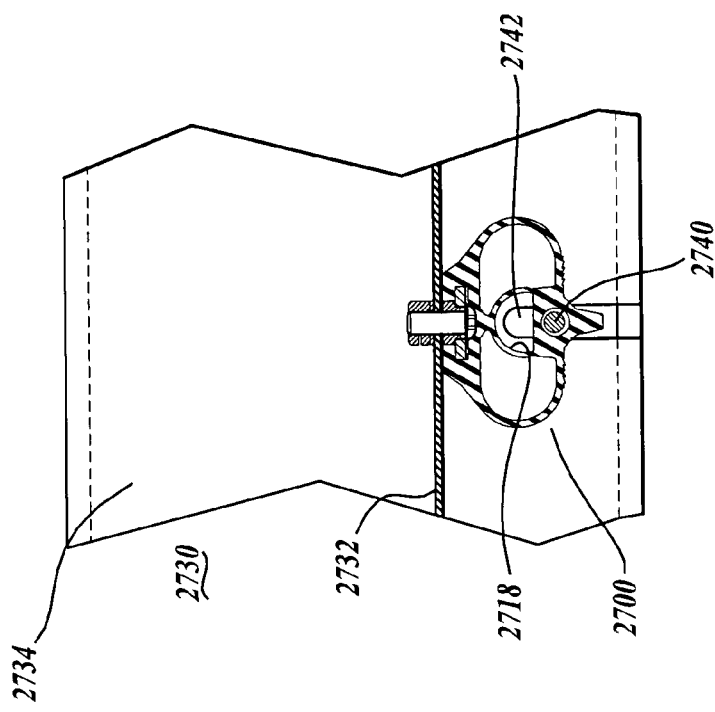
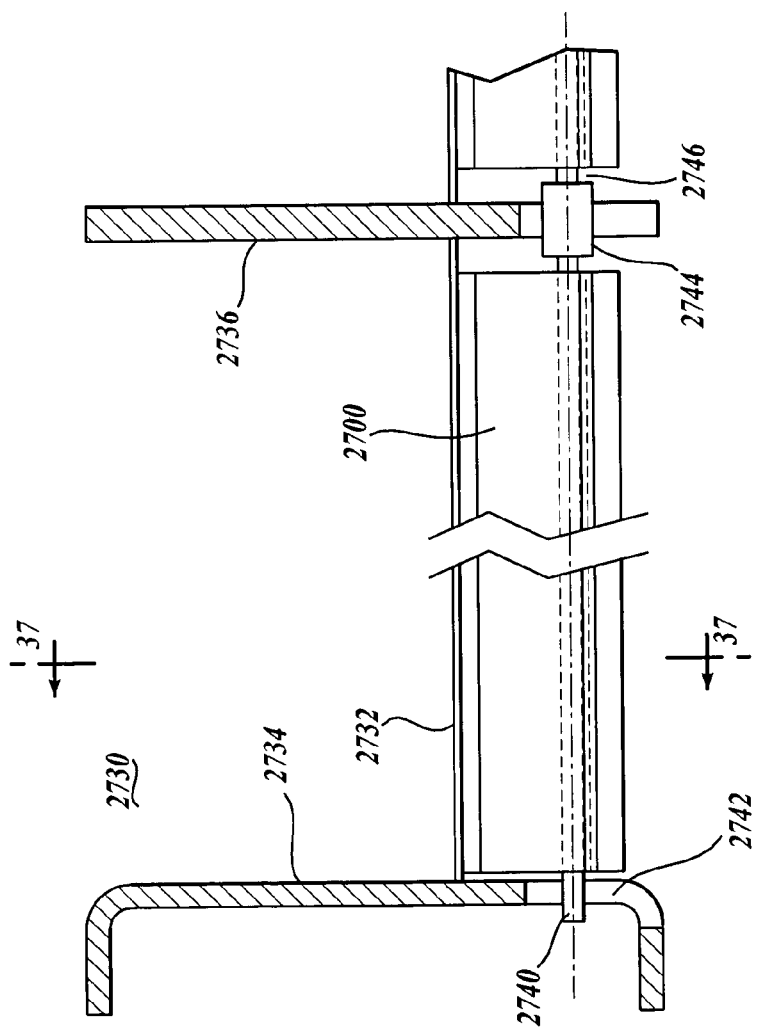

FOOD PACKAGE HOLDER

CROSS-REFERENCE TO RELATED APPLICATION

This U.S. patent application claims the benefit of U.S. Provisional Patent Application No. 60/402,874, filed Aug. 9, 2002.

FIELD OF THE INVENTION

The invention relates generally to food package holders for retaining a package in a predetermined position between a pair of trays, and more particularly to maintaining the position of the package when the package is inside the drum of an agitating retort during the agitation process.

BACKGROUND OF THE INVENTION

Recently, a new type of retortable packaging suitable for in-container sterilization of foodstuffs was introduced. Referring to FIG. 1, a cross-section of this new packaging material 10 may be seen. The packaging material 10 is a generally flat sheet material that may include at least three layers, a core layer 14 generally composed of cardboard, and two outer layers 12 and 16 each composed of a polymer material. Additionally, packaging material 10 may include a gas barrier layer 18 that may be sealed or laminated to the core layer 14 by a layer of sealing agent 20. In one embodiment, a layer of binder or adhesive 22 may be used to bond the outer layer 16 to the gas barrier 18. In some embodiments, the outer layers 12 and 16 are formed from liquid-tight polymer coatings. Ink or printing 24 may be applied to the outside of the outer layers 16 or 12. Optionally, an additional protective layer (not shown) may be applied over the printing 24 to protect it. Packaging material 10 may include packaging materials generally similar to those disclosed in the following published PCT applications filed by TETRA LAVAL HOLDINGS & FINANCE S A, the disclosures of which are incorporated herein by reference: WO 97/02140 (PACKAGING LAMINATES BASED ON CARDBOARD AND PAPER); WO 02/22462 (A PACKAGING LAMINATE FOR A RETORTABLE PACKAGING CARTON); and WO 02/28637 (A PACKAGING LAMINATE FOR A RETORTABLE PACKAGING CONTAINER).

Packaging material 10 may be formed into packages by folding or creasing it into a desired shape. A sealing process may then be used to seal the edges or flaps together. In this manner, containers and/or packages may be formed in a variety of shapes and sizes.

As mentioned above, one of the exterior layers 12 or 16 of packaging material 10 may be suitable for printing 24. Information printed on packaging material 10 may include product related text such as the contents of the package, the brand name of the manufacturer, nutritional information, and/or instructions for use. Printed information may also include aesthetic and trade dress designs.

Packages formed from packaging material 10 may be considered "fragile" relative to packages formed from other materials such as metal or glass. Consequently, when handling, including clamping, and processing "fragile" packages constructed from packaging material 10 the strength and rigidity limitations of these packages must be taken into consideration. Generally, packages formed from packaging material 10 have a degree of rigidity that is satisfactory for some types of handling and transportation at ambient temperatures. However, in the case of in-package sterilization, the package may be exposed to temperatures of about 110–130° Celsius (240–266° F.). At sterilization temperatures, the mechanical characteristics of a package formed from packaging material 10 or similar packaging materials may change. Specifically, the package may experience decreased strength and/or increased pliability making handling the packages more difficult. Damage to a package may include dents, abrasion, deformation of the package, or any other undesirable change in the appearance of the package.

If the packages are exposed to water or steam during processing, the cut edges of the packaging material 10 may absorb moisture. Specifically, the porous fiber layer of the inner core layer 14 may be prone to absorbing moisture. The absorption of moisture by packaging material 10 may cause the layers to delaminate or become separated. Further, the packaging material may lose a degree of rigidity and strength if too much moisture is absorbed along its cut edges.

Because some products must be agitated in-package during processing, commercial retort apparatuses have been developed for this purpose. During agitation, packages must be held firmly to avoid scuffing and/or scratching of the printed information. However, the packages should not be held so firmly that they are damaged by the holding mechanism. Packages that have undergone sterilization or will undergo sterilization in conjunction with agitation may be more difficult to handle because their mechanical characteristics may become altered by the heat of the sterilization process.

Because containers formed from packaging material 10 and other packaging materials with similar properties may be unable to withstand the normal clamping load of stacking the packages atop one another to form a complete stack in an agitating retort, the packages may be arranged on independent trays. The independent trays are then arranged vertically on a carrier pallet. After the carrier pallet, including a stack of trays with packages placed between each adjacent pair of trays, is positioned within the retort drum, an upper clamping plate is lowered and clamped atop the stack. The carrier pallet may then be raised to clamp the stack firmly against the upper clamping plate. The trays may include upwardly extending side slats so that when the trays are stacked, the upwardly extending slats of the lower tray engage the upper tray. Between the upper and lower tray a volume is created into which the packages may be positioned. In this manner, the trays absorb the clamping load. Trays for use inside the drum of an agitating retort are well known in the art and do not require a detailed description.

While the trays may absorb a portion of the clamping load, the individual packages placed between the trays may move or shift relative to the trays during agitation within the drum of an agitating retort. Moving or shifting may result in damage to the packages including scuffing and scratching of the outer surface of the packages. Additionally, if the shifting of the packages is large enough, they may contact one another. If during rotation, the trays are angled causing the packages to shift toward one edge of the trays, the packages may bear against one another. If a sufficient amount of force is exerted on a particular package, it may become damaged or collapse. Particularly, if trays are rotated approximately 90° from horizontal, the packages may shift toward the lower edge of the tray and stack vertically upon one another. In this manner, the packages on the bottom of the stack may be exposed to the most force from the other packages in the stack making the bottom packages vulnerable to damage. Further, if shifting causes the packages to clump together, poor heat transfer to each package within the clump may result during sterilization. Therefore, a need exists for a package holder that is capable of retaining packages in a desired position during agitation in an agitating retort without damaging the packages. Particularly, a need exists for an apparatus capable of holding packages made from the new packaging material 10 and packaging materials with similar mechanical characteristics during processing (such as agitation within an agitating retort) and handling.

In addition to dimensional variation among the packages themselves, the trays may also contain variations in shape and size. Particularly, the trays may include manufacturing inaccuracies or other distortions due to repetitive use and/or handling. Some of this variation may result in trays of varying sizes or trays with an irregular package receiving surface. The package receiving surface is the portion of the tray that will receive at least one package for processing such as agitation and/or sterilization. Therefore, a need exists for a means of holding the packages in a desired position that is capable of coping with both the variation in the package dimension and the variation present in the trays. Similarly, a need exists for a device that provides a large deflection capability with minimal change in force applied to the package.

SUMMARY OF THE INVENTION

An apparatus is provided for substantially maintaining the position of a plurality of packages between a pair of trays inside the drum of an agitating retort when the agitation process is applied to the packages. The apparatus includes a first positioning means disposed on one of the trays for holding the packages in a desired position. In one embodiment, the first positioning means may include a spring or resilient member. In another embodiment, the first positioning means may include a bellows member. In yet another embodiment, the first positioning means may include corrugated or contoured pad. Additionally, the first positioning means may include a linear positioning member that is placed between two neighboring packages. The linear positioning member may include longitudinal chambers that are at least partially collapsible when force is applied to the linear positioning member. The linear positioning member may also include a lip or divider that may extend between two neighboring packages to assist in retaining the packages in a desired location and aid in preventing contact between the packages. Further, the divider projection may offer some support to the faces of the package. Supporting the faces of the package may limit the flexing or deflection of the package faces due to the shifting of the contents of the package during agitation.

When the trays are stacked, a volume is formed between the trays into which the packages may be positioned. The packages may be located between the first positioning means and one of the trays. In this manner, the first positioning means substantially retains the packages in a predetermined position relative to the pair of trays.

In alternate embodiments, the first positioning means includes a rigid pad that is disposed between the package and the tray. At least one resilient member may be disposed between the rigid pad and the tray. In some embodiments, an optional resilient member is located on the opposite side of the rigid pad from the first resilient member.

In some embodiments, the apparatus includes a second positioning means disposed between the other tray and the packages. The second positioning means may include any of the structures included in the first positioning means. In another embodiment, the second positioning means may include a flexible pad. In yet another embodiment, the flexible pad may include divider projections that assist in retaining the packages in a desired position. In this manner, the packages are substantially retained in a predetermined position relative to the pair of trays by the first and second positioning means.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is an illustration of a retortable packaging material substantially composed of paperboard;

FIGS. 2A–B are non-limiting illustrations of one embodiment of a package configuration constructed from the material depicted in FIG. 1;

FIG. 16B1 depicts a top view of an embodiment of a carrier pallet suitable to stack trays upon and be received inside an agitating retort drum depicted in FIG. 16A;

FIG. 16B2 depicts a front view of the carrier pallet depicted in FIG. 16B 1;

FIG. 16B3 depicts a side view of the carrier pallet depicted in FIGS. 16B1 and 16B2;

FIG. 16C1 depicts a top view of an embodiment of a tray suitable to be stacked on the carrier pallet of FIGS. 16B1–16B3 and received inside the agitating retort drum depicted in FIG. 16A;

FIG. 16C2 is a side elevational view of FIG. 16C1;

FIG. 16C3 is a cross-sectional view of FIG. 16C2 taken substantially along lines 16C3—16C3 thereof;

FIG. 16D1 depicts a top view of another embodiment of a tray suitable to be stacked on the carrier pallet of FIGS. 16B1–16B3, and received inside the agitating retort drum depicted in FIG. 16A;

FIG. 16D2 is an elevational view of FIG. 16D1;

FIG. 16D3 is a cross-sectional view of FIG. 16D1 taken substantially along lines 16D3—16D3 thereof;

FIG. 16E1 is a top view of an embodiment of a top tray suitable to be stacked on trays 16C1, 16D1 or trays of similar construction;

FIG. 16E2 is a side elevational view of FIG. 16E1;

FIG. 16E3 is a cross-sectional view of FIG. 16E1 taken substantially along lines 16E3—16E3 thereof;

FIG. 32 is a fragmentary elevational view of a further tray and holder constructed in accordance with the present invention;

FIG. 33 is a fragmentary view taken from the side of FIG. 32;

FIG. 36 is a side elevational view of a tray constructed in accordance with the present invention utilizing the linear positioning member of FIG. 35; and FIG. 37 is a cross-sectional view of FIG. 36 taken substantially along the lines 37—37 thereof.

DETAILED DESCRIPTION OF THE PREFERRED EMBODIMENT

Figure 3A:
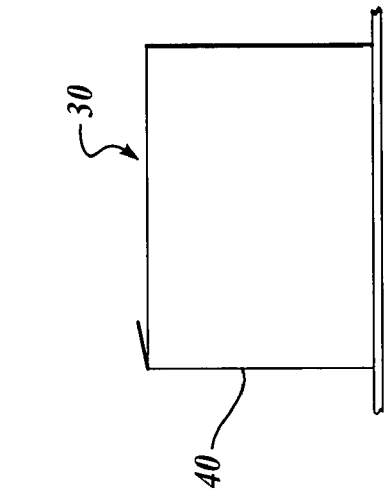
FIGS. 3A–F are illustrations of various unique orientations of the package of FIGS. 2A–B on a surface.
Figure 3B:
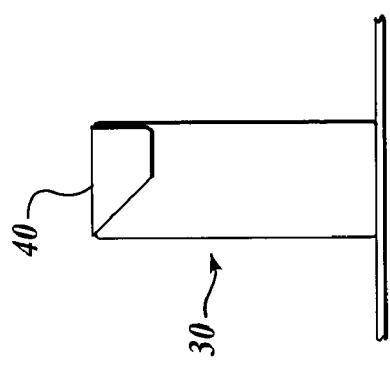
Figure 3C:
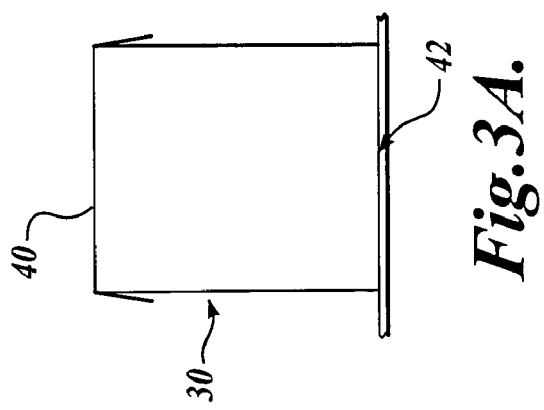
Figure 3D:
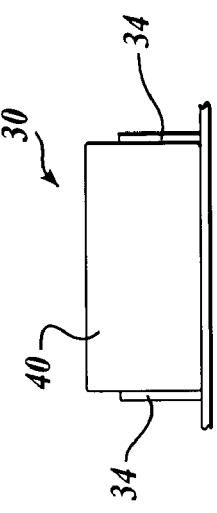
Figure 3E:
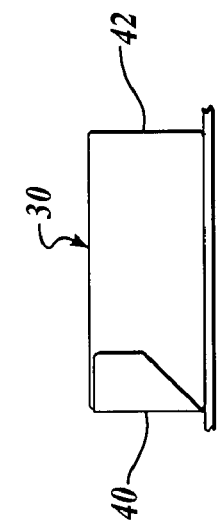
Figure 3F:
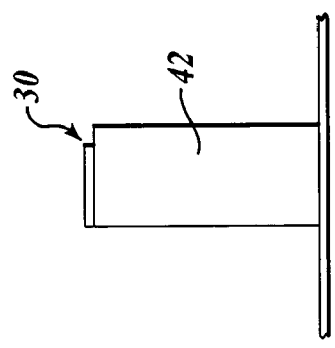

The present invention provides a package holder or package clamping mechanism for retaining the position of a plurality of packages between a pair of trays inside the drum of an agitating retort. Using the present invention, the packages are generally retained in their desired position when the agitation process is applied to the plurality of packages.

Referring to FIGS. 2A and 2B, an exemplary package 30 formed from packaging material 10 may be viewed. While packaging material 10 is discussed in detail herein, it is generally understood by those of ordinary skill in the art that packaging materials with properties similar to those of packaging material 10 may include similar mechanical characteristics. Therefore, packages made from other packaging materials that require similar clamping loads but have limited strength and rigidity, particularly at sterilization temperatures, may utilized the present invention. In other words, packages made from materials other than packaging material 10 may be considered "fragile" and may utilize the present invention. Further, any package including printing along its outer surface may utilize the present invention to avoid scratching or scuffing the outer surface of the package. These packages may be constructed from stronger, more resilient materials such as glass and metal. Particularly, the processing of lithographed drink cans may benefit from the present invention.

Because package 30 may be formed by folding, the dimensions of each package 30 may vary by more than 1 mm. The presence of flaps 34 may also cause the outer dimensions of the package 30 to vary. While packages of various sizes and shapes may be produced from packaging material 10 and similar packaging materials with comparable strength and heat resistant properties, package 30 is provided for illustrative purposes. Those of ordinary skill in the art will appreciate that alternate package shapes may also be appropriate for use with the present invention. Exemplary package 30 includes an outer surface 36 upon which printed information 38 is provided. While printed information 38 is depicted on the front 48 in FIG. 2A, it is apparent to those of ordinary skill in the art that printing 38 may appear along any face of package 30. The package 30 may be generally rectilinear in shape and may have a top 40, bottom 42, right side 44, left side 46, front 48 and back 50. Alternatively, package 30 may have a generally cylindrical or prismatic shape with substantially flat faces at opposite ends of the package. Regardless of the shape of package 30, any of the faces of package 30 may include printing. Generally speaking, the contents of package 30 may include foodstuffs that require both sterilization and agitation such as many types of liquid to semi-liquid foodstuffs including many types of ready-meals and pet food.

Referring to FIGS. 3A–3F, the various orientations of the package upon a tray may be viewed. Generally speaking, the particular orientation of the package 30 chosen does not matter. However, the number of packages that may be placed between a pair of trays and the number of package clamping apparatuses required to hold the packages may vary with the orientation of the packages between the trays. Further, the effects of the shifting of the contents in the package during agitation may vary depending upon the orientation chosen.

Figure 4A:
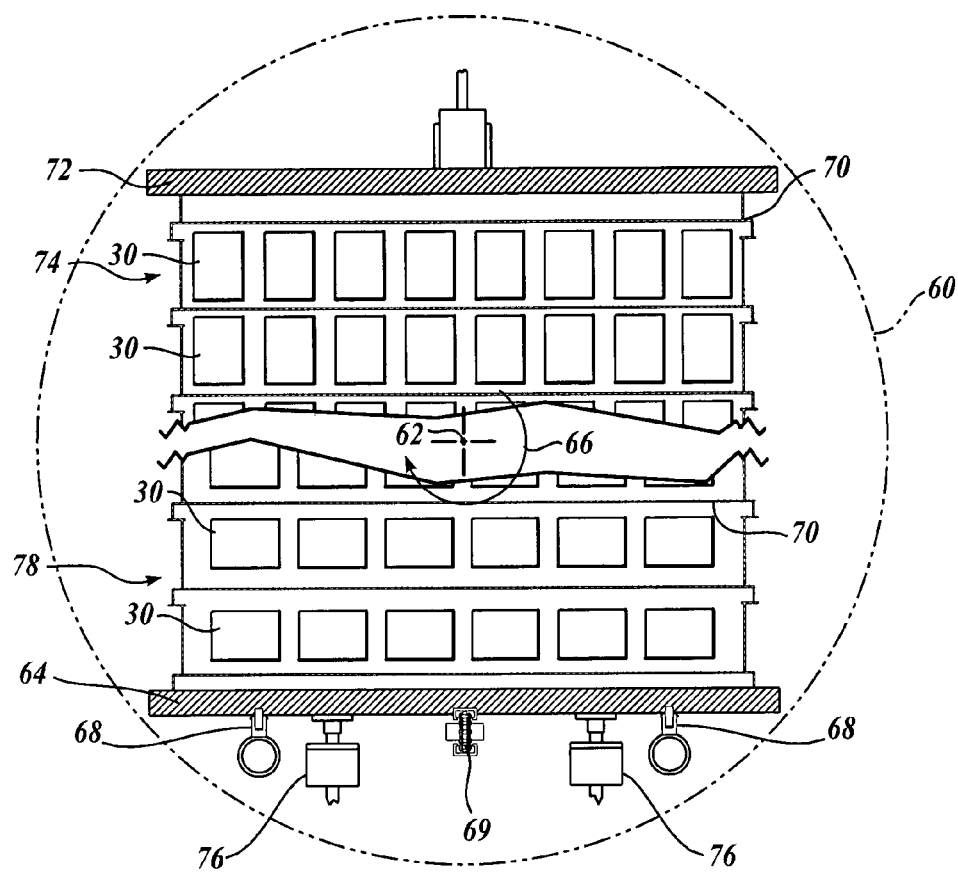
FIG. 4A depicts a front cross-sectional view of the inside of an agitating retort drum known in the art.
Figure 4B:
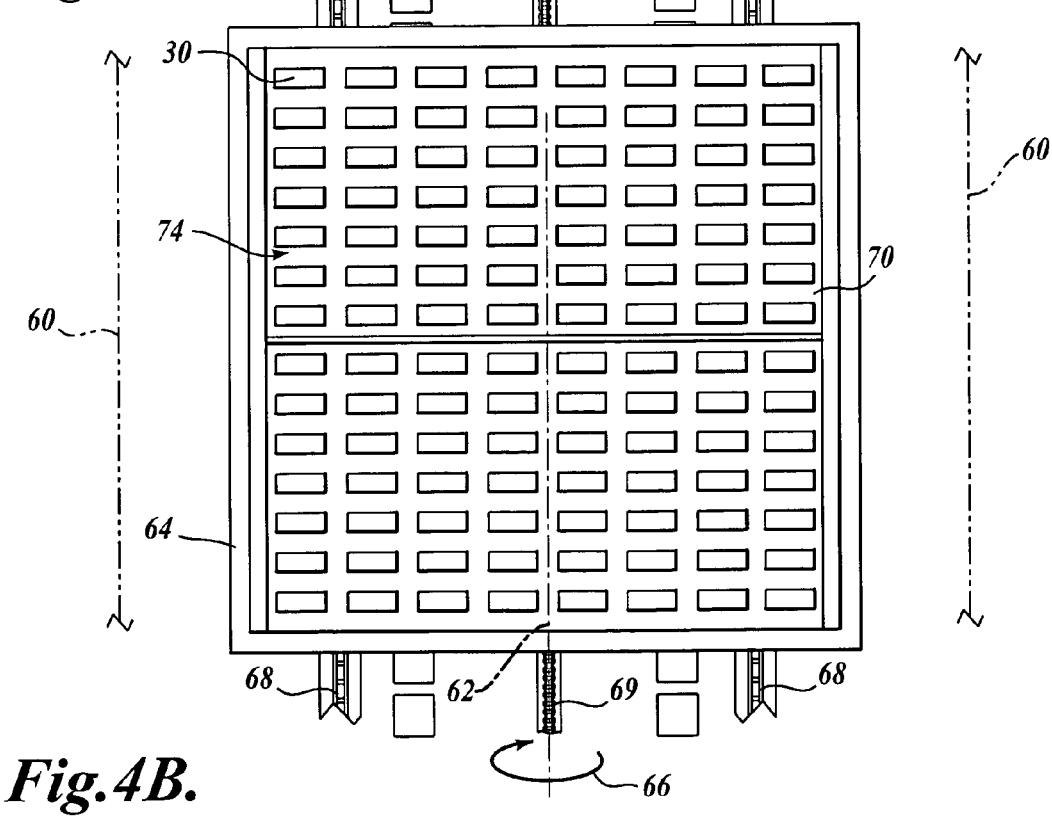
FIG. 4B depicts a top cross-sectional view of a stack of trays inside the agitating retort drum depicted in FIG. 4A.

Referring to FIGS. 4A and 4B, packages 30 arranged on trays 70 within a typical retort drum 60 may be viewed. While retort drum 60 is described in some detail, retort drum 60 is provided to illustrate a non-limiting example of a typical retort drum. It is apparent to those of ordinary skill in the art that alternate embodiments of agitating retorts and retort drums may incorporate the present invention and are therefore within the scope of the present invention. FIG. 4A depicts a cross-sectional view from the front of the retort drum 60.

As discussed in the Background, the trays 70 are stacked on carrier pallet 64. Then, the carrier pallet 64 is moved on wheels 68 by a central drive chain 69 until the stack is in the desired location within the retort drum 60. Next, a clamping plate 72 is lowered until it rests on top of the stack and mechanically locks itself. Then, the carrier pallet 64 is lifted by the lift cylinders 76 and the stack is compressed against the locked clamping plate 72. At this point, the stack is suitably clamped to initiate the agitation process.

Region 74 illustrates packages 30 arranged in the general orientation depicted in FIG. 3A between trays 70. Region 78 depicts packages 30 arranged in the general orientation depicted in FIG. 3C between trays 70. As can be seen in FIG. 4A, it may be desirable to arrange the packages in the same orientation between a particular pair of trays 70. However, this is not necessarily required. The retort drum 60 rotates the packages 30 about center point 62 in the direction of arrow 66. As the retort drum 60 rotates, the contents of packages 30 are agitated.

Referring to FIG. 4B, a cross-sectional view is shown of the stack inside retort drum 60. Both the clamping plate 72 and the top tray have been removed so that a tray shown supporting a plurality of packages 30 may be viewed. Packages 30 in this view are depicted positioned on tray 70. As can be seen in FIG. 4B, it may be desirable to arrange packages 30 into horizontal rows across the package receiving surfaces of trays 70. Further, it may be beneficial to arrange the packages 30 within the parallel rows so that the packages form a second set of parallel rows that are orthogonal to the first set of parallel rows. In this manner, the packages are arranged in a two-dimensional grid-like pattern. The retort drum 60 rotates about axis 62 in the general direction of arrow 66. However, it is apparent to one of ordinary skill in the art that the drum may rotate about axis 62 in the opposite direction to that indicated by arrow 66.

While rotational retort apparatuses have been discussed above, it is apparent to those of ordinary skill in the art that additional agitation processes may also utilize the present invention. These agitation processes may include apparatuses that shake and/or rock the packages 30, as well as apparatuses that combine shaking and/or rocking with rotational agitation.

During agitation, the packages 30 positioned between trays 70 may shift in position. As discussed above, this shifting may result in damage to the packages 30 and/or the printing 38 on the packages 30. Therefore, it is desirable to use a package holding mechanism to retain the packages substantially stationary in a desired position.

Figure 5:
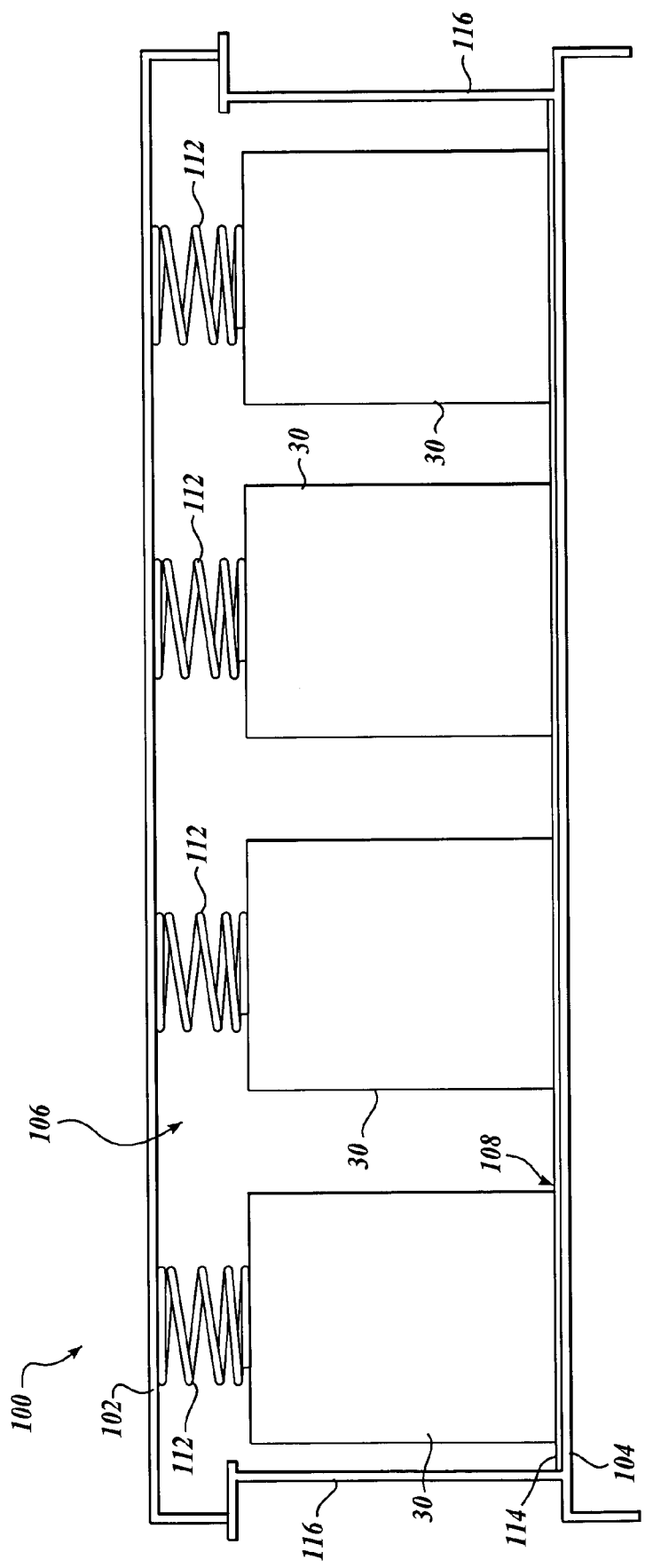
FIG. 5 depicts an embodiment of a package holder constructed in accordance with the present invention.

Referring to FIG. 5, a first embodiment of an apparatus 100 for substantially retaining the packages in a desired positions is provided. Package 30 is positioned between upper tray 102 and lower tray 104. A first positioning assembly 106 is disposed between upper tray 102 and package 30. Optionally, a second positioning assembly 108 may be disposed between lower tray 104 and package 30. First positioning assembly 106 may include at least one resilient member or compression spring 112 disposed between upper tray 102 and one or more faces of each package 30. In one embodiment, spring 112 may be coupled to the surface of tray 102 in any manner known in the art including adhesives, screws, rivets, bolts, and clips.

Spring 112 may exert force on a portion of a face of package 30 biasing package 30 against lower tray 104. In this manner, the force exerted by spring 112 resists movement of package 30 during agitation. While the springs 112 depicted in FIG. 5 are positioned approximately near the center of one of the faces of package 30, it is apparent to those of ordinary skill in the art that the spring 112 may be positioned closer to the edge of the face in any direction. Further, additional springs may be disposed between upper tray 102 and one or more faces of package 30.

Spring 112 may be any suitable spring known in the art such as coil springs. Spring 112 may be formed from any suitable material known in the spring mechanism art including metals, such as steel and copper, and plastics and rubber or other type of elastomer. Spring 112 may have a generally circular or ovoid cross-sectional shape or other suitable cross-sectional shape. The size of spring 112 may be determined based upon the size and weight of packages 30 and their contents.

The second positioning assembly 108 may include one or more springs placed between package 30 and lower tray 104. In another embodiment, the second positioning assembly 108 may include a flexible pad 114. Flexible pad 114 may exert an opposing force to the force of spring 112. In this manner, package 30 may be clamped between the first positioning assembly 106 and the second positioning assembly 108. Flexible pad 114 may yield to the force exerted by spring 112 and receive package 30 into a depression formed by the force of the spring on package 30 that is translated by the package 30 to the flexible pad 114. In this manner, the edges of the depression may help to maintain the package in the desired position. In some embodiments, the flexible pad may prevent lower tray 104 from scratching or scuffing package 30. In some embodiments, flexible pad 114 includes perforations therein. Flexible pad 114 may be constructed from a suitable flexible sheet material such as silicone rubber, silicone foam-rubber, EPDM, polypropylene or any elastic material that can withstand a steam, steam-air, or steam-air-water environment at temperatures up to approximately 130° C. The flexible pad 114 of the second positioning mechanism 108 may be coupled to the surface of tray 104 in any manner known in the art including adhesives, screws, rivets, bolts, and clips. Alternately, the flexible pad 114 may be held in position by side slats 116 included on lower tray 104.

Figure 6:
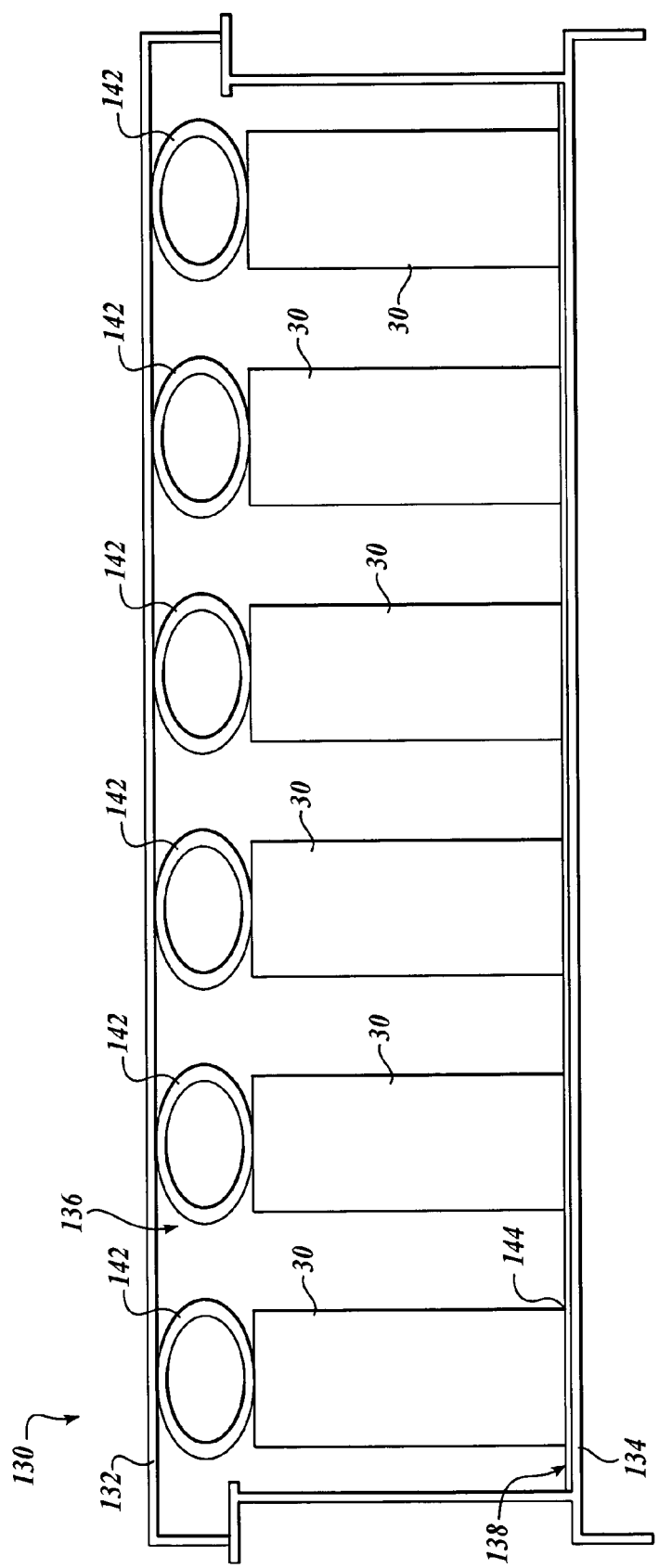
FIG. 6 depicts an embodiment of a package holder constructed in accordance with the present invention.

Referring to FIG. 6, a second embodiment may be viewed. While the package included with this embodiment is depicted in a different orientation from the package depicted in FIG. 5, it is apparent to those of ordinary skill in the art that any orientation of the package may be used with any of the embodiments depicted herein. The particular orientation depicted with a particular embodiment is merely illustrative and in no way limiting. The package holder 130, depicted in FIG. 6, is disposed between upper tray 132 and lower tray 134. The optional second positioning assembly 138 may include a pad 144 similar to pad 114 of the previous embodiment. However, the first positioning mechanism 136 of this embodiment includes a resilient member formed in a flexible shape 142. In one embodiment, flexible shape 142 may be coupled to the surface of tray 132 in any manner known in the art including adhesives, screws, bolts, rivets, and clips.

Flexible shape 142 may include voids into which portions of the flexible shape 142 may be compressed. The flexible shape may be substantially bulbous or hollow so that wall defining the flexible shape 142 may deform when a load is applied. Alternately, flexible shape 142 may be formed from a solid piece of compressible material such as a sponge-like or foam rubber-like material including many small voids. Compression of the flexible shape 142 exerts a force on package 30 that biases the package 30 against the lower tray 134. While a single flexible shape 142 is positioned between package 30 and upper tray 132 in FIG. 6, it is apparent to those of ordinary skill that more than one flexible shape 142 may be disposed between upper tray 132 and package 30. Further, while flexible shape 142 is depicted as having a generally circular or ovoid cross-sectional shape, it is apparent to those of ordinary skill in the art that many cross-sectional shapes may be used including square, rectangular, octagonal, triangular, or arbitrary. Preferably, flexible shape 142 is formed from semi-rigid flexible material such as silicone rubber, EPDM, polypropylene, or any elastic material (for example, perfluorinated elastomers or fluorinated copolymers) that can withstand a steam, steam-air, or steam-air-water environment at temperatures up to approximately 130° C.

Flexible shape 142 may be of a sufficient length to extend across more than one row of packages 30. In this manner, a single flexible shape 142 may hold more than one package in a desired position. In one embodiment, the flexible shape is a generally annular member that may be generally rectilinear or cylindrical in shape. The length of the flexible shape 142 may be determined by the number of rows spanned or the size of the drum of the agitating retort. The size of flexible shape 142 may be determined based on the size and weight of the packages 30 and their contents.

Figure 7:
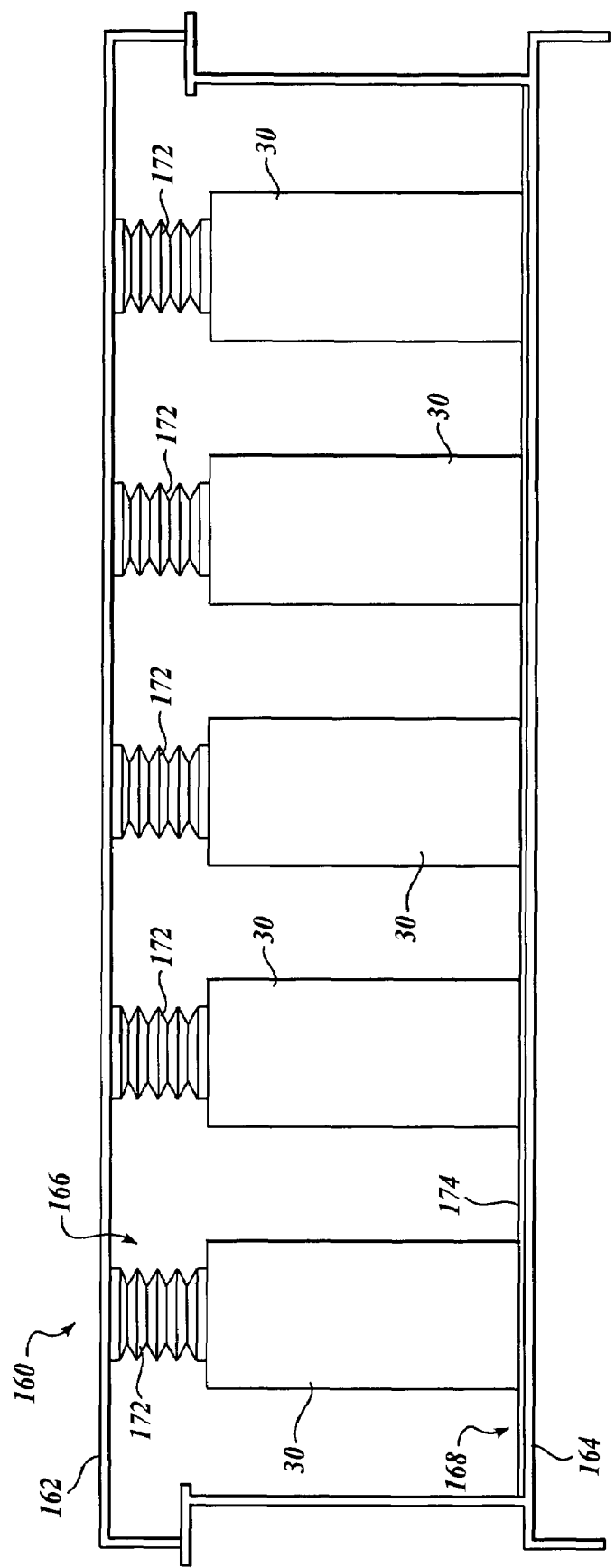
FIG. 7 depicts an embodiment of a package holder constructed in accordance with the present invention.

Referring to FIG. 7, a third embodiment of the present invention is depicted. Package holding or retaining mechanism 160 includes an optional second positioning mechanism 168 and a first positioning mechanism 166 disposed between upper tray 162 and lower tray 164. Optional second positioning mechanism 168 may be similar to the second positioning mechanism 108 depicted in FIG. 5 and may include a flexible pad 174. First positioning mechanism 166 may include a compressible bellows member 172. Bellows member 172 is disposed between upper tray 162 and package 30. Bellows member 172 may include any bellows known in the art including plastic or metal formed into an accordion-type compressible bellows. In one embodiment, bellows member 172 may be coupled to the surface of the upper tray 162 in any manner known in the art including adhesives, screws, bolts, rivets, and clips. In a manner similar to the flexible shape 142 (shown in FIG. 6), the bellows member 172 may extend beyond one row of packages to hold packages in other rows. Likewise, the bellows member 172 may be of approximately the same size as the flexible member 142.

Bellows member 172 exerts force on package 30 that biases it against the lower tray 164, clamping package 30 between upper tray 162 and lower tray. Bellows member 172 also resists the movement of package 30 during the agitation process. If bellows member 172 extends beyond the edge of the face of package 30, forces exerted upon the bellows member may cause it to compress forming a depression in the bellows member. The edges of the depression formed in the bellows member 172 may help retain the package 30 in its desired position.

Alternatively, bellows member 172 may be an inflatable member including any inflatable bag or inflatable bellows known in the art. In one embodiment, the inflatable member may include a valve, not shown, that may be used to communicate with the interior of the inflatable member. Such a value may allow the inflatable member to be inflated and deflated. In this manner, the level of inflation of the inflatable member could be adjusted based on the rotational position of the packages. Such an adjustment could be effected automatically by the retort apparatus.

Figure 8A:
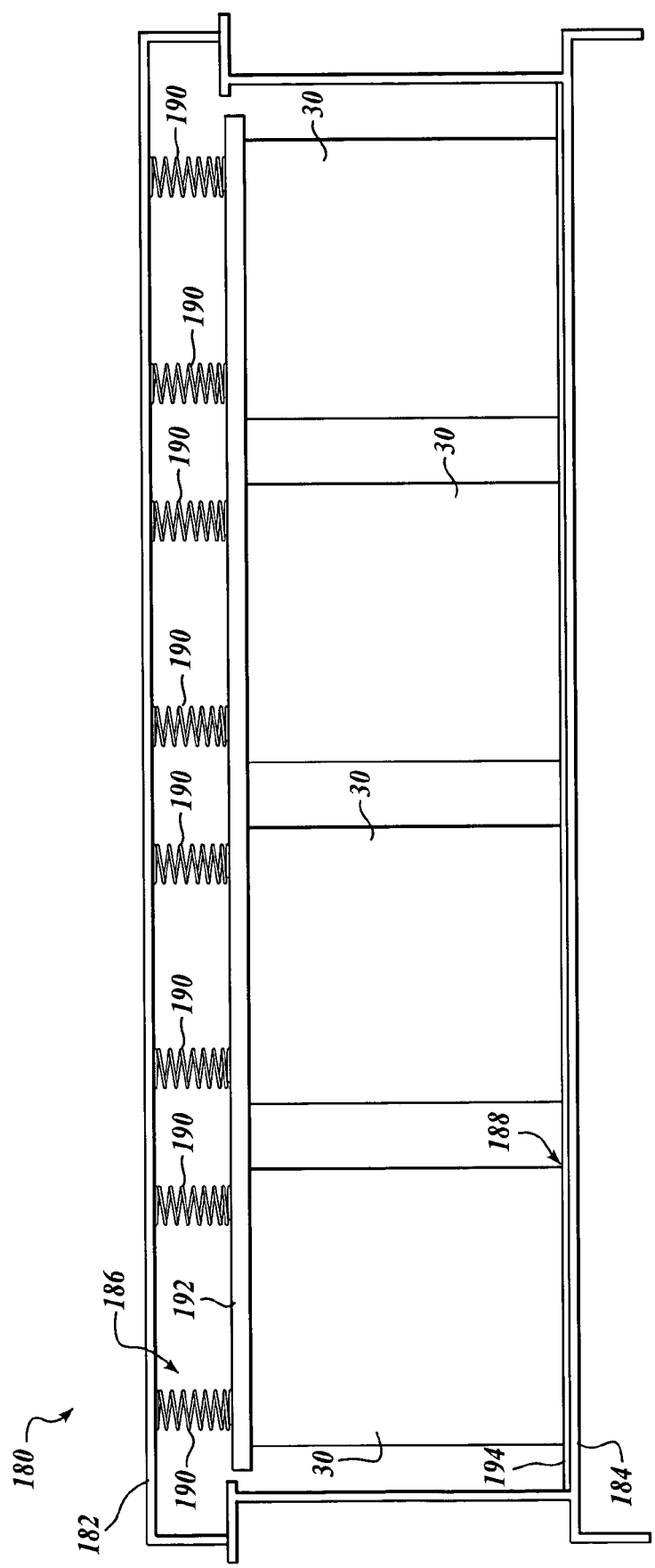
FIG. 8A depicts an embodiment of a package holder constructed in accordance with the present invention.

Referring to FIG. 8A, a fourth embodiment of the present invention is depicted. Package holding apparatus 180 includes an optional second positioning mechanism 188 in the form of pad 194 disposed on the lower tray 184 similar to the optional second positioning mechanism 108 depicted in FIG. 5. The first positioning mechanism 186 generally includes a pad 192 bearing against package 30 and at least one spring or resilient member 190 disposed between the upper tray 182 and pad 192. Resilient member 190 may be generally similar to spring 112 of FIG. 5. Pad 192 may be generally similar to pad 114 of FIG. 5. Alternatively, pad 192 may be rigid. In an embodiment with a rigid pad 192, the pad may be constructed from metal, hard plastic, or other suitable rigid materials. The package 30 is retained in a desired position by resilient member 190 exerting a force against pad 192 that is translated generally evenly against the adjacent face of package 30 biasing the package against either of the pad 194 or the lower tray 184. Like the embodiment depicted in FIG. 5, at least one resilient member 190 may be coupled to the surface of the upper tray 182 in any manner suitable for coupling spring 112 to upper tray 102.

This arrangement of the resilient members 190 and pad 192 allows the first positioning mechanism 186 to be constructed as a subassembly without regard to the position of individual packages. Because the resilient members 190 do not contact the packages 30 directly, the resilient members 190 need not be located adjacent to the packages. Instead, resilient members may be located anywhere between the upper tray 182 and the pad 192. Pad 192 will transfer the biasing forces of the resilient members 190 to the packages 30. While FIG. 8A depicts resilient members 190 as springs, it is apparent to those of ordinary skill in the art that other types of resilient members such as flexible shapes, bellows members, and inflatable members may be used.

Figure 8B:
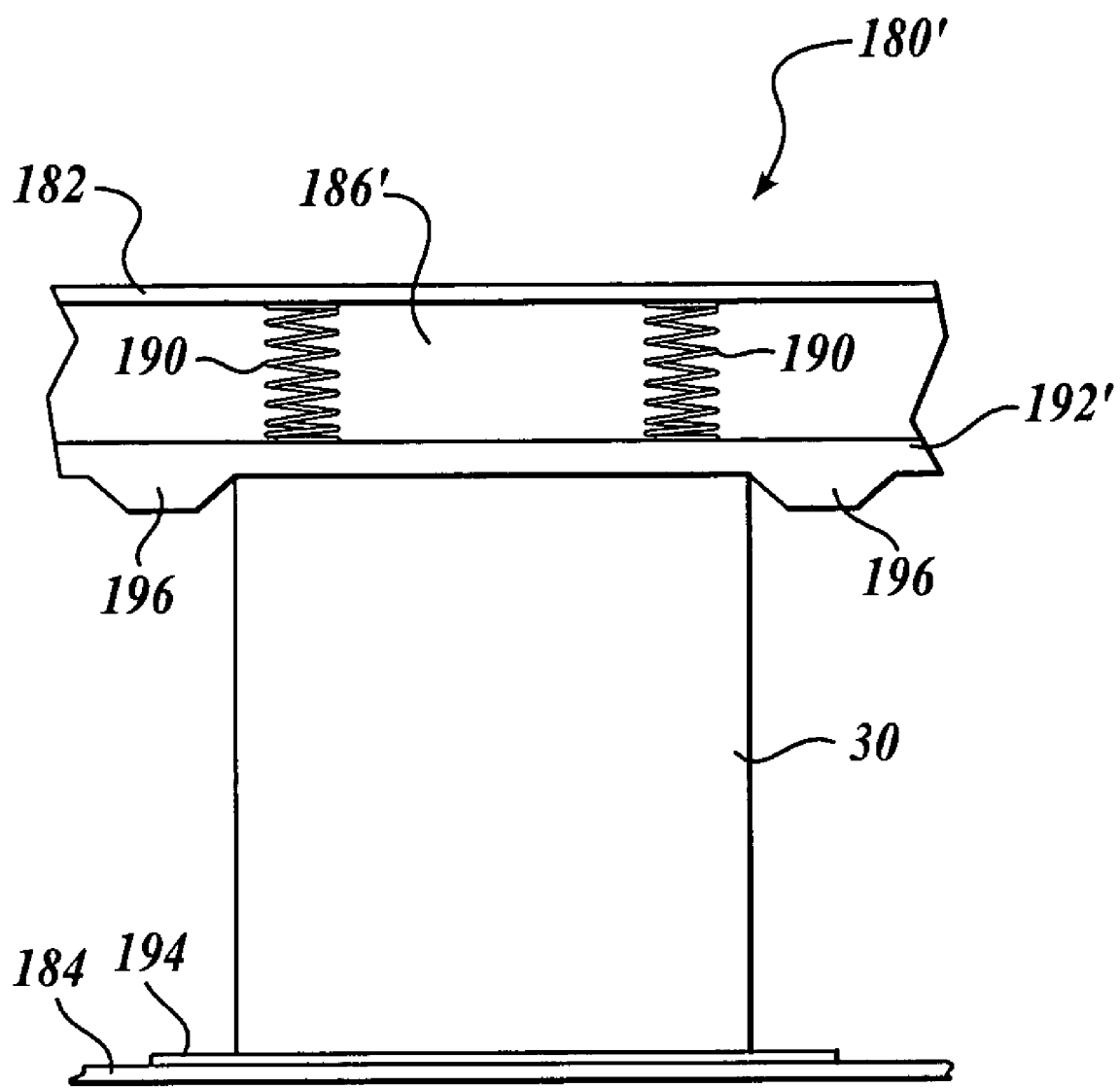
FIG. 8B depicts an alternate embodiment of a package holder depicted in FIG. 8A constructed in accordance with the present invention.

FIG. 8B depicts an alternate embodiment of the first positioning mechanism 186. First positioning mechanism 186' includes downwardly projecting divider projections 196 formed in pad 192'. These divider projections 196 may be useful to prevent shifting of the packages 30. Further divider projections 196 may prevent the packages from contacting one another during processing. Divider projections 196 may be 2–10 mm and preferably about 5 mm high, 2–10 mm and preferably about 5 mm wide, and 2–10 mm and preferably about 5 mm long. Divider projections 196 may be tapered along their height so that the distal portion has a smaller cross-sectional area than the proximal portion to facilitate loading packages between the divider projections 196.

Figure 9:
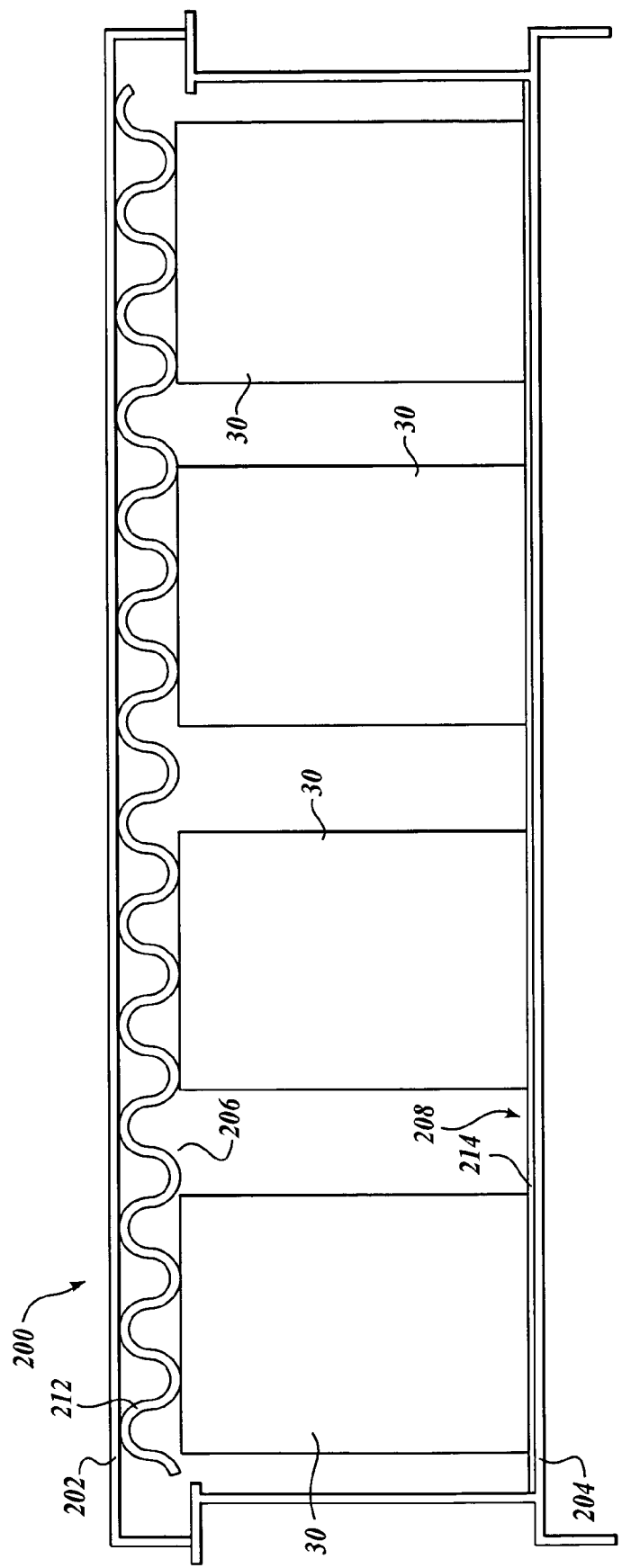
FIG. 9 depicts an embodiment of a package holder constructed in accordance with the present invention.

Referring to FIG. 9, a fifth embodiment of the present invention is depicted. Retaining apparatus 200 includes a first positioning mechanism 206 and an optional second positioning assembly 208 similar to that depicted in FIG. 5. In this regard, the second positioning assembly 208 may include a pad 214. First positioning mechanism 206 may include a flexible corrugated pad 212. Because corrugation is a relatively high frequency wave-like pattern formed in a sheet-like material, it is appreciated by those of ordinary skill that any relatively high-frequency pattern formed in a flexible sheet material may be used. The amplitude of the wave-like pattern and its frequency may be determined from or based on the size and weight of packages 30. Corrugated pad 212 may be coupled to the surface of the upper tray 202 in any manner known in the art including, for example, adhesives, screws, bolts, rivets, and clips. Alternatively, the thickness of the corrugated pad 212 may be suitably sized so that corrugated pad 212 bears against both the upper tray and at least one face of the packages 30. In this manner, the corrugated pad 212 may be held in place.

In one embodiment, natural or synthetic rubber may be used to form corrugated pad 212. However, other suitable materials may be used including silicone rubber, EPDM, polypropylene, or any elastic material (for example, perfluorinated elastomer or fluorinated copolymers) that can withstand a steam, steam-air, or steam-air-water environment at temperatures up to approximately 130° C. Corrugated pad 212 resists compression between package 30 and upper tray 202. In this manner, movement of package 30 is resisted by corrugated pad 212.

Figure 10:
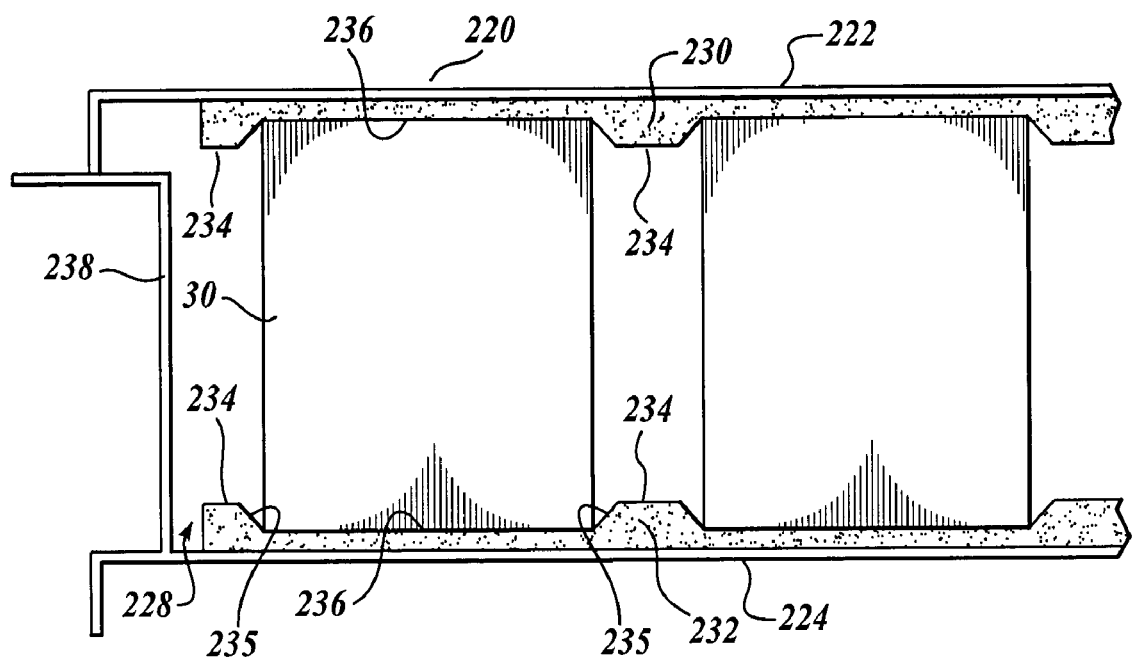
FIG. 10 depicts an embodiment of a package holder constructed in accordance with the present invention.

Referring to FIG. 10, a sixth embodiment of a package holding apparatus constructed in accordance with the present invention is depicted. Package holder 220 includes a first positioning mechanism 226 and an optional second positioning assembly 228 that both include a contoured pad (230 and 232, respectively). Contoured pad 230 may be coupled to the surface of the upper tray 222 in any manner known in the art including adhesives, screws, bolts, rivets, and clips. In a like manner, contoured pad 232 may be coupled to the surface of the lower tray 224. Alternatively, contoured pad 232 may be held in place by either the force of the packages bearing against the contoured pad 232 or side slats 238 included on the lower tray 224.

Contoured pads 230 and 232 generally include divider projections 234 that may be positioned to extend between packages 30 to retain the packages 30 in a desired position. Projections 234 may be located at one or more corners of package 30. Further, projections 234 may traverse a portion of one or more faces of the package 30. Projections 234 may also surround a portion of the package 30 or the entire perimeter of the package 30. Projections 234 may contact one or more faces of the package 30 or be spaced from the faces of the package 30. The projections 234 may be suitably sized based upon the size and weight of packages 30. It may be desirable to angle or taper the sidewalls of projections 234 so that they will guide the packages into a predetermined position during the loading of the trays. Further, if the packages 30 shift, the sloped sidewalls 235 of projections 234 may gently guide the packages 230 back into their desired positions. Between projections 234, cavities or recesses 236 may be formed. In one embodiment, packages 30 are positioned within recesses 236. Therefore, the size of package 30 may be used to determine the width and length of recesses 236. In this embodiment, the contoured pads 230 and 232 may provide a degree of necessary resilience to retain the packages in their positions. Contoured pads 230 and 232 may be constructed from any suitable rigid or semi-rigid material known in the art. Particularly, contoured pads 230 and 232 may be constructed from silicon rubber, silicon foam rubber, polypropylene, and any other elastomer that can withstand the retort environment.

Figure 11:
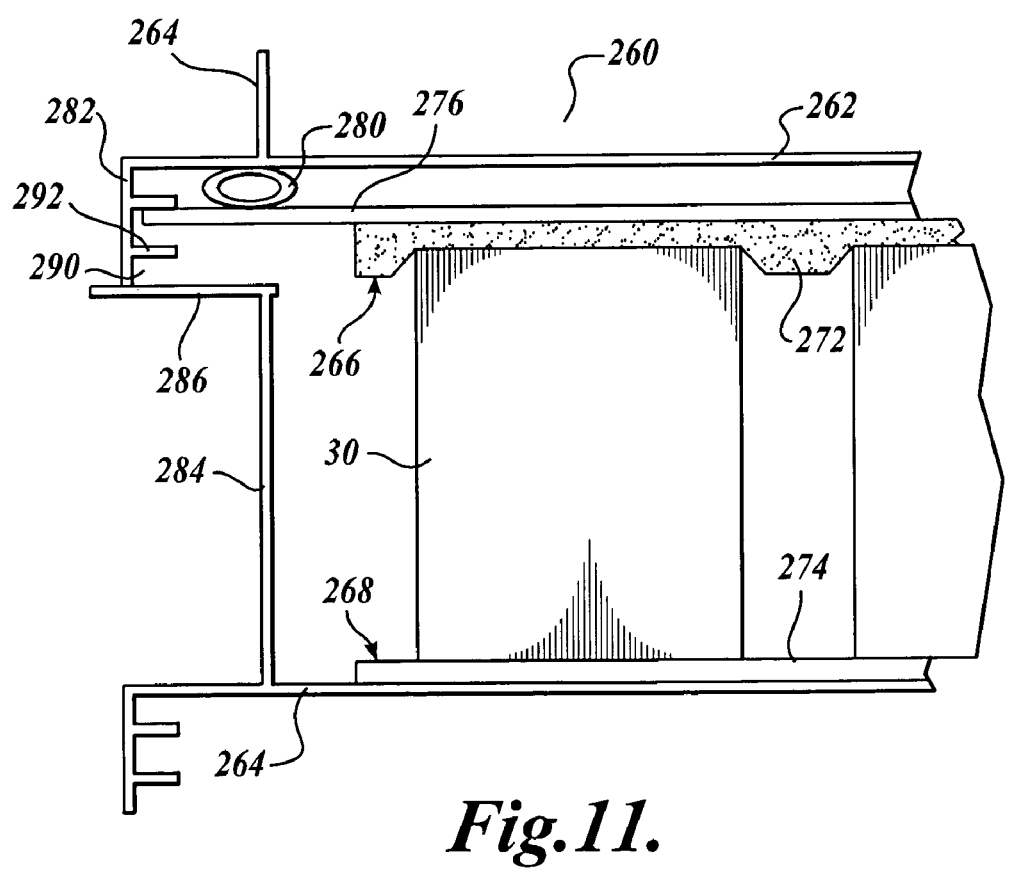
FIG. 11 depicts an embodiment of a package holder constructed in accordance with the present invention.

Referring to FIG. 11, a seventh embodiment of a package holder constructed in accordance with the present invention is depicted. Package holder apparatus 260 may include an optional second positioning assembly 268 similar to that depicted in FIG. 5. In this regard the second positioning assembly may include a resilient pad 274. Package holder 260 includes a first positioning assembly 266 with a contoured pad 272 disposed on the packages 30 similarly to the contoured pad 230 depicted on FIG. 10. The first positioning assembly 266 may also include a rigid pad 276 that is disposed on or above contoured pad 272. Rigid pad 276 may be substantially planar and formed from a rigid metallic, hard plastic, or other type of rigid sheet material. Rigid pad 276 may be large enough to cover the entire contoured pad 272 or a portion thereof. Rigid pad 276 may also be larger than contoured pad 272.

Between rigid pad 276 and upper tray 262, at least one resilient member 280 may be positioned. Resilient member 280 may resist excessive movement of package 30 toward upper tray 262. Resilient member 280 may also bias package 30 against either lower tray 264 or flexible pad 274. Resilient member 280 may be any suitably resilient member known in the art including a spring, similar to spring 112, flexible shape similar to flexible shape 142, and/or bellows similar to bellows member 172 above. Resilient member 280 may be coupled to the surface of the upper tray 202 in any manner suitable for coupling resilient member 142 to upper tray 132 (depicted in FIG. 6).

Forces exerted by the packages 30 may be translated through contoured pad 272 and deflect a portion of rigid pad 276 spaced from resilient members 280. The rigidity of rigid pad 276 may resist deflection exerting an opposing force on the package 30. One or more resilient members 280 may be placed along the periphery of the rigid pad spaced from the edge so that the portion of the rigid pad 276 more toward its center may deflect in response to an applied load.

In the embodiment depicted in FIG. 11, the trays 262 and 264 include downwardly extending slats 282 and upwardly extending slats 284. In one embodiment, both the upwardly and downwardly extending slats occur along the same two opposing edges of the tray. In another embodiment, both the upwardly and downwardly extending slats occur along all of the edges of the trays. When the upper and lower trays are stacked, the downward extending slat 282 engages a portion of the upwardly extending slat 284. In the embodiment depicted in FIG. 11, the upwardly extending slat 284 includes a horizontal flange 286. The downwardly extending slat 282 may bear against the horizontal flange 286 when upper tray 262 is stacked upon lower tray 264. The lower surface of the upper tray 262, the inside surface of slat 282, and the upper surface of horizontal flange 286 define a recess 290. Recess 290 may include projections or ledges 292 that project from the inside surface of the downwardly extending slat 282. Rigid pad 276 may be positioned between two ledges 292. In this manner, the vertical movement of the rigid pad 276 may be limited by the ledges 292. In some embodiments, the rigid pad 276 may be positioned to bear against the underside of one of the pair the ledges (as shown in FIG. 11). However, it is apparent to those of ordinary skill in the art that the combined thickness of the second positioning mechanism (if present), package 30, contoured pad 272, and rigid pad 276 may determine whether the top surface of the rigid pad 276 bears against the underside of one of the ledges 292. In some embodiments, ledges 292 are substantially rigid and will not appreciably deflect to absorb load.

A portion of the upward load exerted by the packages 30 on contoured pad 272 may be transferred to the rigid pad 276. A portion of this upward load transferred to the rigid pad 276 may then be absorbed by its deflection or upward movement and/or transferred to the resilient member 280. Resilient member 280 may compress to absorb the load.

Figure 12:
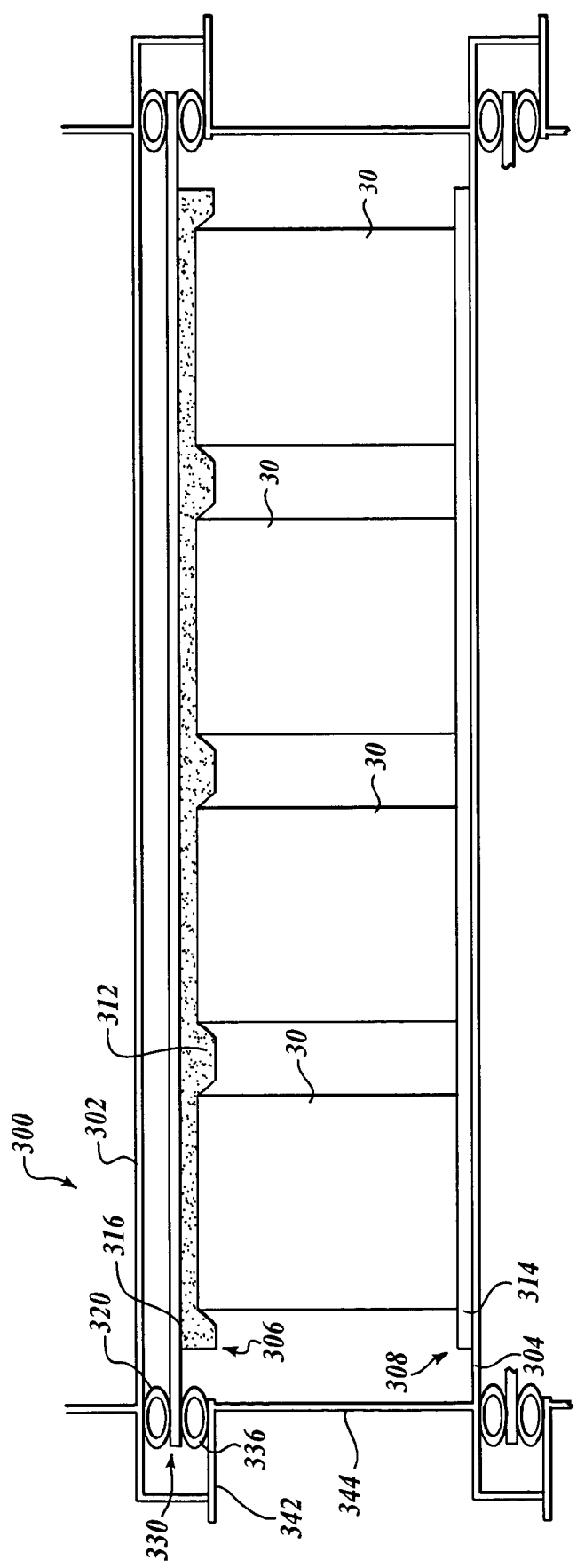
FIG. 12 depicts an embodiment of a package holder constructed in accordance with the present invention.

Referring to FIG. 12, an eighth embodiment of a package holding apparatus constructed in accordance with the present invention is depicted. The package holding apparatus 300 is somewhat similar to the embodiment depicted in FIG. 11 except that recess 330 does not include ledges and a second set of resilient members 336 are positioned between the lower surface of the rigid pad 316 and the lower inside surface of recess 330.

A portion of the upward load exerted by the packages 30 on contoured pad 312 may be transferred to the rigid pad 316. A portion of the upward load transferred to the rigid pad 316 may then be absorbed by its deflection and/or transferred to the resilient member 320. Resilient member 320 may compress to absorb the load. In some embodiments, the combined thickness of resilient member 320, rigid pad 316, and resilient member 336 approximates the vertical height of the recess so that the resilient member 336 bears against the lower inside surface of the recess 330. In one embodiment, resilient member 336 is coupled to horizontal flange 342 of slot 344 in any suitable manner. In one embodiment, a resilient member 336 may be positioned directly opposite to a corresponding resilient member 320. Resilient members 336 oppose the forces of resilient members 320, and the opposing forces of resilient members 320 and 336 may maintain rigid pad 316 in a substantially fixed position.

Figure 13A:
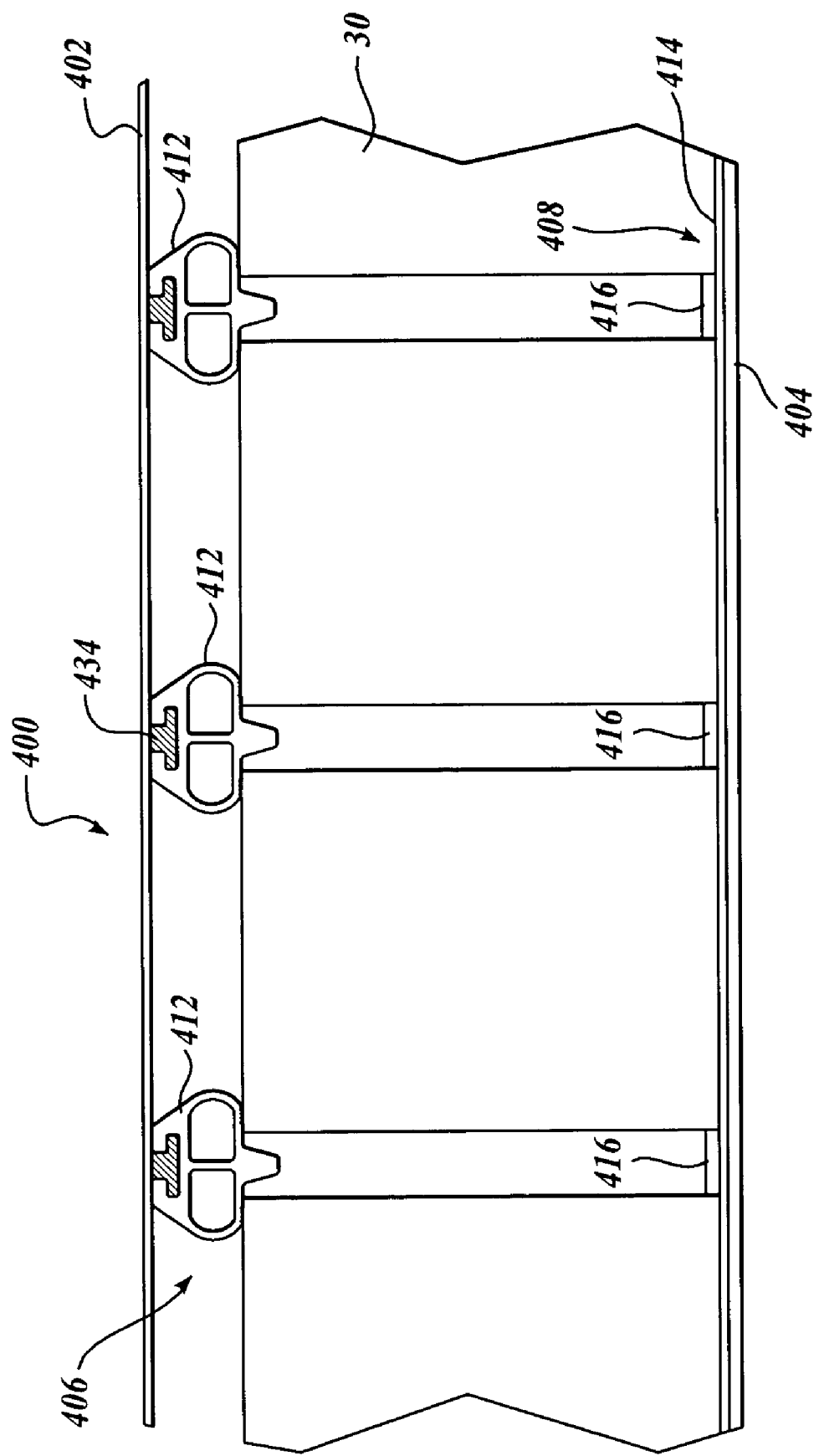
FIGS. 13A–B depict an embodiment of a package holder constructed in accordance with the present invention.
Figure 13B:
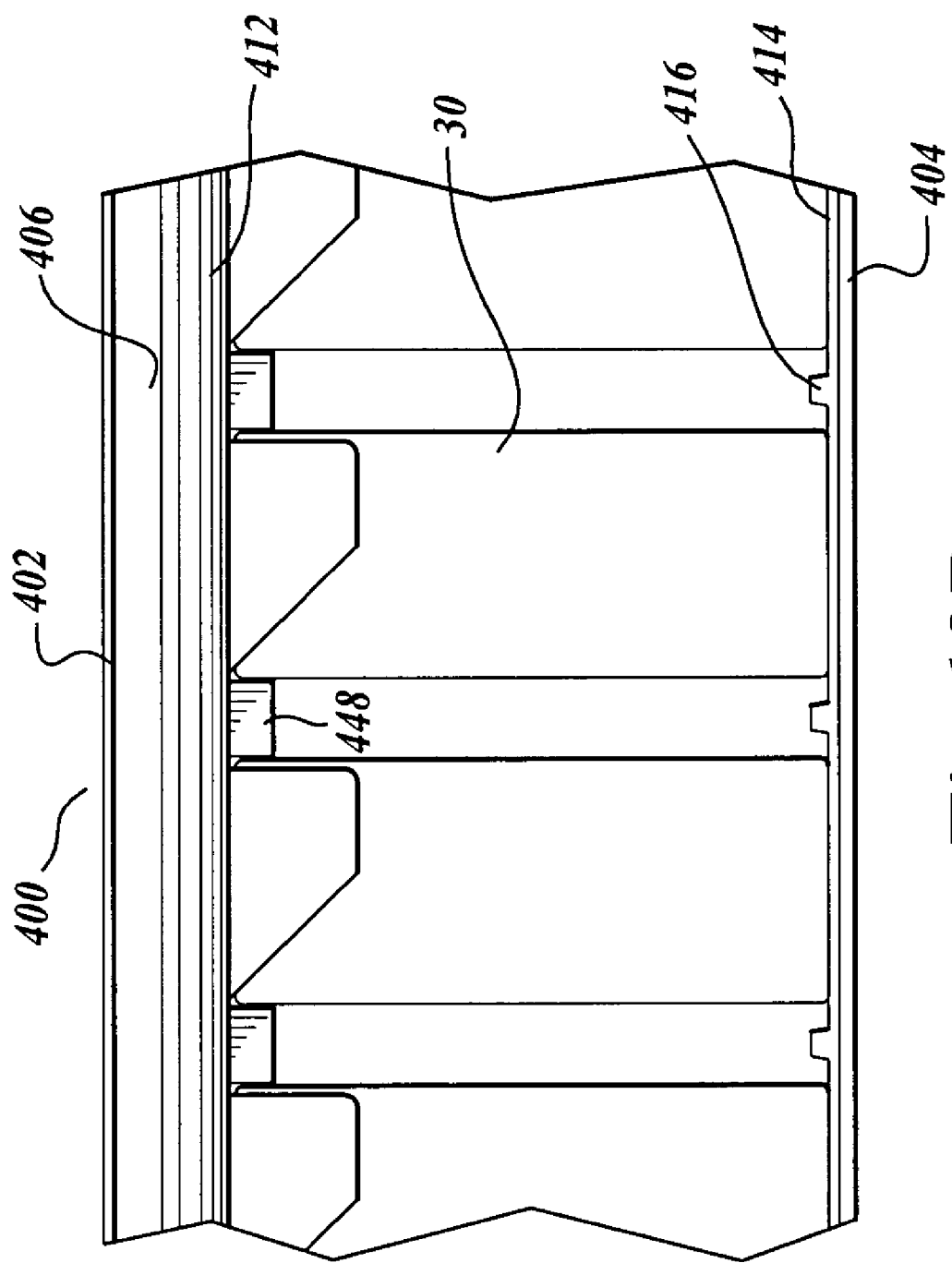

A ninth embodiment of the present invention is depicted in FIGS. 13A–13B. FIG. 13A depicts a lateral elevational view of a package holder 400 including a first positioning mechanism 406 that includes a linear positioning member 412. FIG. 13B depicts a longitudinal elevational view along a portion of the length of the linear positioning member 412. Package holder 400 includes an optional second positioning mechanism 408 substantially similar to the second positioning mechanism 108 of package holder 100. In this regard, positioning mechanism 408 may include a resilient pad 414.

Linear positioning member 412 may have a generally annular or bulbous shape in cross-section. Linear positioning member 412 may be positioned along the lower package receiving surface of upper tray 402 at a location that is between two adjacent packages 30. The linear positioning member 412 may bear against or abut at least one face of each package. In this manner, linear positioning member 412 is disposed between upper tray 402 and both adjacently positioned packages 30.

Referring to FIG. 13B, dividers such as projections 416 may be included on flexible pad 414 to assist in maintaining packages 30 in their desired position. The spacing of the divider projections 416 should correspond to the size of the package 30. Suitable dimensions for divider projections 416 include 2–10 mm and preferably about 5 mm high, 2–10 mm and preferably about 5 mm wide, and extend over the width of the pad 404. Divider projections 416 may be tapered so that the distal most portion has a smaller cross-sectional area than the proximal most portion to facilitate loading packages between the divider projections.

Figure 14:
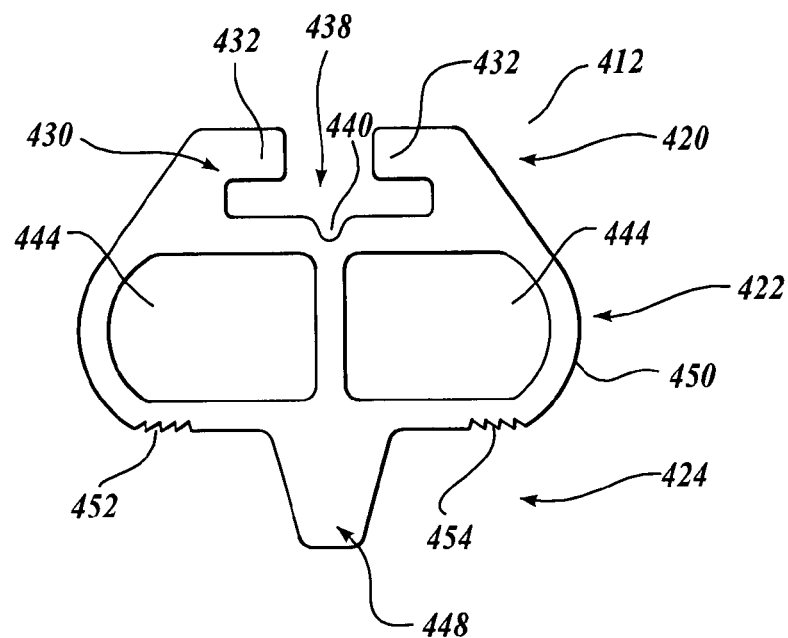
FIG. 14 depicts a cross-sectional view of an embodiment of a linear positioning member of the package holder depicted in FIGS. 13A–B.

Referring to FIG. 14, a detailed cross-sectional view of linear positioning member 412 is provided. Linear positioning member 412 may generally include three regions: a tray coupling region 420, a medial region 422, and a divider region 424. The tray coupling region 420 may include a tray coupling assembly 430 that is capable of coupling the linear positioning member 412 to upper tray 402. In this manner, the linear positioning member 412 may be maintained in a generally fixed position relative to upper tray 402. Tray coupling assembly 430 may include arms 432 that define a channel 438 therebetween. Upper tray 402 may include a projection or T-rail 434 (shown in FIG. 13A) that is suitably sized and shaped to be closely received into channel 438. When the rail 434 is received into channel 438, a tongue and groove or similar slot-type connection may be formed between linear positioning member 412 and upper tray 402. When rail 434 is received in channel 438, a suitable fastening means may be used to prevent longitudinal movement of the linear positioning member 412 relative to the rail 434 or disengagement of the linear positioning member 412 from rail 434. Suitable fastening means include any methods known in the art such as rivets, bolts, screws, adhesives, staples or other suitable methods. The base portion of channel 438 may include recesses or a groove 440 to accommodate the head portion of a fastening means such as a rivet, screw, bolt, or other fastener. While a tongue and groove or similar slot-type connection has been discussed in some detail, linear positioning member 412 may be attached to upper tray 402 in any manner known in the art. Suitable means for attaching linear positioning member 412 to upper tray 402 include rivets, bolts, screws, adhesives, staples, or other suitable methods.

The medial region 422 is formed adjacent to the tray coupling region 420. In one embodiment, the medial region 422 may be wider than the tray coupling region 420. The portion of the outside surface 450 located within the medial region 422 may be generally arcuate or contoured. The contoured profile may improve the resistive properties of the medial region 422 as it is compressed.

The medial region 422 may include at least one longitudinal chamber 444. The embodiment depicted in FIG. 14 includes two side-by-side chambers 444. It may be desirable to locate a portion of a longitudinal chamber 444 between each package 30 and upper tray 402. Longitudinal chambers 444 may longitudinally traverse a portion of the linear positioning member 412. In one embodiment, the longitudinal chambers 444 traverse the entire length of the linear positioning member. In another embodiment, the longitudinal chambers 444 are open at the ends of the linear positioning member 412. In the embodiment depicted in FIG. 14, the longitudinal chambers 444 occupy the majority of the medial region 422. In this embodiment, the medial region 422 may be considered generally hollow. The longitudinal chambers may have any cross-sectional shape such as circular, ovoid, square, rectangular, or arbitrary. The longitudinal chambers 444 depicted in FIG. 14 are generally trapezoidal in shape but have an outwardly directed sidewall that is arcuate or contoured instead of linear.

The medial region 422 includes a package contact region 452 located along the outer surface 450 of the linear positioning member 412. Along the package contact region 452, the packages 30 will contact or abut a portion of the linear positioning member 412. It may be desirable to include gripping projections or ridges 454 along a portion of the package contact region 452 to facilitate gripping the package 30 and reduce slippage of the package 30 relative to the linear positioning member 412. It may be desirable to locate package contact regions 452 along a portion of the linear positioning member 412 near at least one of the longitudinal chambers 444. Further, it may be desirable to locate the package contact region 452 along the thinnest portion of the linear positioning member 412 between the outside surface 450 and the inside surface of the longitudinal chamber 444.

During agitation, the packages 30 may compress the medial region 422 of the linear positioning member 412 against upper tray 402. Similarly, packages located closer to the upper tray 402 than the surface of the package contact region 452 will compress the linear positioning member 412 against upper tray 402. In this manner, the linear positioning member 412 may hold packages located at various distances from the upper tray 402. In some embodiments, as linear positioning member 412 compresses, the longitudinal chambers 444 may collapse somewhat. The thickness of the portion of the linear positioning member between the package contact region 452 and the inside wall of a longitudinal chamber 444 may determine the amount of force required to compress the chambers 444. By varying the thickness of this portion the resilience of the linear positioning member 412 may be adjusted.

The divider region 424 is located adjacent to the medial region 422. In one embodiment, the divider region 424 is located on the opposite side of the medial region 422 from the tray coupling region 420. The divider region 424 may include a longitudinal divider projection or lip 448. When the linear positioning member 412 is disposed between two packages, as depicted in FIG. 13A, lip 448 may extend between the packages. Lip 448 may prevent the packages from contacting and possibly damaging one another. Lip 448 may be generally tapered in shape to facilitate the inserting of the lip in-between the packages positioned on the previous tray, when putting a new empty tray on the stack. The sloped edges of the lip 448 may also gently urge packages into position. As may best be viewed in FIG. 13B, the lip 448 may extend longitudinally along a portion of the linear positioning member 412. In one embodiment, the lip 448 occurs along the linear positioning member 412 at the locations where packages contact the linear positioning member 412. In another embodiment, the lip 448 extends over the entire length of the linear positioning member.

The amount of force required to compress the linear positioning member 412 may also be determined by the material chosen to construct it. The linear positioning member 412 may be constructed from any suitable material including extruded silicon, silicon rubber, silicone foam-rubber, EPDM, polypropylene, or any elastic material (for example, perfluorinated elastomers and fluorinated copolymers) that can withstand a steam, steam-air, or steam-air-water environment at temperatures up to 130° C. In the preferred embodiment, the linear positioning member 412 may be formed from a material with a hardness of about 45 to 60 shore A. Referring to its cross-section, the linear positioning member 412 is approximately 10–40 mm wide and 10–30 mm tall. However, as apparent to one of ordinary skill, smaller or larger linear positioning members 412 may be constructed to accommodate packages of various sizes and/or weights.

Preferably, the linear positioning member 412 is long enough to span more than one row of packages 30. Referring to FIG. 13B, the linear positioning member 412 is depicted spanning at least four rows. In one embodiment, the linear positioning member 412 spans across all of the rows included in the retort drum. Therefore, the length of the linear positioning member 412 may be determined by the number of rows spanned or the size of the retort drum used. If the trays include a center support (depicted in FIGS. 16D1–3), it may be desirable to size the length of the linear positioning member to span from one edge of the tray to the middle support.

Figure 15:
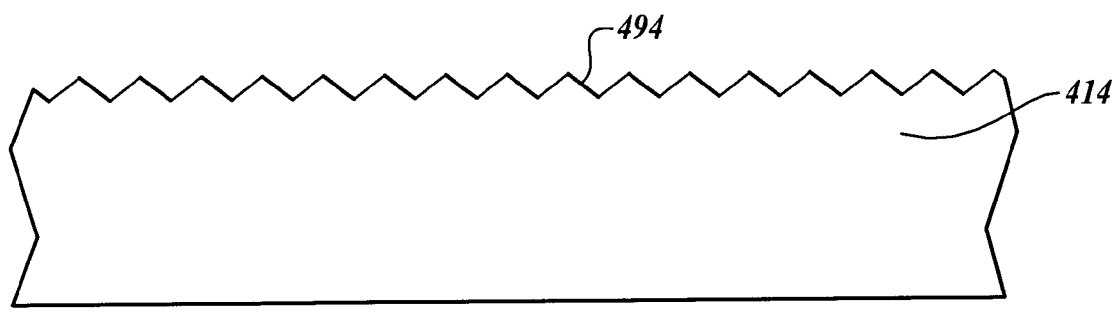
FIG. 15 depicts a cross-sectional view of an embodiment of a flexible pad of a package holder constructed in accordance with the present invention.

Referring to FIG. 15, it may also be desirable to include gripping projections or ridges 494 along the flexible pad 414. Such gripping projections 494 may be desirable for use with any of the embodiments including a flexible pad. These gripping projections may help prevent scuffing of the underside of the package 30.

Figure 16A:
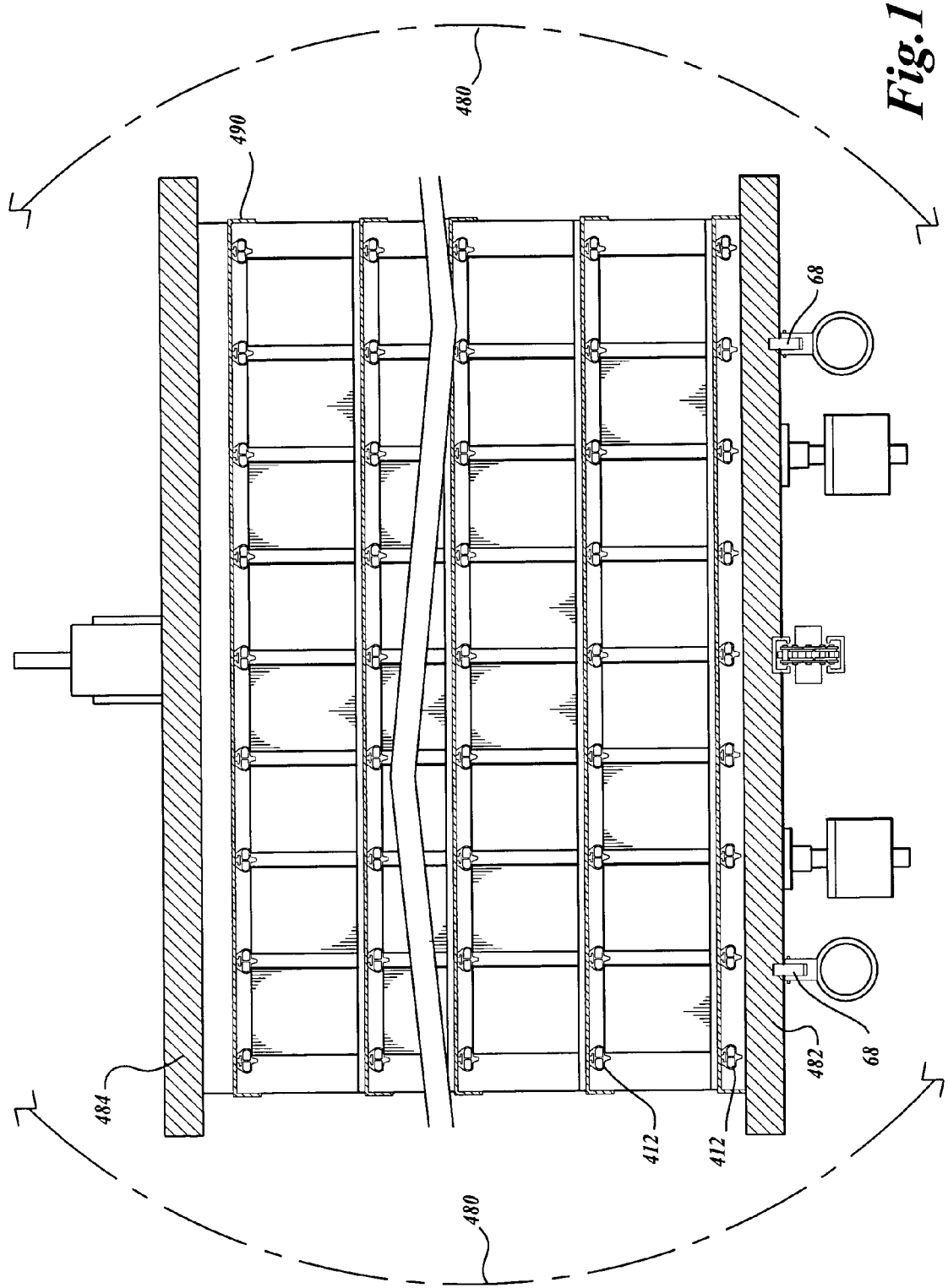
FIG. 16A depicts a front cross-sectional view of a stack of trays incorporating the package holder depicted in FIGS. 13A–B inside an agitating retort drum known in the art.

Referring to FIG. 16A, a front cross-sectional view of a retort drum 480, into which upper tray 402 and lower tray 404 may be loaded with packages 30 therebetween, is depicted. As can be seen in FIG. 16A, many trays may be vertically arranged within the retort drum 480. Linear positioning members 412 are shown placed between each neighboring pair of packages within a horizontal row.

As mentioned in the Background, the trays are stacked on a carrier pallet 482. FIG. 16B1 depicts an elevational top view of an exemplary carrier pallet 482 known in the art. FIG. 16B2 depicts a front view of carrier pallet 482 and FIG. 16B3 depicts a side view of carrier pallet 482. Carrier pallet 482 includes a frame 486 for supporting the trays. The frame defines channels 488 into which the idler wheels may be received.

FIG. 16C1 depicts an elevational top view of an exemplary tray 404 known in the art. FIG. 16C2 depicts a front view of tray 404, and FIG. 16C3 depicts a cross-sectional side view of tray 404. Further, tray 404 may include a center support or flange 472 to increase the rigidity of the tray 404. The embodiment of tray 404 depicted in FIGS. 16C1–3 includes upwardly extended slats 474. These slats 474 may occur along opposing edges of the tray 404. Further, these slats may occur along the edges orthogonal to the linear positioning members 412. When a second tray is stacked on top of tray 404, the upwardmost portion of the upwardly extending slats 474 may bear against a portion of the underside of the tray above tray 404. The horizontal deck or web 483 of tray 404 may include perforations 470 for the process water to penetrate the complete stack and through-holes in center and side flanges 472 and 474 to reduce the weight of the tray.

Referring to FIGS. 16D1–3, an optional pad 414 may be included on the package receiving surface of tray 404. Pad 414 may include perforations that may be positioned adjacent to the perforations in the horizontal deck of the tray 404. Pad 414 may also include divider projections 416 as discussed above relative to FIGS. 13A and 13B. Rather than being in sections, the divider projections may extend the entire length of the pad 414.

To reduce the height and/or weight of the stack it may be desirable to use a top tray that is shorter than tray 404. FIGS. 16E1–3 depict orthogonal views of an exemplary top tray 490 known in the art. Top tray 490 includes a center support 472' that is shorter but of the same general shape as center support 472 of tray 404. Referring to FIG. 16A, after the top tray 490 has been added to the stack, upper clamping plate 484 may be clamped to the top tray 490 on top of the stack. The carrier pallet 482 may be lifted to clamp the stack for processing inside the retort drum 480. While exemplary embodiments of the carrier plate, tray, top tray, and clamping plate have been presented for illustrative purposes, it is apparent to those of ordinary skill in the art that other embodiments of these structures are within the scope of the present invention.

Figure 17:
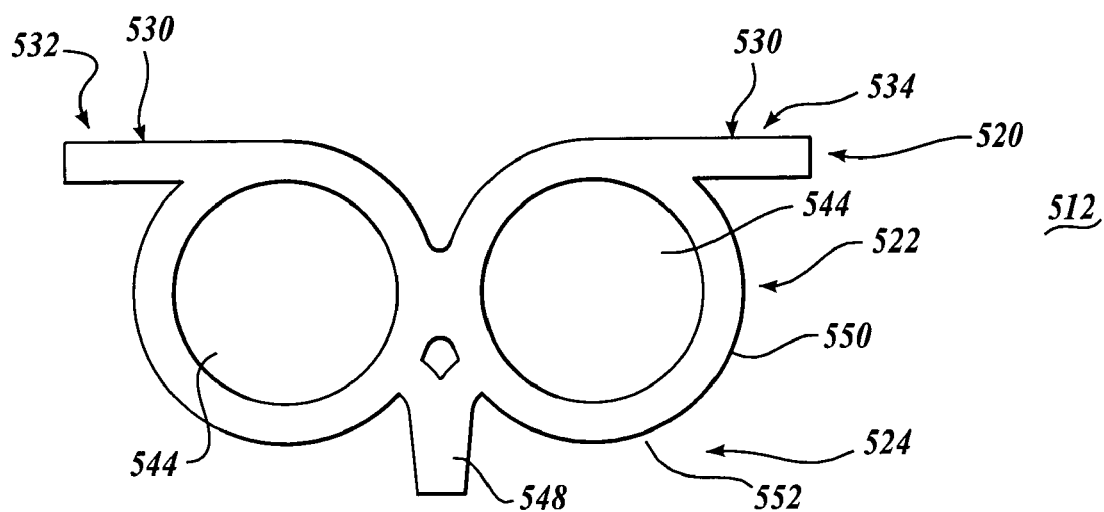
FIG. 17 depicts a cross-sectional view of an embodiment of a linear positioning member of a package holder constructed in accordance with the present invention.

Referring to FIG. 17, a second embodiment of a linear positioning member 512 is depicted. Linear positioning member 512 may be formed from the same materials suitable to form linear positioning member 412. Like linear positioning member 412, linear positioning member 512 may include a tray coupling region 520, a medial region 522 that is adjacent to the tray coupling region 520, and a divider region 524 that is adjacent to the medial region 522. Tray coupling region 520 may include a tray coupling assembly 530. Tray coupling assembly 530 may include outwardly extending flanges 532 and 534. In one embodiment, outwardly extending flanges 532 and 534 extend horizontally from the linear positioning member and may be coupled to the tray using any mechanism listed as suitable for fastening tray coupling assembly 430 to the tray. In one embodiment, silicon adhesive may be used to fasten linear positioning member 512 to the upper tray 402.

Medial region 522 may include two longitudinal chambers 544. In this embodiment, longitudinal chambers 544 have a generally circular cross-sectional shape. Further, the outside surface 550 of the medial region 522 may be contoured substantially similarly to the contour of the sidewalls defining longitudinal chambers 544. Because the longitudinal chambers 544 have a generally circular cross-sectional shape and the outside surface 550 of the medial region 522 is contoured to substantially match the contour of the sidewall of longitudinal chamber 544, the medial region 522 may take on the general appearance of two intersecting tube sections coupled side-by-side to each other.

The package contact region 552 may be formed along the outside surface 550 of the medial region 522. In one embodiment, the package contact region 552 is located along the lower portion of the medial region farthest from the upper tray 402. Like linear positioning member 412, linear positioning member 512 may also include gripping projections (not shown) located along its outer surface 550 in the package contact region 552.

The divider region 524 may include lip 548 similar to lip 458 above positioned near the intersection of the tube sections. The lip 548 may be located on the opposite side of the tube sections from tray coupling assembly 530. The longitudinal chambers 544 of linear positioning member 512 are located on opposite sides of lip 548. In this manner, each chamber 544 may be adjacent to a different package or row of packages. Further, each package may be adjacent to a unique section of one of the longitudinal chambers 544.

Figure 18:
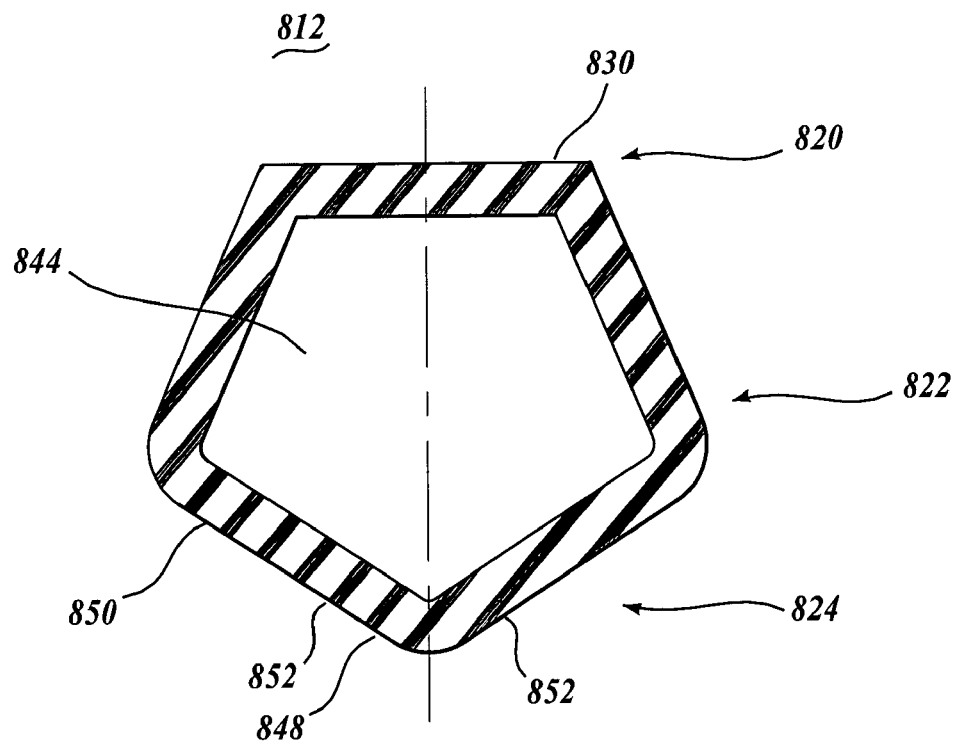
FIG. 18 depicts a cross-sectional view of an embodiment of a linear positioning member of a package holder constructed in accordance with the present invention.

Referring to FIG. 18, linear positioning member 812 may be viewed. Linear positioning member 812 includes many of the features present in the other linear positioning members described herein. Specifically, linear positioning member 812 may include a tray coupling region 820 that is integrally formed with medial region 822. In some embodiments medial region 822 occurs beneath tray coupling region 820. Linear positioning member 812 may also include a divider region 824 that is integrally formed with the medial region 822. The divider region may be formed along the opposite side of the medial region 822 from the tray coupling region 820.

The tray coupling region 820 may be generally consistent with the tray coupling region of linear positioning member 412 or any method known in the art suitable for coupling linear positioning member 412 to tray 404.

The medial region 822 may include at least one longitudinal chamber 844. In the embodiment depicted in FIG. 18, longitudinal chamber 844 is sufficiently large to consider linear positioning member 812 generally hollow. Further, the cross-sectional shape of the longitudinal chamber 844 may approximate the cross-sectional shape of the linear positioning member 812 along its outer surface 850. In some embodiments, the linear positioning member 812 has a generally pentagonal cross-sectional shape.

The divider region 824 may include a divider projection 848. In the embodiment depicted in FIG. 18, the divider projection comprises a tapered portion formed along the underside of the medial region 822. The divider projection 848 functions to prevent packages 30 from contacting one another. Any materials suitable for forming the linear positioning member 412 may also be suitable for forming linear positioning member 812. As with the other linear positioning members, the packages contact the divider projection 848 along a package contact region 852. As the packages bear against the package contact regions 852 located along opposing sides of the divider projection 848, the divider projection 848 may compress inwardly.

As the packages 30 exert an upwardly directed force against linear positioning member 812, the medial region 822 may compress. Further, longitudinal chamber 844 may collapse somewhat to absorb some of the upwardly directed force.

Figure 19A:
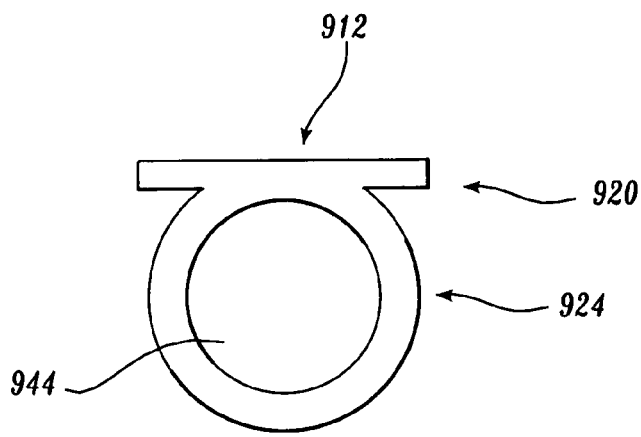
FIGS. 19A–C depict cross-sectional views of embodiments of linear positioning members of a package holder constructed in accordance with the present invention.

In all of the aforementioned embodiments of the linear positioning member, a medial region was present that included at least one longitudinal chamber. However, it is apparent to those of ordinary skill in the art that the medial region may not necessarily include a longitudinal chamber. Further longitudinal chambers may be present in the divider region. In some embodiments the linear positioning member need only prevent the packages from coming into contact with one another. In those embodiments the linear positioning member need not contact the face of the package nearest the upper tray 402. Referring to FIG. 19A, one embodiment of such a linear positioning member is depicted. Generally speaking, linear positioning member 912 includes a tray coupling region 920 similar to that of tray coupling region 820 and a divider region 924 integrally formed with the tray coupling region 920. The divider region 924 extends downwardly between two adjacent packages 30. In the embodiment depicted in FIG. 19A, the divider region is generally circular in cross-sectional shape and includes a longitudinal chamber 944. Therefore, the divider region 924 may be generally tubular in shape. The generally tubular shape of the divider region 924 resists the movement of packages 30 toward one another. In this manner, the linear positioning member 912 maintains the packages within their desired positions.

Figure 19B:
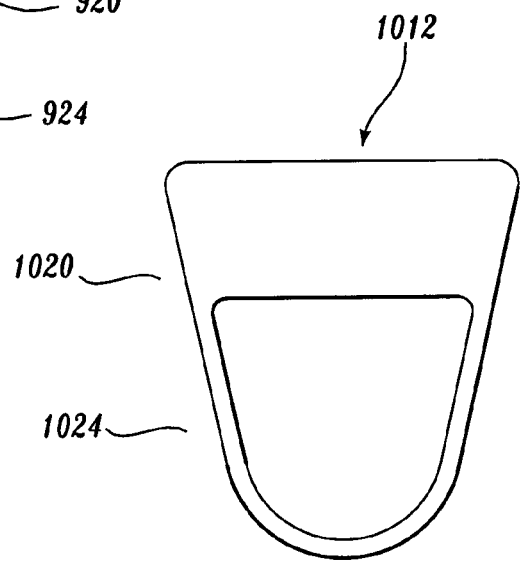

If instead of a generally circular cross-sectional shape, the linear positioning member 912 had a generally tapered divider region, the tapered shape may facilitate loading packages between two adjacent linear positioning members. Referring to FIG. 19B, a linear positioning member 1012 generally similar to linear positioning member 912 is depicted. The linear positioning member has a tray coupling region 1020 and a divider region 1024. The dividing region 1024 of linear positioning member 1012 is tapered along its outside surface to facilitate loading.

Figure 19C:
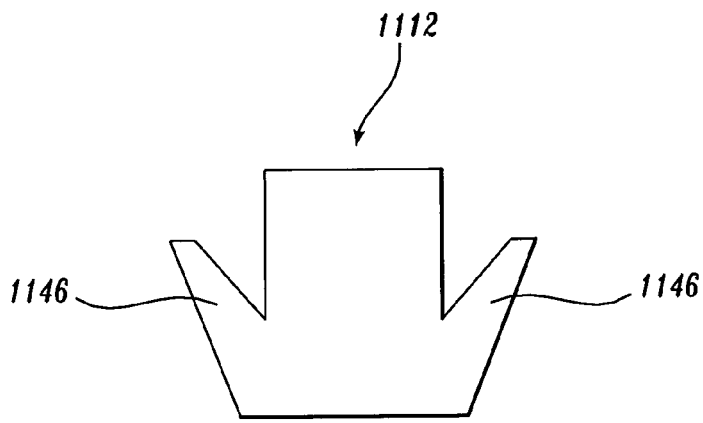

Additionally, the tapered section need not include a longitudinal chamber. Instead, referring to FIG. 19C, linear positioning member 1112 includes two tapered arms 1146 located on opposing sides of linear positioning member 1112. In this manner, if packages 30 were to move vertically upward, arms 1146 could deflect inwardly toward the central axis of linear positioning member 1112. The resistive properties of the material used to form linear positioning member 1112 may determine the amount of force necessary to deflect arms 1146. Linear positioning member 1112 may be formed from any of the materials suitable for forming linear positioning member 412.

Figure 20:
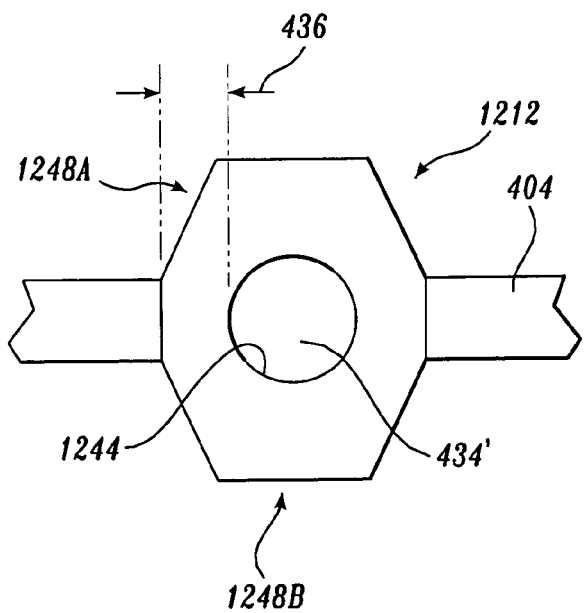
FIG. 20 depicts another cross-section view of an embodiment of a linear positioning member of a package holder constructed in accordance with the present invention.

Referring to FIG. 20, linear positioning members 1212 may be embedded in tray 404. The horizontal web of trays 404 may include rails 434' formed therein. Linear positioning member 1212 may include a longitudinal chamber 1244 suitably sized and shaped to receive rail 434'. A gap between the horizontal web and rail 434' may be filled with a portion of linear positioning member 1212. Two divider projections 1248A and 1248B may project outwardly from linear positioning member 1212. In one embodiment, divider projection 1248A extends upwardly to divide packages received on the package receiving surface of tray 404. The other divider projection 1248B extends downwardly. Divider projection 1248B may extend downwardly between packages located in the tray beneath tray 404. In this manner, linear positioning member 1212 may be used to maintain packages within a desired position both above and beneath the tray in which it is installed.

Figure 21:
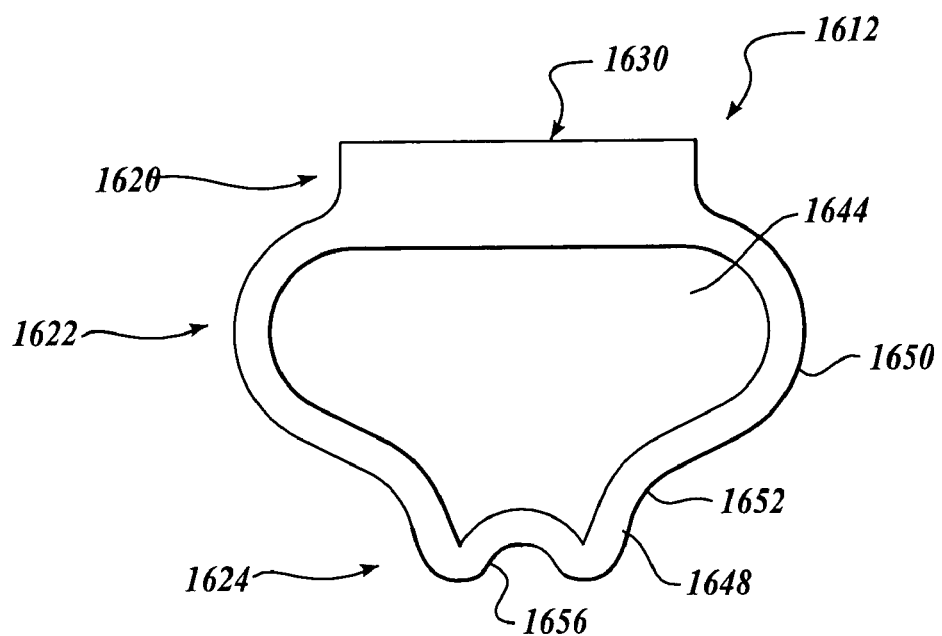
FIG. 21 depicts a cross-sectional view of an embodiment of a linear positioning member of a package holder constructed in accordance with the present invention.

Referring to FIG. 21, a cross-sectional view of a further embodiment of a linear positioning member is depicted. Like the other embodiments of linear positioning members, linear positioning member 1612 may include an upper tray coupling region 1620, a medial region 1622, and a lower divider region 1624.

The tray coupling region 1620 may include a tray coupling assembly 1630. Tray coupling assembly 1630 may be of various configurations including any of the structures recited with regard to tray coupling assembly 430. Further, tray coupling assembly 1630 may include a substantially planar upper surface that is fastened to tray 402 in any manner suitable to attach linear positioning member 412 to tray 402. If fasteners with heads are used, a groove may be provided in the tray coupling assembly 1630, similar to groove 440 of linear positioning member 412.

The medial region 1622 includes a single longitudinal chamber 1644. In one embodiment, longitudinal chamber 1644 is sufficiently large to consider both the medial region 1622 and the divider region generally hollow. Because those sections are generally hollow, a substantially uniform sidewall is formed between the longitudinal chamber and the outer surface 1650 of the linear positioning member 1612. Pressure exerted by either package resting on opposite sides of the divider portion 1648 will deform the sidewall of longitudinal chamber 1644. As with other embodiments, varying the thickness of the sidewall can determine the load required to deform the sidewall.

Divider region 1624 may include a divider projection 1648 that extends downwardly between two adjacent packages. In one embodiment, the contoured outside surface of the divider projection 1648 is inwardly concave along opposite sides of the projection 1648. The divider projection 1648 may also be generally tapered in shape with a distal portion that is narrower than the portion adjacent to the medial region 1622. In this embodiment, the package contact region 1652 is located along the contoured outside surface of the divider region 1624, providing a curved surface against which package 30 will bear. Further, the distal center portion of the divider projection 1648 may include a contoured (upwardly concave) resilient section 1656 to resist inward forces from the packages abutting the package contact regions 1652 on opposite sides of the divider projection 1648. Resilient section 1656 may also position the package contact region to bear against a portion of the side face of the package so that lateral movement of the package is limited. Further, flexing and distortion in the general direction of the divider projection 1648 may be resisted.

Linear positioning member 1612 may be approximately 15–30 mm and preferably about 18.5 mm tall. Linear positioning member 1612 may be approximately 15–40 mm and preferably about 25 mm wide. However, it is appreciated by those of ordinary skill in the art that these dimensions may be increased or decreased to accommodate packages of various sizes and weights. Linear positioning member 1612 may be formed from the same materials suitable to form linear positioning member 412. Linear positioning member 1612 may also be as long as linear positioning member 412.

Figure 22:
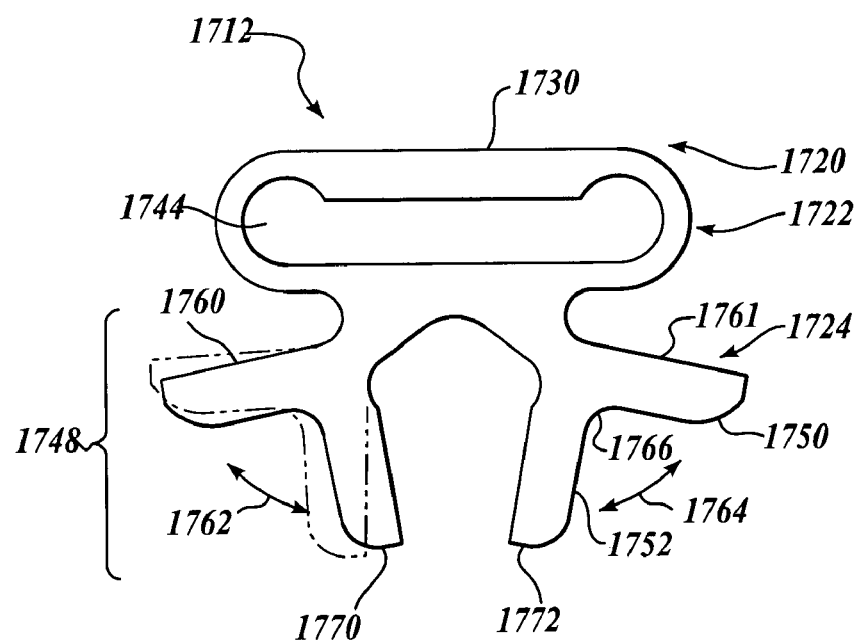
FIG. 22 depicts a cross-sectional view of an embodiment of a linear positioning member of a package holder constructed in accordance with the present invention.

Referring to FIG. 22, a cross-sectional view of another embodiment of a linear positioning member is depicted. Linear positioning member 1712 may include the following regions: a tray coupling region 1720; a medial region 1722 that may be located below and integrally formed with the tray coupling region 1720; and a divider region 1724 that may be located below and integrally formed with the medial region 1722.

Tray coupling region 1720 may include a tray coupling assembly 1730. Any tray coupling assembly suitable for use with linear positioning member 1612 is likely also suitable for use with linear positioning member 1712. Similarly, longitudinal grooves may be included to accommodate the heads of fasteners if heads are present.

The medial region 1722 of this embodiment may be relatively small in relation to the divider region 1724 (discussed below). Medial region 1722 includes a longitudinal chamber 1744 that may be substantially similar to the longitudinal chambers of the previous embodiments. In one embodiment, the longitudinal chamber 1744 is sufficiently large to consider the medial region 1722 generally hollow. Like other embodiments described herein, the outside surface 1750 of the medial region 1722 may be curved and/or contoured to resist compression. Portions of the sidewalls of the longitudinal chamber 1744 may be contoured to substantially mirror the contours of the outside surface of the side portions of the medial region 1722.

The divider region 1724 is located below the medial region 1722. The divider region 1724 includes a divider portion 1748 that may longitudinally traverse a portion of the linear positioning member 1712. Divider portion 1748 includes two forked or bifurcated projections 1760 and 1761. Each forked projection is designed to deflect when forces are exerted upon it by a package 30. Forked positioning projection 1760 deflects in the general direction of arrow 1762. The direction of deflection of forked positioning projection 1761 is generally depicted by arrow 1764. The tines 1770, 1772 of the forks may intersect at approximately a 85° to 95° and preferably a 90° angle to form a shoulder 1766.

Packages 30 bear against shoulder 1766. Preferably, the intersection of two faces of the package will be received within the shoulder 1766 so that a portion of one face of the package 30 contacts the package contact region 1752 of one tine and a portion of the other face of the package contacts the package contact region 1752 of the other tine. In this manner, one tine 1770 of the forks may maintain the vertical position of the package 30 and the other tine 1772 may maintain the horizontal position of the package 30. Forks 1760 and 1761 may be approximately 8–12 mm and preferably about 10 mm wide. Further, forks 1760 and 1761 may be approximately 8–12 mm and preferably about 10 mm in height. Forks may extend longitudinally along a portion of the linear positioning member 1712 or along the entire length of the linear positioning member 1712.

When force is applied to one of the forks (1760 or 1761), such as by a package 30 during agitation, the force may cause the fork to deflect, compress, or be pushed toward longitudinal channel 1744. Longitudinal channel 1744 may collapse somewhat to absorb some of the force exerted by the package upon the fork. In this manner, the linear positioning member 1712 may offer a large deflection with minimal change in force applied to the package 30.

Linear positioning member 1712 may be approximately 20–40 mm and preferably about 30 mm wide. Further, linear positioning member 1712 may be approximately 20–30 mm and preferably about 25 mm in height. Linear positioning member 1712 may be formed from any suitable material including materials suitable to form linear positioning member 412 above. Linear positioning member 1712 may be of a similar length to linear positioning member 412.

Figure 23:
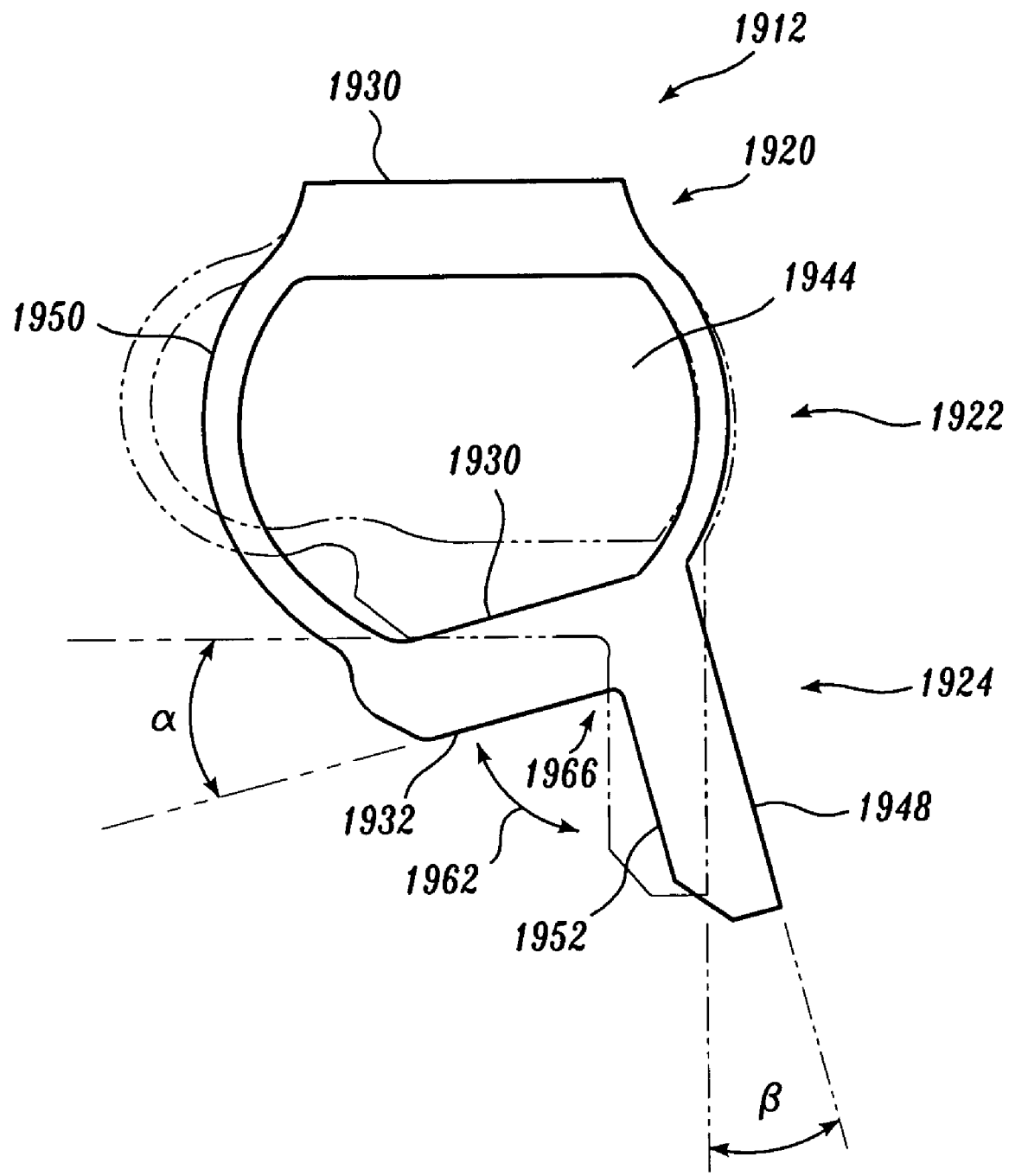
FIG. 23 depicts a cross-sectional view of an embodiment of a linear positioning member of a package holder constructed in accordance with the present invention.

Referring to FIG. 23, linear positioning member 1912 is provided. Linear positioning member 1912 includes a tray coupling region 1920 integrally formed with medial region 1922. Integrally formed with medial region 1922 on the opposing side from the tray coupling region 1920 is the divider region 1924. Tray coupling region 1920 may be generally similar to the other tray coupling regions previously disclosed. Further, medial region 1922 may be generally similar to the other medial regions disclosed previously. Specifically, medial region 1920 may be generally hollow including a longitudinal chamber 1944. The outside surface 1950 of the linear positioning member 1912 along the medial region 1922 may be generally curved to resist compression. The bottom portion of the medial region 1922 may include a nominally angled surface 1930 that may be at an angle ranging from about 10 to about 20 degrees from horizontal and preferably about 15 degrees from horizontal. The outer surface 1950 of the medial region 1922 may include a portion 1932 that is generally parallel to surface 1930 when in use. In this manner, when a package is placed against outer surface 1932, a substantially horizontal face of the package may exert an upward force on outer surface 1932 urging it upward toward tray 402. The divider region 1924 may include a downwardly projecting divider projection 1948. Divider projection 1948 may be integrally formed with the lower portion of the medial region 1922. Divider projection 1948 may form a nominal angle β ranging from about 10 to about 20 degrees and preferably about 15 degrees from vertical. In this manner, the portion of the outer surface 1932 and projection 1948 may form approximately a 90 degree angle. As the horizontal surface 1932 is pushed upwardly by a package, projection 1948 rotates or deflects in the general direction of arrow 1962. As divider projection 1948 rotates, it may bear against the side surface of package 30. In this manner, the surface 1932 may resist further upward movement of package 30 and the divider projection 1948 may resist lateral movement of the package 30.

Figure 24:
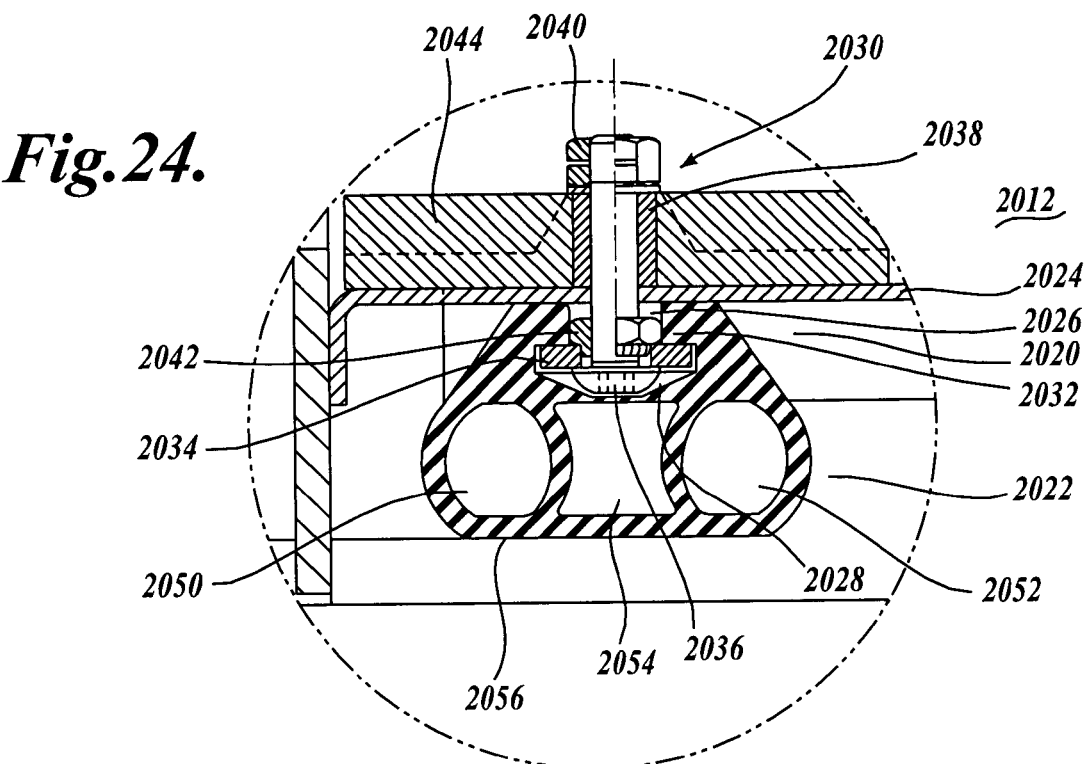
FIG. 24 is cross-sectional view of a further embodiment of a linear positioning member of a package holder constructed in accordance with the present invention.

Referring to FIG. 24, a further embodiment of the present invention is illustrated. The linear positioning member 2012 shown in this figure includes a coupling region 2020 and a resilient region 2022 disposed below the coupling region. The linear positioning member 2012 is secured to the underside of tray 2024 by a coupling assembly 2030. The coupling region 2020 includes a central entrance channel portion 2026 that extends downwardly from the upper end of the linear positioning member to intersect a wider slot 2028 that is undercut beneath shoulder portions 2032 of the positioning member coupling region 2020. The slot 2028 is sized to closely receive a retaining bar 2034 therein. The retaining bar is wider than the width of the entrance channel 2026, and thus is held captive within the slot 2028.

The linear positioning member 2012 is retained against the bottom side of the tray 2024 by the coupling assembly 2030, which includes a bolt 2036 that extends upwardly through a clearance hole formed in the retaining bar 2034 through a clearance hole formed in the tray 2024, as well as through the center of a tubular spacer 2038 to threadably engage with a locking nut 2040. A retaining nut 2042 threadably engages with the shaft portion of the bolt 2036 to hold retaining bar 2034 in place. It will be appreciated that during initial assembly, a gap exists between the upper surface of the retaining nut 2042 and the lower surface of tray 2024. However, when the locking nut 2040 is fully tightened, the shoulder portions 2032 of the coupling region 2020 are tightly clamped between the retaining bar 2034 and the perforated tray sheet 2024, until the upper surface of the nut 2042 bottoms against the tray. In this regard, please see FIG. 27. The tubular spacer 2038 has a length that corresponds to the thickness of the resilient pad 2044. It will be appreciated that by the foregoing construction the linear positioning member 2012 is securely held in place by a series of coupling assemblies 2030 spaced along the length of tray 2024. It will also be appreciated that the retaining bar 2034 may coextend with the length of the linear positioning member. Alternatively, the retaining bar 2034 could be composed of shorter lengths or individual pieces, as desired.

As shown in FIG. 24, the general shape of the linear positioning member resembles a truncated triangle that tapers outwardly in the downward direction. The resilient region 2022 of the linear positioning member is generally bulbous, and may be composed of three separate cavities, a left-hand cavity 2050 of generally circular cross-section and a right-hand cavity 2052 also of generally circular cross-section. A generally rectilinear central cavity 2054 may be positioned between the left and right cavities 2050 and 2052. It will be appreciated that the cavities 2050, 2052 and 2054 cooperatively cause the resilient region 2022 to exert a force on a package 30. One such package is placed against the outer surface 2056 of the linear positioning member 2012. The linear positioning member 2012 may be composed of flexible, compressible material in the manner of the linear positioning members discussed above. Such materials could include, for example, silicone rubber, silicone foam rubber, EPDM, polypropylene or other elastic material (for example, perfluorinated elastomer or fluorinated copolymers) that can withstand steam, steam-air, or similar environment at temperatures up to about 130° Centigrade.

It will also be appreciated that the resilient region 2022 can be constructed in other configurations without departing from the spirit or scope of the present invention. For manufacturing reasons, it is advantageous that the thicknesses of the walls comprising the cavities 2050, 2052, and 2054 are of approximately uniform thickness, though this is not absolutely essential.

Figure 25:
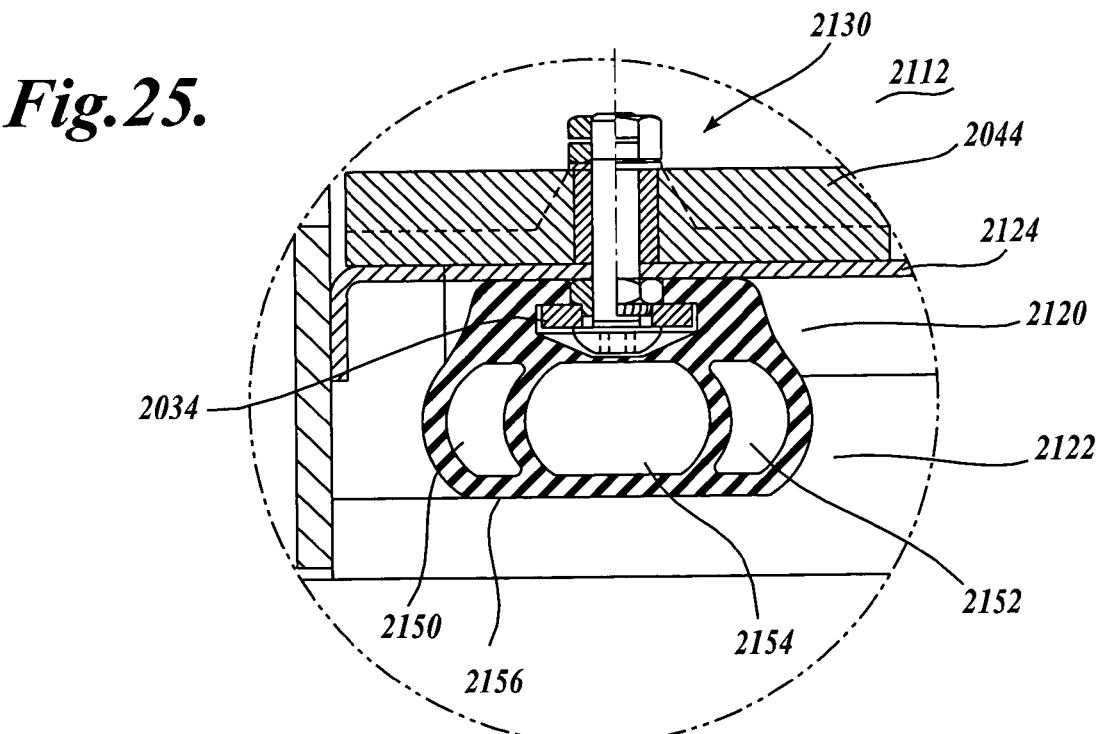
FIG. 25 is a cross-sectional view of an embodiment of a further linear positioning member of a package holder constructed in accordance with the present invention.

An example of a differently configured resilient region is shown in FIG. 25. The positioning member 2112 depicted in FIG. 25 is shaped similarly to linear positioning member 2012 but with a resilient region 2122 of somewhat different configuration. The resilient region 2122 includes a relatively large generally ovoid central cavity 2154, and relatively smaller outer cavities 2150 and 2152. With this exception of the construction of the resilient region 2122, the positioning member 2112 of FIG. 25 could be constructed very similarly to the linear positioning member 2012 of FIG. 24. In this regard, a coupling assembly 2130 is utilized to mount the positioning member 2112 to tray 2124. The coupling assembly is shown in fully tightened condition.

Figure 26:
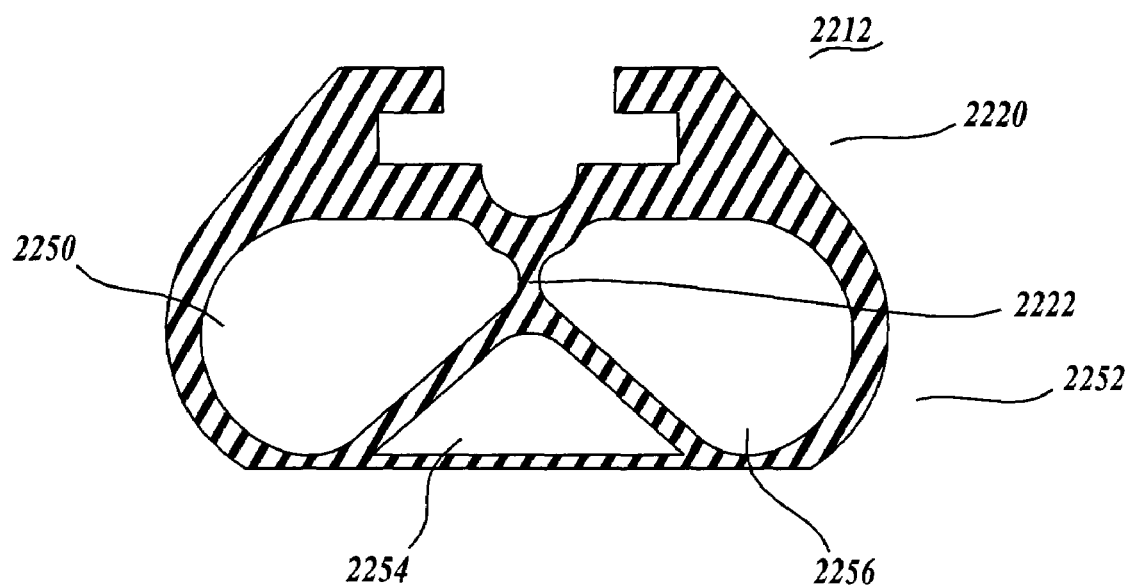
FIG. 26 is a cross-sectional view of a further embodiment of a linear positioning member of a package holder constructed in accordance with the present invention.

FIG. 26 discloses a resilient positioning member 2212 constructed somewhat similarly to positioning members 2012 and 2112. In this regard, the positioning member 2212 includes a coupling region 2220 similar to coupling regions 2020 and 2120 shown in FIGS. 24 and 25, as well as a resilient region 2222, which may be similar to resilient regions 2022 and 2122 shown in FIGS. 24 and 25.

For the embodiment of the present invention shown in FIG. 26 the coupling region 2220 of the linear positioning member 2212 may be constructed similarly to the coupling regions 2020 and 2021 of the positioning members 2012 and 2112. The resilient region 2222, however, is constructed somewhat differently than the resilient regions 2022 and 2122 of the linear positioning members 2012 and 2112. In this regard, the resilient region 2022 includes generally teardrop-shaped left-hand 2250 and right-hand 2252 hollow cavities, providing for the resilient compressibility of the linear positioning member. The cavities 2250 and 2252 may be separated by a thin medial wall 2256. The resilient region 2222 also includes a central lower, generally triangularly shaped cavity 2254 positioned beneath and between the left-hand and right-hand cavities 2250 and 2252. As in the linear positioning members 2012 and 2112, the cavities 2250, 2252 and 2254 may be formed by wall sections of substantially uniform thickness. As can be appreciated, when the linear positioning member 2212 is pressed against a container 30, the resilient region 2222 is capable of resilient deformation while applying a reactionary load against the container 30 similar to the manner of the other linear positioning members of the present invention described above. It is expected that the linear positioning member 2212 may be somewhat more stable in the side-to-side or lateral direction when deformed when pressed against a container 30 relative to the linear positioning members 2012 and 2112.

Figure 26A:
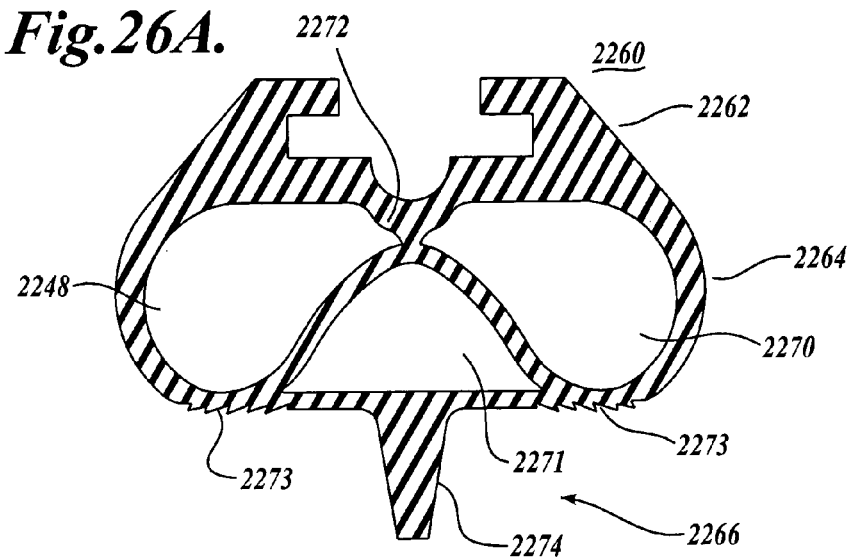
FIG. 26A is a cross-sectional view of a further embodiment of a linear positioning member constructed in accordance with the present invention.

FIG. 26A illustrates a resilient positioning member 2260 constructed somewhat similarly to positioning member 2212 shown in FIG. 26. In this regard, the positioning member 2260 includes a coupling region 2262, a resilient region 2264 and a divider region 2266. Coupling region 2262 may be constructed similarly to coupling region 2220 of linear positioning member 2260, and thus its description will not be repeated here. The resilient region 2264 is constructed somewhat differently than the resilient region 2222 of linear positioning member 2212. In this regard, the resilient region 2264 includes generally teardrop-shaped left-hand 2268 and right-hand 2270 hollow cavities, allowing for the resilient compressibility of the linear positioning member. These two cavities are separated by a central, lower, generally rounded, triangularly shaped cavity 2271. The upper apex portion of cavity 2271 intersects a nipple portion 2272 that extends downwardly from the coupling region 2262, thereby to separate the left-hand 2268 and right-hand 2270 cavities from each other. As in the linear positioning member 2220, the cavities 2268, 2270 and 2271 may be formed by wall sections of substantially uniform thickness. However, these linear position members can also be constructed with wall sections of varying thickness so as to arrive at a desired structural composition. As will be appreciated, when the linear positioning member 2260 is pressed against a container 30, the resilient region 2264 is capable of resilient deformation while applying a reactionary load against the container, similar to the manner of the other linear positioning members of the present invention, described above.

The divider region 2266 is located downwardly adjacent the resilient region 2264. As in other embodiments of the present invention described above, the divider region 2266 may include a longitudinal divider projection or lip 2273. When the linear positioning member 2260 is disposed between two packages, the lip 2273 may extend between the packages, thereby preventing the packages from contacting and possibly damaging one another. The lip 2273 may be downwardly tapered to facilitate the insertion of the lip in between the packages positioned on the previous (lower) tray when putting a new empty tray on the stack. The sloped edges of the lip 2273 may also gently urge the packages into correct position. The lip 2273 may extend along the entire length of linear positioning member 2260. Alternatively, the lip may only extend along the linear positioning member 2260 at locations where packages contact a linear positioning member.

Also, the linear positioning member 2260 may include gripping projections or ridges 2272 along a portion of the resilient region 2264 that contacts a packaging 30. The gripping projections or ridges 2273 may facilitate the gripping of the packages 30 and reduce slippage of the packages relative to the linear positioning member.

Figure 26B:
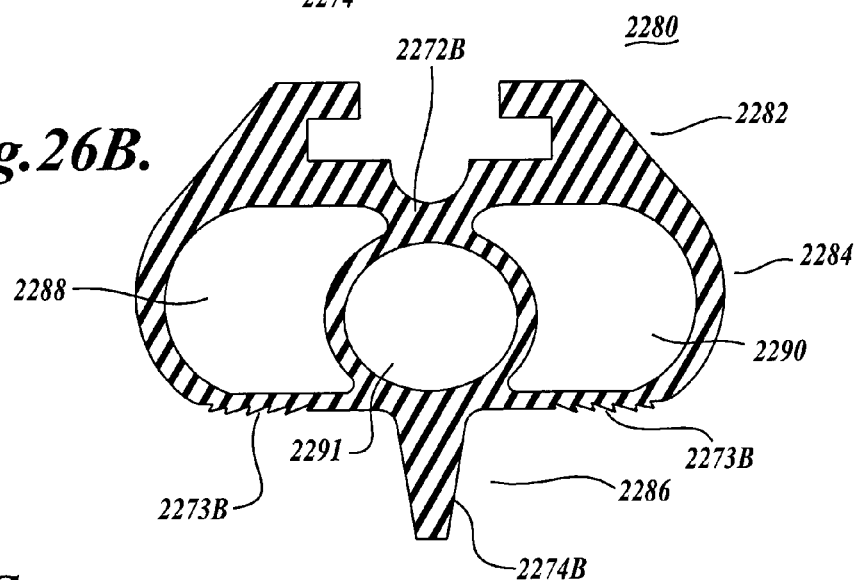
FIG. 26B is a cross-sectional view of a further embodiment of a linear positioning member constructed in accordance with the present invention.

FIG. 26B illustrates a resilient linear positioning member 2280 constructed similarly to linear positioning member 2260, described above. In this regard, the linear positioning member 2280 includes a coupling region 2282, a resilient region 2284 and a divider region 2286. The coupling region 2282 and the divider region 2286 are similar to the corresponding regions of the linear positioning member 2260, thus these regions will not be described in detail. Rather, corresponding components of these regions are given the same part number as in FIG. 26A, but with the addition of "B" suffix. The resilient region 2284 does differ somewhat from the resilient region 2264 of the linear positioning member 2260 shown in FIG. 26A. In this regard, the resilient region 2284 includes left-hand 2288 and right-hand 2290 hollow cavities extending lengthwise of the linear positioning member 2280. The upper and lower margins of such cavities are substantially parallel, whereas the outer perimeter of such cavity corresponds to the outer perimeter of the resilient region 2284. The inner perimeter of the cavities 2288 and 2290 form a portion of a circle corresponding to the diameter of a central cavity 2291 that divides the left-hand 2288 and right-hand 2290 cavities from each other. The central cavity 2291 has a diameter closely corresponding to the height of the cavities 2288 and 2290, as shown in FIG. 26B. As will be appreciated, when the linear positioning member 2280 is pressed against the container 30, the resilient region 2284 is capable of resilient deformation while applying a reactionary load against a container, similar to the manner of the other linear positioning members of the present invention as described above.

Figure 26C:
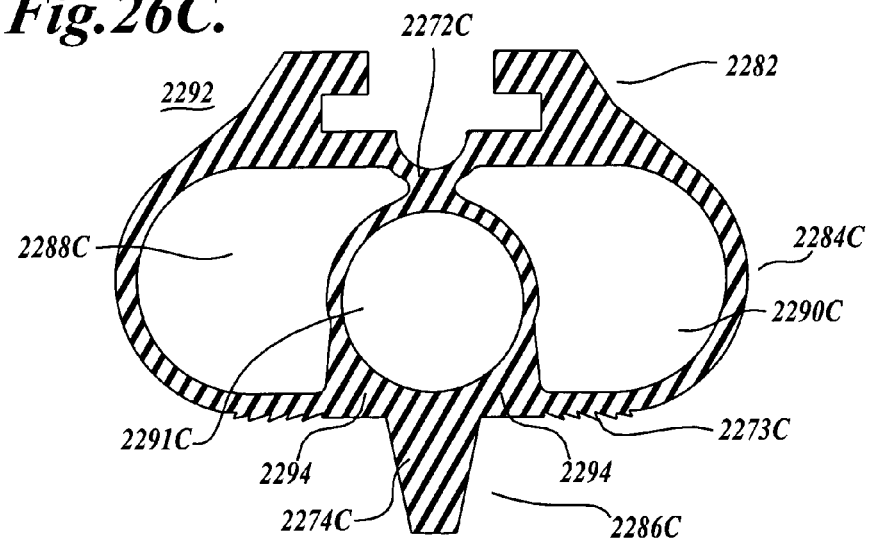
FIG. 26C is a cross-sectional view of a further embodiment of a linear positioning member constructed in accordance with the present invention.

FIG. 26C illustrates a further resilient linear positioning member 2292 constructed similarly to linear positioning member 2280, described above. In this regard, the components of the linear positioning member 2292 that are similar to that of linear positioning member 2280, shown in FIG. 26B, are given the same number as in FIG. 26B, but with a "C" suffix. Thus, as in linear positioning member 2280, the linear positioning member 2292 includes a coupling region 2282C, resilient region 2284C, and a divider region 2286C. The coupling region 2282C and divider region 2286C are similar to corresponding regions of the linear positioning member 2282. These regions will not be described in detail.

The resilient region 2284C does differ somewhat from the resilient region 2284 of the linear positioning member 2280, shown in FIG. 26B. In this regard, the lower portions of the left-hand 2288C and right-hand 2290C hull cavities, in cross-section, extend generally tangentially downwardly from the maximum outer wall diameter of the central cavity 2291C, thereby to define a thicker intersection region 2294 than in the corresponding portion of the resilient region 2284 of the linear positioning member 2280. This thicker intersection region adds a certain level of structural integrity to this portion of the linear positioning member 2292.

Figure 27:
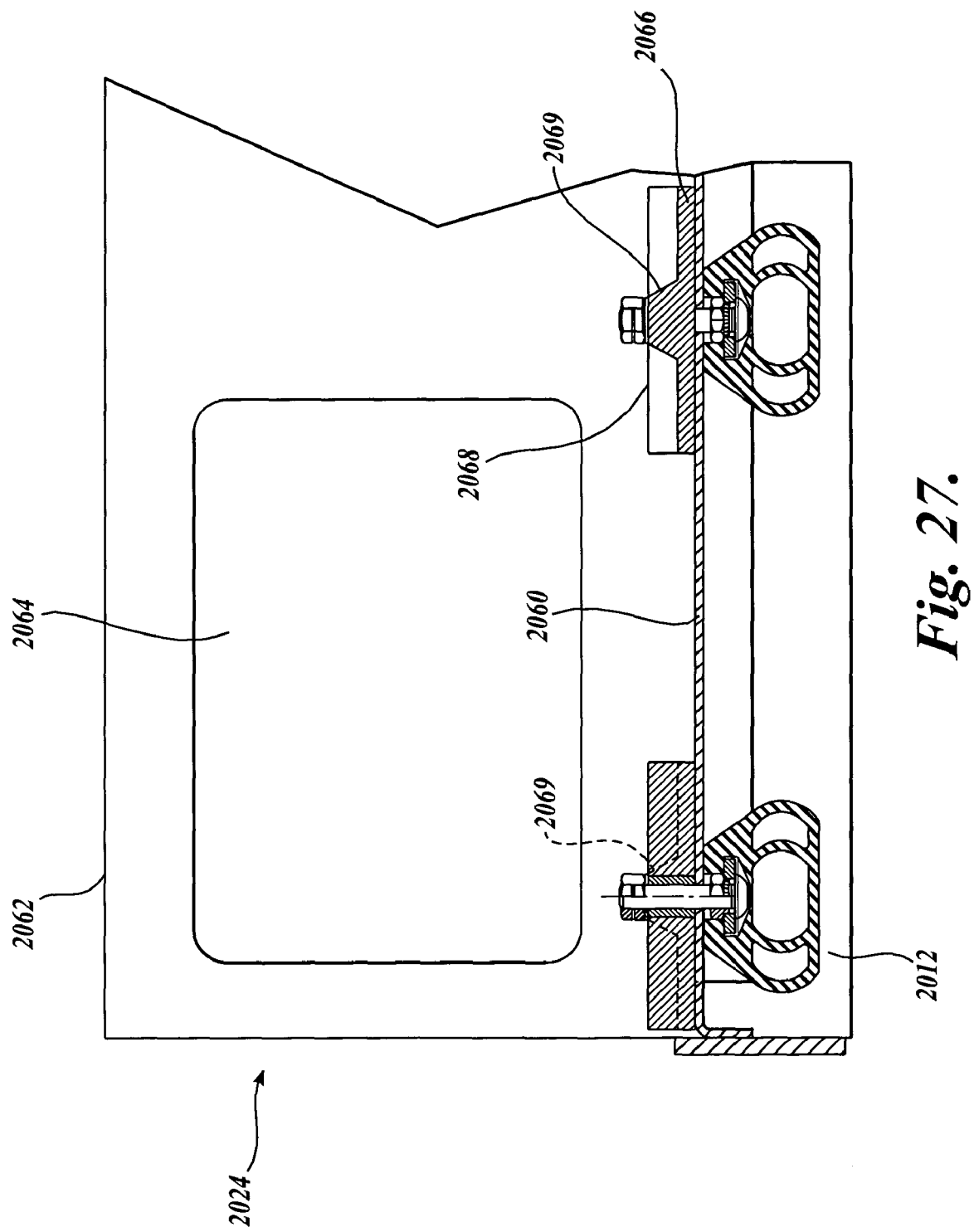
FIG. 27 is a fragmentary elevational view of a tray constructed in accordance with the present invention utilizing the linear positioning member of FIG. 25.

FIG. 27 is a fragmentary side elevational view similar to FIGS. 16C3 and 16D3 showing the linear position members 2012 (FIG. 24) installed on tray 2024. The tray 2024 includes a base, having a horizontal web 2060 and side slats 2062. As in the trays shown in FIGS. 16C3 and 16D3, the side slats 2062 may have a series of apertures 2064 formed therein to reduce the overall weight of the tray 2024.

Rather than utilizing a flexible pad over the entire web 2060, for example, flexible pad 414 shown in FIG. 16D3, the embodiment of FIG. 27 utilizes strips 2066 of flexible padding material running along the length of the linear positioning members 2012. Such strips 2066 may be composed of the same material utilized to form flexible pad 414. Use of the strips 2066 rather than a pad covering the entire area of web 2060, serves to reduce the overall weight and cost of the package holder shown in FIG. 27.

As also shown in FIG. 27, strips 2066 may include divider projections 2068 that extend upwardly above the upper surface of the strips 2066 and also extend across the width of the strips. As in divider projections 416, discussed above, the divider projections 2068 function to help retain the containers 30 in place in the direction perpendicular to the strips 2066 and also longitudinal projections 2069 in the direction of the strips 2066.

Figure 27B:
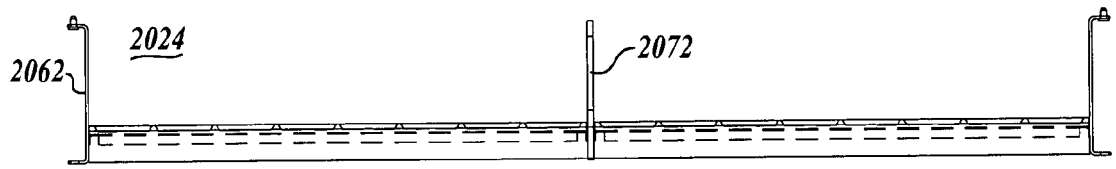
FIG. 27B is an elevational view of the tray of FIG. 27A.
Figure 27A:
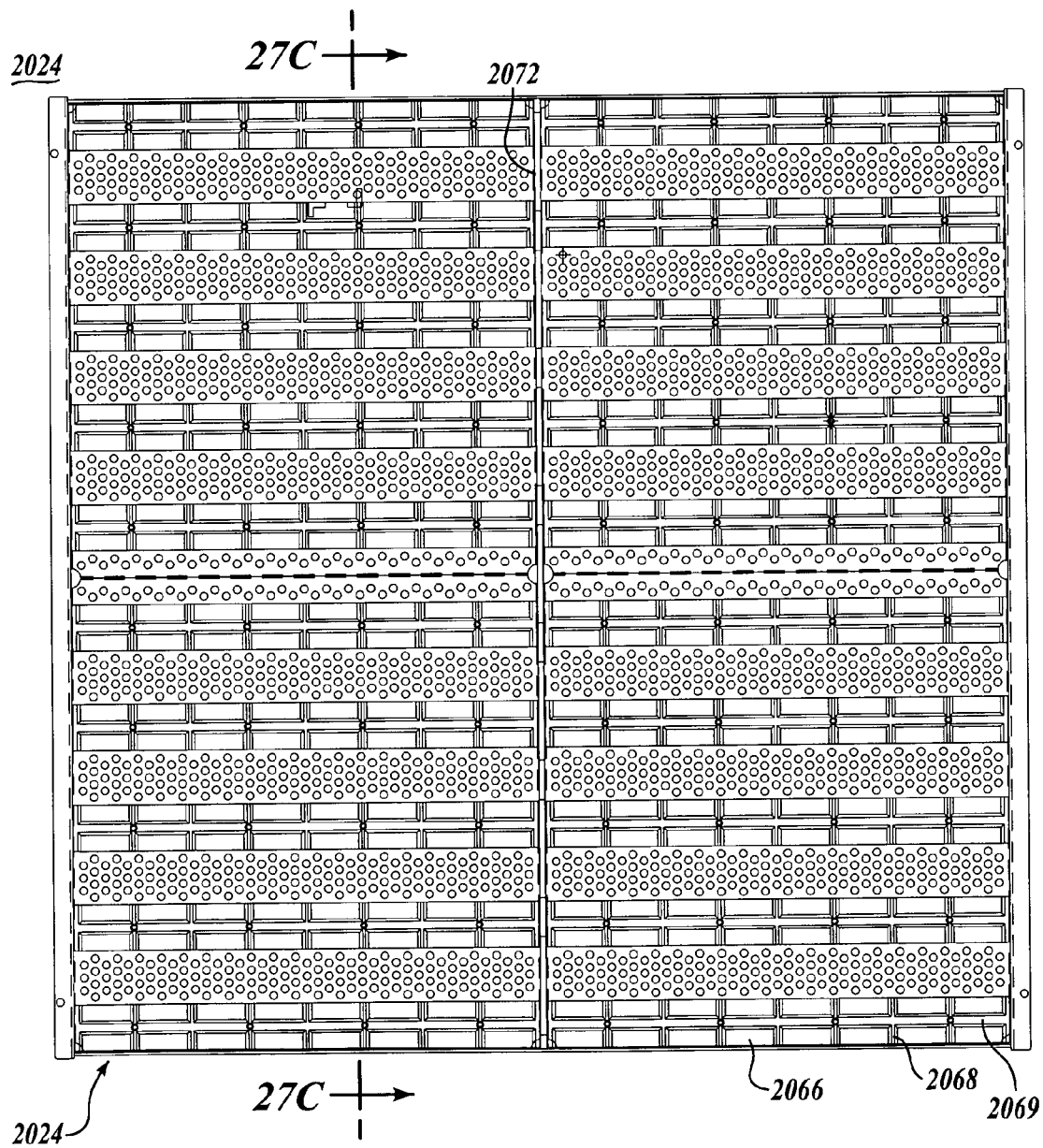
FIG. 27A is a top view of the tray corresponding to FIGS. 25 and 27.
Figure 27C:
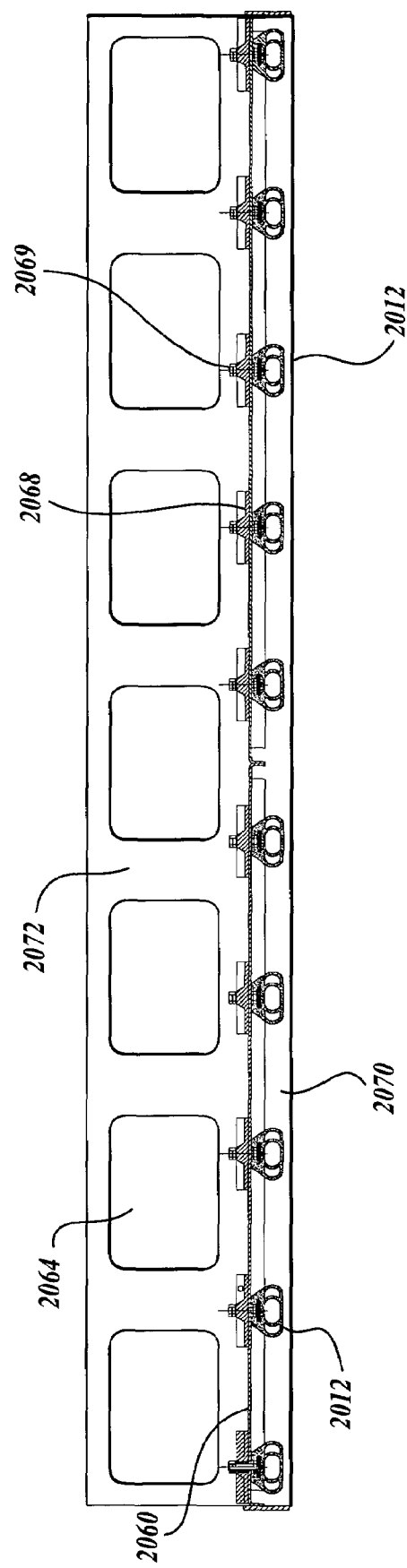
FIG. 27C is a cross-sectional view of FIG. 27A, taken substantially along lines 27C—27C thereof.

FIGS. 27A, 27B and 27C illustrate a top plan view, a side elevational view and a side cross-sectional view of the tray 2024 of FIG. 27. As will be apparent, the tray 2024 is similar in construction to the trays shown in FIGS. 16C1, 16C2, 16C3, 16D1, 16D2, and 16D3. However, one difference is that the lower flange portion 2070 shown in FIG. 27C is a continuous flange across the entire width of the tray, whereas in FIGS. 16C3 and 16D3, such flange portion is broken up into sections. As in the trays shown in FIGS. 16C1, 16C2, 16C3, 16D1, 16D2, and 16D3, the tray of FIGS. 27A, 27B and 27C utilizes a center divider stiffener 2072 that extends across the middle of the tray 2024 to add significant rigidity to the tray structure. The stiffener 2072 extends upwardly from the horizontal web 2060 to a height corresponding to the height of the side slats 2062.

Figure 29:
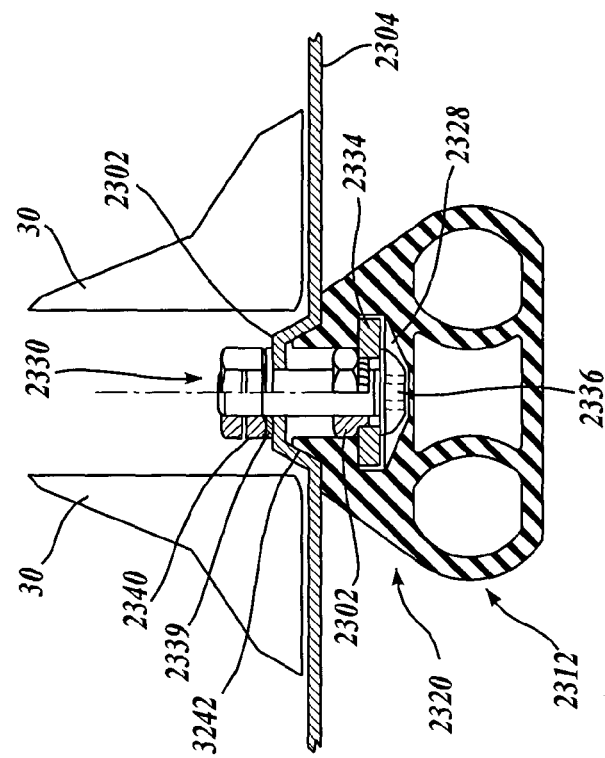
FIGS. 28 and 29 depict a further embodiment of a linear positioning member and tray construction in accordance with the present invention.
Figure 28:
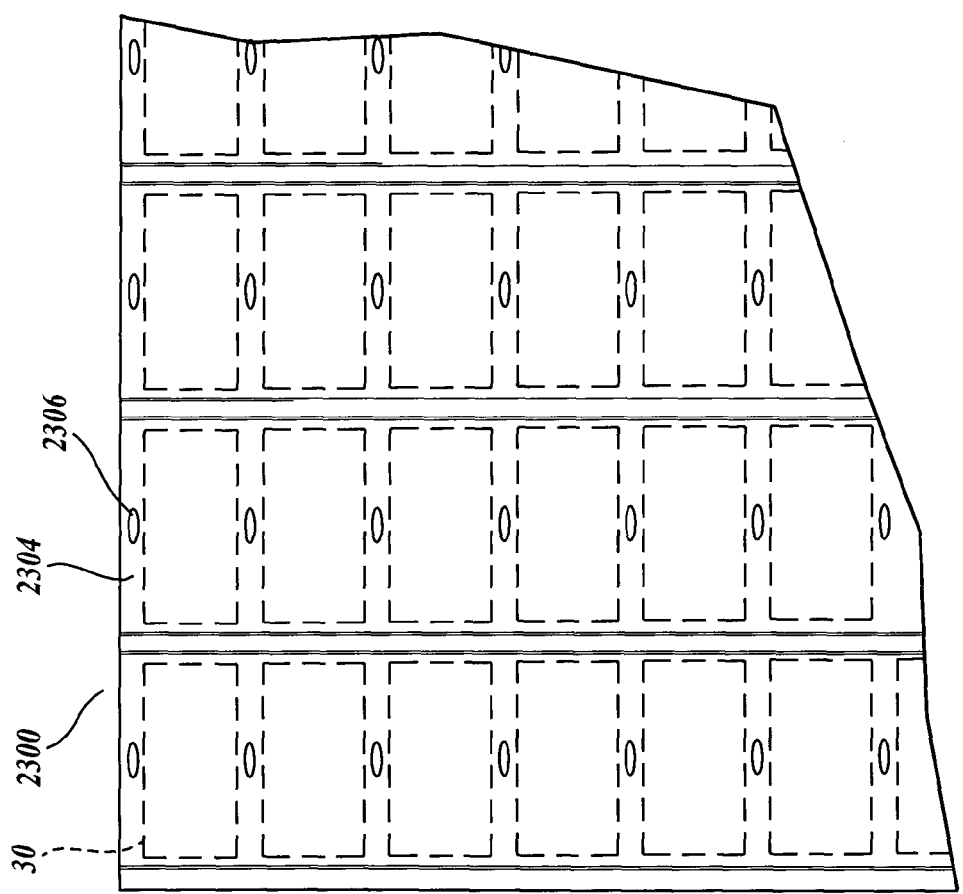

A further embodiment of the present invention is illustrated in FIGS. 28 and 29, wherein is shown a tray 2300 which may be constructed similarly to trays 404 shown in FIGS. 16C1, 16C2, 16C3, 16D1, 16D2 and 16D3. However, tray 2300 is designed to be used without the optional pad 414. In this regard, ridges 2302 are formed in the web 2304 of the tray, which web may be perforated as in the webs of trays 404 shown in FIGS. 16C2 and 16D2. The ridges 2302 serve to separate and position the packages 30 on the tray 2300 and relative to positioning member 2312. The tray web 2304 may be constructed with upwardly extending elongated dimples 2306 that function to help position packages 30 in the direction along the length of ridges 2302, performing a function similar to divider projections 416, discussed above. The dimples 2306 may be formed by deforming the material comprising web 2304 in the upward direction in a manner well known in the art.

The positioning member 2312 may be attached to the underside of web 2304 utilizing a coupling assembly 2330 similar to coupling assemblies 2030 and 2130, discussed above with respect to FIGS. 24 and 25. In this regard, the coupling assembly 2330 may utilize a retaining bar 2334 held captive within slot 2328 by a bolt 2336 and a retaining nut 2342. The bolt extends through a clearance hole formed in ridge 2302 to engage with a washer 2339 and a lock nut 2340. As apparent, the linear positioning member 2312 is constructed similarly to the linear positioning member 2012 shown in FIG. 24, with the exception that a tapered shoulder 2342 is formed in the distal upper end portion of coupling region 2320 to match the corresponding profile of the underside of ridges 2302 whereby the linear positioning member 2312 mates snugly with the underside of the ridges 2302.

Figure 31:
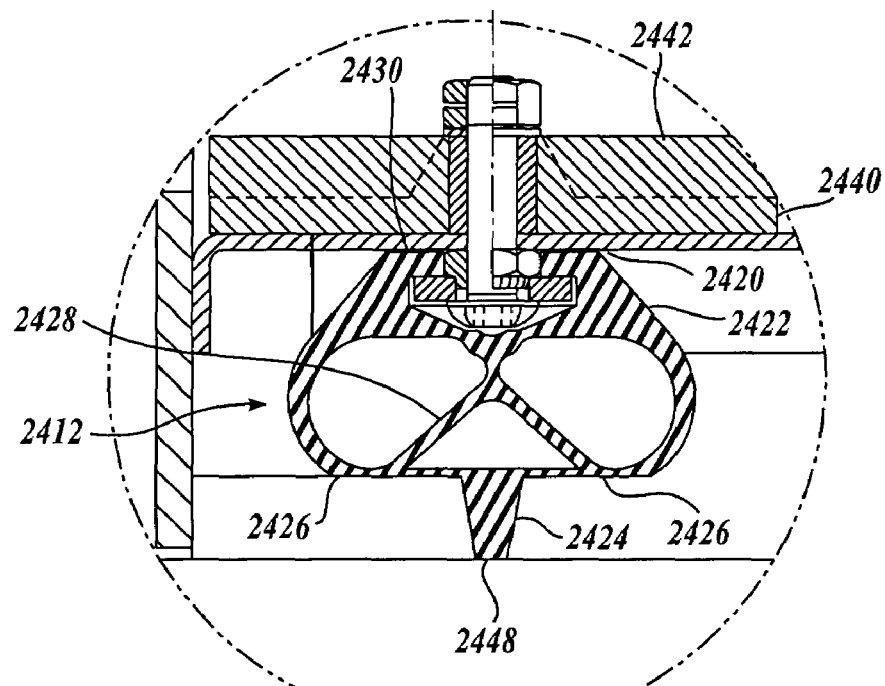
FIG. 31 is a fragmentary elevational view of FIG. 30.
Figure 30:
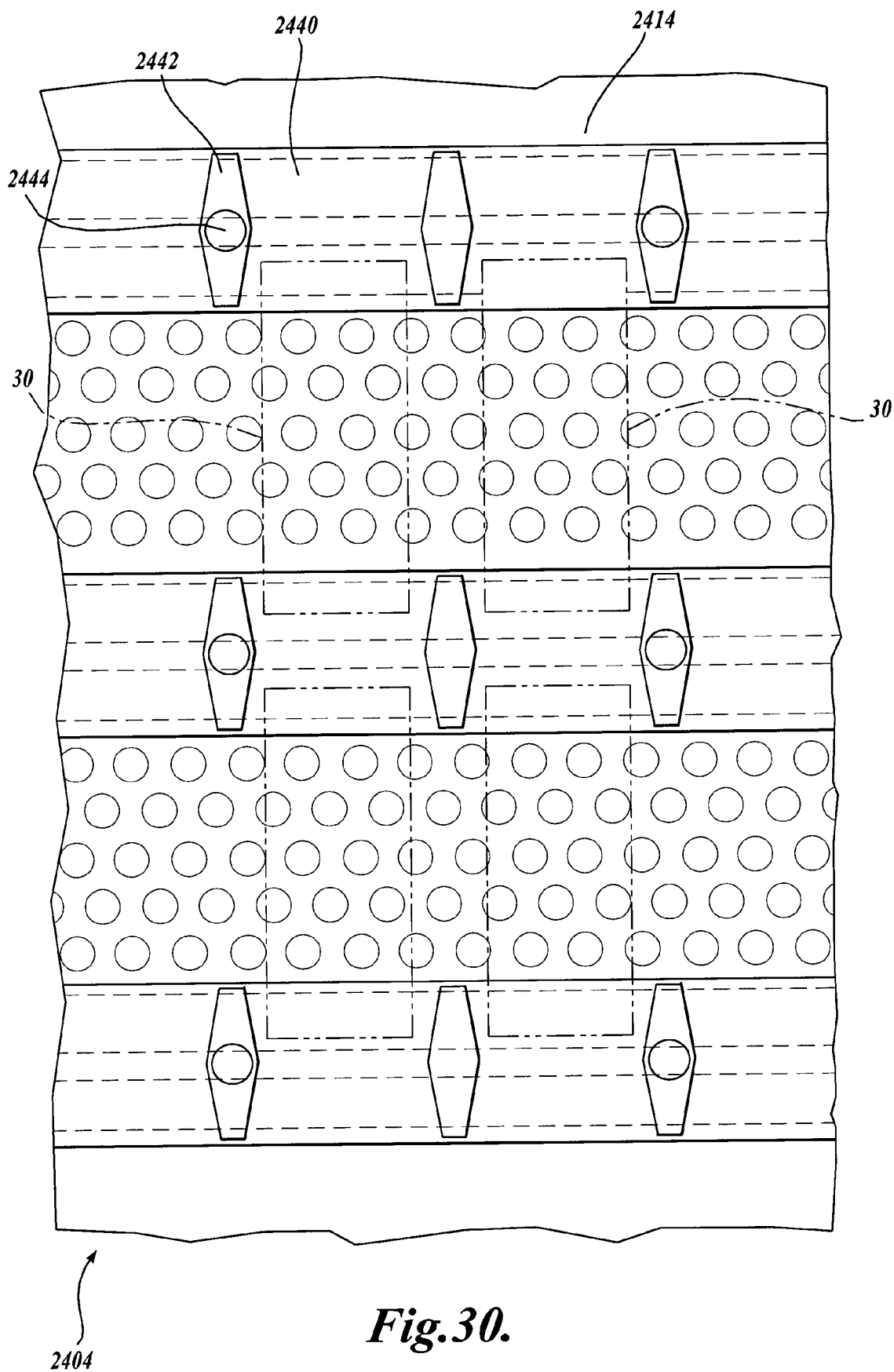
FIG. 30 is a partial plan view of a portion of a tray and linear positioning member of a further embodiment of the present invention.

FIGS. 30 and 31 depict a further embodiment of the present invention, wherein a linear positioning member 2412 is mounted to the underside of the web portion 2414 of tray 2404. As in the other linear positioning members of the present invention described above, the linear positioning member 2412 includes a coupling region 2420 adjacent the underside of web-portion 2414, a medial region 2422 designed to press against the top surfaces of container 30 and which is resiliently deformable, and a lower divider region 2424 which serves to retain the containers 30 in a desired position on the tray 2404. Referring specifically to FIG. 31, the coupling region 2420 and the medial region 2422 of the linear positioning member 2412 may be essentially the same as in FIG. 26, and thus the components of these regions are given the same part numbers as in FIG. 26, but with the addition of a prime designation.

The linear positioning member 2412, as noted above, also includes a divider region 2424, which may be similar in construction to the divider region 424 shown in FIG. 14, whereby the divider region 2424 also includes a downwardly projecting member or lip 2448 that extends between adjacent packages 30 to prevent the packages from contacting each other and possibly damaging each other. The lip 2448 may be tapered in a downward direction to facilitate the loading of packages onto the trays 2404. The sloped edges of the lip 2448 may also gently urge the packages into proper position. As shown in FIG. 30, the lip may extend longitudinally along the linear positioning member 2412 coextensive with the length of the medial region 2422.

As in the embodiment shown in FIG. 27, the tray 2404 may include resilient strips 2440 that overlie the tray web 2414. The resilient strips 2440 may be used in lieu of utilizing a full coverage mat to overlie the tray medial portion 2414. Also as in FIG. 27, the resilient strip 2440 includes upwardly extending divider projections 2442 extending transversely across the strip 2440 and spaced apart to coincide with the width of the containers 30. As shown in FIG. 30, the divider projections 2442 are tapered toward their extremities so as to serve as guides for positioning the packages 30 between two adjacent projections or ridges. Moreover, clearance holes 2444 are formed in all or part of the ridges 2442 for reception of hardware members or other means used to affix the strips to the tray 2404 and also to mount the linear positioning members 2412 in place beneath the tray web 2414 using hardware members or other convenient means. It will be appreciated that the present invention shown in FIGS. 30 and 31 provides the same significant advantages provided by the other embodiments of the present invention discussed above.

FIGS. 32 and 33 depict a further embodiment of the present invention wherein a positioning system 2500 is illustrated as including a resilient upper holder 2502 that is attached to the underside of a web portion 2504 of tray 2506.

The holder 2502 corresponds to the shape of the adjacent face or wall of container 30 which is held in place between upper tray 2506 and lower tray 2508 through the holder 2502. The holder 2502 is formed with an upwardly extending recess 2510 that is shaped to closely correspond to the shape of the adjacent face or surface of the container 30. Such recess 2510 is defined by an outer rim portion 2512 that extends around the perimeter of the holder 2502. The inside edge 2514 of the rim portion 2512 is flared outwardly in a downward direction so as to serve as a guide or lead-in for the adjacent surface of the package 30.

The holder 2502 may be made from resilient deformable material which is capable of applying a load against the adjacent surface of the container 30 when the upper tray 2506 is lowered in place over the lower tray 2508. Of course, if trays 2506 and 2508 can be constructed with sufficient precision, it may not be necessary to construct the holder 2502 from resilient material; rather, the holder could be constructed from non-resilient material or material that is only slightly resilient. It will be appreciated that by this construction the holder 2502 is capable of retaining the containers 30 securely in place without requirement of a holding mechanism on the opposite side of container 30 or even guides or dividers for the lower tray 2508 in a manner of, for example, ridges 2302 or elongated dimples 2306 shown in FIGS. 28 and 29.

FIGS. 32 and 33 illustrate the holder 2502 as used in conjunction with a singular container 30. However, holders similar to 2502 may be of larger size and configured to hold several packages 30 in place at the same time. Such larger holder might be formed with multiple cavities similar to 2510 for closely receiving the adjacent surface of the package 30. Such cavities may be separated by dividers similar to dividers 2512 shown in FIGS. 32 and 33.

Figure 34:
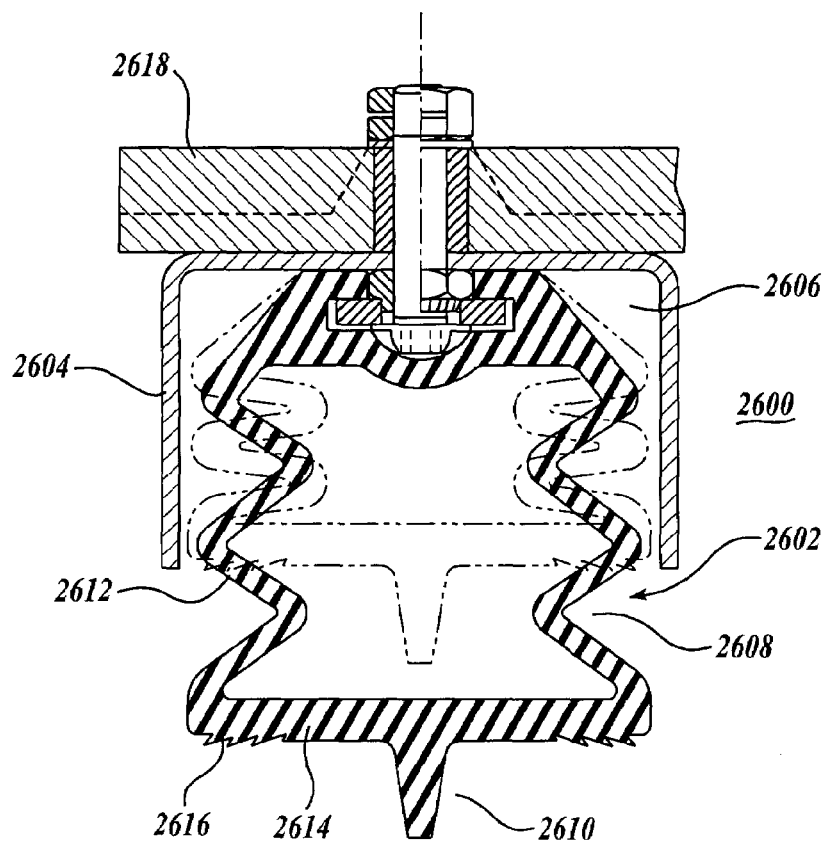
FIG. 34 is a cross-sectional fragmentary view of a further embodiment of the present invention.

FIG. 34 depicts a further embodiment of the present invention, wherein a positioning system 2600 is illustrated as including a resilient positioning member 2602 disposed within a restraining member 2604. The linear positioning member 2602, as in other embodiments of the present invention described above, may include a coupling region 2606, a resilient region 2608 and a divider region 2610. The coupling region 2606 and divider region 2610 may be similar to the corresponding regions of other linear positioning members of the present invention, for instance, as shown in FIGS. 26A and 26B, thus the construction of these regions of the resilient positioning member 2602 will not be repeated here.

The resilient region 2608 may be constructed in the form of bellows having corrugated-shaped sidewalls 2612 and a substantially flat bottom wall 2614. Grouping projections or ridges 2616 may be provided along the lower surface of the resilient region 2608. As in other embodiments of the present invention, such projections or ridges help to securely grip the package 30.

The restraining member 2604 may be generally U-shaped, having a web portion that is sandwiched between the upper surface of the coupling region 2606 and the underside of tray 2618. The restraining member 2608 also includes side flanges that are positioned closely outwardly of the bellows sidewalls 2612. In use, when the linear positioning member 2602 is pressed against a container, the resilient region 2608 is capable of retracting into the restraining member 2604, while applying a reactionary load against the containers being held, similar to the manner of the other linear positioning members of the present invention described above. Moreover, the restraining member serves to provide lateral stability to the linear positioning member. Although not shown, the distal lower ends of the side flanges of the restraining member may be bent outwardly so as to define a "lead-in" for the sidewalls 2612 of the linear positioning member. As another aspect of the present invention, when the linear positioning member is fully retracted, preferably the lower surface of the resilient region will extend downwardly slightly below the lower edges of the restraining member flanges so that such flanges do not contact or damage the container 30 being held in place. As will be appreciated, the positioning system 2600 shown in FIG. 34 provides the same advantages provided by the other linear positioning members of the present invention described above.

Figure 35:
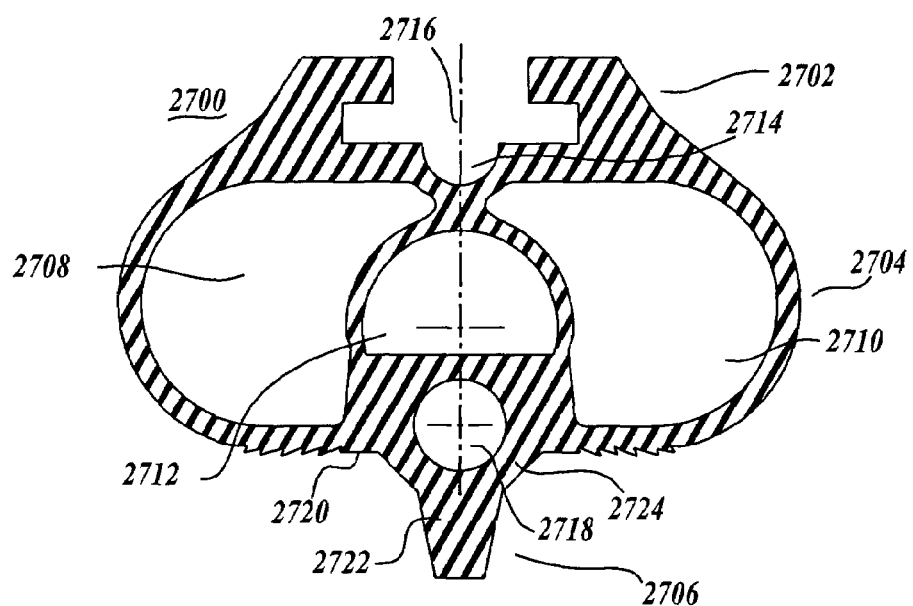
FIG. 35 is a cross-sectional view of a further embodiment of a linear positioning member constructed in accordance with the present invention.

FIG. 35 illustrates a further resilient, linear positioning member 2700 constructed in accordance with the present invention. Linear positioning member 2700 is constructed similarly to several of the other linear positioning members described above, including those illustrated in FIGS. 26A, 26B and 26C. In this regard, the linear positioning member 2700 includes a coupling region 2702, a resilient region 2704, and a divider region 2706. The coupling region 2702 is similar to the coupling region 2284 corresponding to the linear positioning member 2280 shown in FIG. 26B, thus this region will not be described in detail. The resilient region 2704 does differ somewhat from the resilient regions of the linear positioning members shown in FIGS. 26A, 26B and 26C. In this regard, the resilient region 2704 includes left-hand (2708) and right-hand (2710) hollow cavities extending lengthwise of the linear positioning member. The upper and lower margins of such cavities are substantially parallel, whereas the outer perimeter of such cavities correspond to the outer perimeter of the resilient region 2704 and are generally semi-circular in shape. The upper portion of the inner perimeter of the cavities 2708 and 2710 form a portion of the generally semi-circular central cavity 2712 that separates the corresponding portion of the left-hand 2708 and right-hand 2710 cavities from each other. The left-hand 2708, right-hand 2710 and central 2712 cavities intersect above the central cavity 2712 beneath a nipple portion 2714 that extends downwardly from the rail channel 2716.

The section of the coupling region 2704 located below central cavity 2712 is essentially solid in structure with the exception of a central hole 2718 extending therethrough. The bottom of the through-hole 2718 is actually below the elevation of the exterior lower surface 2720 of the resilient region, and thus extends downwardly into the divider region 2706. As in several of the other embodiments of the present invention described above, the divider region 2706 may include a longitudinal divider projection or lip 2722 that extends along the length of the linear positioning member 2700. When the linear positioning member 2700 is disposed between two packages, the lip 2722 may extend between the packages, thereby preventing the packages from contacting and possibly damaging one another. The lip 2722 may be downwardly tapered to facilitate the insertion of a lip in between the packages positioned on a below-located tray when putting a new empty tray on top thereof. The sloped edges of the lip 2722 may also gently urge the packages into correct position. The intersection between the sides of the lip 2722 and the bottom surface 2720 of the resilient region is in the form of a diagonal fillet 2724, which fillet also defines the wall section for the adjacent portion of the circular through-hole 2718.

FIGS. 36 and 37 illustrate the linear positioning member 2700 mounted on a tray 2730. As in the other trays of the present invention described above, the tray 2730 includes a base having a horizontal web 2732 and side slats 2734. The tray also includes a central support flange 2736 which helps to increase the rigidity of the tray 2730.

The linear positioning member 2700 is illustrated as mounted to the underside of the web 2732 in the same manner as the mounting of other linear positioning members of the present invention, for instance see FIG. 31. As also shown in FIGS. 36 and 37, a restraining bar 2740 may extend through the close-fitting circular through-hole 2718 formed in the linear positioning member 2700. Vertical slots 2742 are formed in the slats 2734 as well as in the central flange 2736 to allow for vertical movement of the rod 2740 as the linear positioning member 2700 may be compressed, for example, when pressing against the adjacent portion of a package. However, the slots 2742 are sufficiently narrow to not allow significant side to side motion of the rod 2740. The rod is held captive within circular opening 2718 by an enlarged circular section 2744 that has an outer diameter which is larger than the diameter of the circular through-hole 2718. Thus, the rod 2740 is only allowed movement along its length corresponding to the difference between the length of the gap 2746 between adjacent end portions of the linear positioning members 2700 and the length of the enlarged section 2744. Such movement is not sufficient to permit the ends of the rod 2740 to disengage from slat slots 2742.

It will be appreciated that through the present invention, the resilient positioning members 2700 are able to exert a load on containers, such as container 30, by the upward compression of the linear positioning members. At the same time, the linear positioning members are laterally stabilized by rod 2740, which in turn minimizes the lateral movement of the containers being held in place by the linear positioning member 2700.

It is apparent to those of ordinary skill in the art that while discrete embodiments of linear positioning members have been provided that many of the features presented with each embodiment may in fact be combined with other embodiments. For example, the divider regions of linear positioning members 19A–19C and 20 may be readily adapted to serve as support members for the side faces of the packages that they extend between. Particularly, the divider regions may be widened or the angle of their taper lessened so that a larger portion of the divider projection rests against the side surfaces of the adjacent packages. In this manner the side surfaces of the packages are supported, and flexing of the faces of the packages is limited by the divider projections. It is further apparent to those of ordinary skill in the art that such modified divider projections may be included on any of the embodiments disclosed herein. In particular, these modified divider projections may be included on the embodiments depicted in FIGS. 14 and 17.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for substantially retaining the position of a plurality of packages between a first and second tray inside the drum of an agitating retort when the agitation process is applied to the plurality of packages, the apparatus comprising:
   (a) a first positioning system for holding the plurality of packages in a desired position wherein the first positioning system is associated with one or both of the first and second trays;
   (b) the first tray stacked on the second tray;
   (c) a volume is formed between the first and second trays when the first tray is stacked on the second tray;
   (d) wherein the first positioning system is located within the volume, and the plurality of packages are positioned between the first positioning system and one or both of the first and second trays within the volume;
   (e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and
   (f) wherein the first positioning system for holding the plurality of packages in a desired position comprises at least one bellows member.

2. The apparatus of claim 1, wherein the first positioning system further comprises at least one restraining structure acting on the at least one bellows for restricting the lateral movement of the at least one bellows member.

3. The apparatus of claim 2, wherein the at least one restraining structure disposed laterally adjacent the at least one bellows for restricting the lateral movement of the at least one bellows member.

4. An apparatus for substantially retaining the position of a plurality of packages between a first and second tray inside the drum of an agitating retort when the agitation process is applied to the plurality of packages, the apparatus comprising:
   (a) a first positioning system for holding the plurality of packages in a desired position wherein the first positioning system is associated with one or both of the first and second trays;
   (b) the first tray stacked on the second tray;
   (c) a volume is formed between the first and second trays when the first tray is stacked on the second tray;
   (d) wherein the first positioning system is located within the volume, and the plurality of packages are positioned between the first positioning system and one or both of the first and second trays within the volume;
   (e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and
   (f) wherein the first positioning system for holding the plurality of packages in a desired position comprises a contoured pad, said contoured pad comprising divider projections extendable between the packages to separate the packages from one another.

5. The apparatus of claim 4, wherein the contoured pad comprises recesses formed between the divider projections, said recess being sized to receive the packages therein.

6. An apparatus for substantially retaining the position of a plurality of packages between a first and second tray inside the drum of an agitating retort when the agitation process is applied to the plurality of packages, the apparatus comprising:
   (a) a first positioning system for holding the plurality of packages in a desired position wherein the first positioning system is associated with one or both of the first and second trays;
   (b) the first tray stacked on the second tray;
   (c) a volume is formed between the first and second trays when the first tray is stacked on the second tray;

(d) wherein the first positioning system is located within the volume, and the plurality of packages are positioned between the first positioning system and one or both of the first and second trays within the volume;

(e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and (f) wherein the first positioning system further comprising a restraining structure acting on the linear positioning member to restrict the lateral movement of the linear positioning member.

7. The apparatus of claim 6, wherein the restraining structure is positioned alongside the linear positioning member, wherein the restraining member bears against the linear positioning member upon sufficient lateral movement of the linear positioning member thereby to restrict the lateral movement of the linear positioning member.

8. The apparatus according to claim 6, wherein the restraining structure extends through portions of the linear positioning member to restrict the lateral movement of the linear positioning member.

9. An apparatus for substantially retaining the position of a plurality of packages between a first and second tray inside the drum of an agitating retort when the agitation process is applied to the plurality of packages, the apparatus comprising:

(a) a first positioning system for holding the plurality of packages in a desired position wherein the first positioning system is associated with one or both of the first and second trays;

(b) the first tray stacked on the second tray;

(c) a volume is formed between the first and second trays when the first tray is stacked on the second tray;

(d) wherein the first positioning system is located within the volume, and the plurality of packages are positioned between the first positioning system and one or both of the first and second trays within the volume;

(e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and (f) wherein the linear positioning member comprises at least one longitudinal chamber that is at least partially collapsible when bearing against the plurality of packages.

10. The apparatus of claim 9, wherein the linear positioning member comprises at least two longitudinal chambers wherein one longitudinal chamber is located adjacent one of two adjacent packages and the other longitudinal chamber is located adjacent the other of the two adjacent packages.

11. The apparatus of claim 9, wherein the linear positioning member comprises at least three longitudinal chambers wherein a first longitudinal chamber is located adjacent one of two adjacent packages and a second longitudinal chamber is located adjacent the other of the two adjacent packages and the third longitudinal chamber is located between the first and second longitudinal chambers.

12. An apparatus for substantially retaining the position of a plurality of packages between a first and second tray inside the drum of an agitating retort when the agitation process is applied to the plurality of packages, the apparatus comprising:

(a) a first positioning system for holding the plurality of packages in a desired position wherein the first positioning system is associated with one or both of the first and second trays;

(b) the first tray stacked on the second tray;

(c) a volume is formed between the first and second trays when the first tray is stacked on the second tray;

(d) wherein the first positioning system is located within the volume, and the plurality of packages are positioned between the first positioning system and one or both of the first and second trays within the volume; and (e) wherein packages of the plurality of packages are arranged in a plurality of rows and the first positioning system for holding the plurality of packages in a desired position comprises a linear positioning member positioned along the first tray within the volume at a location between two adjacent rows of packages of the plurality of rows, wherein the linear positioning member is coupled to the first tray and bears against the packages of both of the adjacent rows of the plurality of rows.

13. The apparatus of claim 12, wherein the linear positioning member is positioned along the first tray within the volume at a location between pairs of neighboring rows of packages of the plurality of rows.

14. An apparatus for substantially retaining the position of a plurality of packages between a first and second tray inside the drum of an agitating retort when the agitation process is applied to the plurality of packages, the apparatus comprising:

(a) a first positioning system for holding the plurality of packages in a desired position wherein the first positioning system is associated with one or both of the first and second trays;

(b) the first tray stacked on the second tray;

(c) a volume is formed between the first and second trays when the first tray is stacked on the second tray;

(d) wherein the first positioning system is located within the volume, and the plurality of packages are positioned between the first positioning system and one or both of the first and second trays within the volume;

(e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and (f) wherein the first positioning system for holding the plurality of packages in a desired position comprises:

(i) a contoured pad positionable against at least one of the plurality of packages;

(ii) a substantially rigid pad adjacent the contoured pad; and (iii) a first plurality of resilient members disposed between the first tray and the rigid pad.

15. The apparatus of claim 14, wherein the contoured pad comprises a plurality of divider projections extending between the packages of the plurality of packages to separate the packages of the plurality from one another.

16. The apparatus of claim 14, wherein the substantially rigid pad is generally planar, and the first plurality of resilient members are disposed between the first tray and the substantially rigid pad along at least the perimeter of the rigid pad.

17. The apparatus of claim 14, wherein
(a) a recess is formed along at least one edge of the volume between the first tray and the second tray, and
(b) the first positioning system comprises a second plurality of resilient members disposed within the at least one recess and arranged between the recess and the rigid pad.

18. The apparatus of claim 17, wherein the recess comprises a pair of ledges projecting from the recess wherein a portion of the rigid pad is received between the pair of ledges.

19. The apparatus of claim 17, wherein the second plurality of resilient members are positioned along the opposite side of the rigid pad from the first plurality of resilient members.

20. A package clamping apparatus for inserting into a drum of an agitating retort and clamping a plurality of packages during application of an agitation process, the package clamping apparatus comprising:
(a) a first tray comprising a package receiving section;
(b) a first positioning assembly extending along the package receiving section of the first tray; and
(c) a second tray comprising a package receiving section;
(d) wherein the first tray is stackable on the second tray so that the package receiving sections of the first and second tray define a package receiving volume therebetween;
(e) the first positioning assembly nominally disposed within the package receiving volume and acting between the first and second trays; and
(f) the plurality of packages are substantially clamped within the receiving volume and constrained in position during agitation of the contents of the packages by the first positioning assembly.

21. The apparatus of claim 20, wherein the plurality of packages are substantially composed of paperboard.

22. The apparatus of claim 20, comprising a second positioning assembly disposed between the package receiving section of the second tray and the plurality of packages.

23. The apparatus of claim 22, wherein the second positioning assembly comprises a resilient material disposed between the package receiving section of the second tray and the plurality of packages.

24. The apparatus of claim 23, wherein the resilient material comprises a resilient pad positioned between the package receiving section of the second tray and the plurality of packages.

25. The apparatus of claim 24, wherein said resilient pad comprises divider projections extending between the packages of the plurality to separate the packages of the plurality from one another.

26. The apparatus of claim 23, wherein the resilient material is composed of strips disposed between the package receiving section of the second tray and the plurality of packages.

27. The apparatus of claim 26, wherein said resilient material strips comprise divider projections extending between the packages of the plurality to separate the packages of the plurality from one another.

28. The apparatus of claim 22, wherein the second positioning assembly comprises a contoured pad disposed between the first tray and the plurality of packages, said contoured pad comprising divider projections extending between the packages of the plurality to separate the packages of the plurality from one another.

29. The apparatus of claim 28, wherein the contoured pad comprises recesses formed between the divider projections, said recesses being sized to receive one of the packages of the plurality of packages.

30. The apparatus of claim 20, wherein the second positioning assembly comprises the deck of the second tray and divider projections extending upwardly from the deck at locations between the packages to locate the packages relative to each other.

31. The apparatus of claim 30, wherein the divider projections are integrally constructed as part of the deck.

32. The apparatus of claim 30, wherein the divider projections are formed by deforming portions of the deck.

33. The apparatus of claim 20, wherein the first positioning assembly comprises a resilient member disposed between the package receiving section of the first tray and at least one package of the plurality of packages.

34. The apparatus of claim 33, wherein the first positioning assembly further comprises a restraining structure acting on the resilient member to restrict the lateral movement of the resilient member.

35. The apparatus of claim 34, wherein the first positioning assembly further comprises a restraining structure positioned alongside the resilient member to abut against a resilient member upon sufficient lateral movement of the resilient member, thereby to limit the lateral movement of the resilient member.

36. The apparatus of claim 34, wherein the restraining structure extends through the interior of at least a portion of the resilient member thereby to limit the lateral movement of the resilient member.

37. The apparatus of claim 20, wherein the first positioning assembly comprises a spring disposed between the package receiving section of the first tray and at least one package of the plurality of packages.

38. The apparatus of claim 20, wherein the first positioning assembly comprises at least one spring and a pad wherein the pad is positionable against at least one package of the plurality of packages and the at least one spring is disposed between the package receiving section of the first tray and the pad.

39. The apparatus of claim 20, wherein the first positioning assembly comprises at least one bellows member disposed between the package receiving section of the first tray and at least one package of the plurality of packages.

40. The apparatus of claim 20, wherein the first positioning assembly comprises a corrugated pad disposed between the package receiving section of the first tray and at least one package of the plurality of packages.

41. The apparatus of claim 20, wherein the first positioning assembly comprises a contoured pad disposed between the package receiving section of the first tray and the plurality of packages, said contoured pad comprising divider projections extending between the packages of the plurality to separate the packages of the plurality from one another.

42. The apparatus of claim 41, wherein the contoured pad comprises recesses formed between the divider projections, said recesses being sized to receive the packages of the plurality of packages.

43. The apparatus of claim 20, wherein the first positioning assembly comprises a linear positioning member positioned along the package receiving section of the first tray within the volume at a location between two adjacent packages of the plurality of packages, wherein the linear positioning member is coupled to the first tray and is positionable against the packages of the plurality of packages.

44. The apparatus of claim 43, wherein the first positioning assembly further comprises a restraining member acting on the linear positioning member to limit the lateral movement of the linear positioning member.

45. The apparatus of claim 44, wherein a restraining member extending along the linear positioning member, whereupon sufficient lateral movement of the linear positioning member, said linear positioning member abutting against the restraining member, thereby to limit the lateral movement of the linear positioning member.

46. The apparatus of claim 44, wherein the restraining member extending through the interior of the first positioning member, thereby to limit the lateral movement of the linear positioning member.

47. The apparatus of claim 43, wherein the linear positioning member is constructed from a material selected from a group including extruded silicon, silicon rubber, silicon foam rubber, EPDM, polypropylene and elastomeric material.

48. The apparatus of claim 43, wherein the linear positioning member comprises at least one longitudinal chamber that is at least partially collapsible when bearing against the plurality of packages.

49. The apparatus of claim 48, wherein the first positioning member further comprising a restraining structure to limit the lateral movement of the linear positioning member when bearing against the plurality of packages.

50. The apparatus of claim 49, wherein the restraining structure extending along the longitudinal chamber of the linear positioning member whereby upon sufficient lateral movement of the longitudinal chamber, said chamber abuts against the restraining structure thereby to limit the lateral movement of the linear positioning member when bearing against a plurality of packages.

51. The apparatus of claim 49, wherein the restraining structure extending through the interior of the linear positioning member at a location other than through the at least one longitudinal chamber thereby to limit the lateral movement of the lateral positioning member when bearing against a plurality of packages.

52. The apparatus of claim 43, wherein the linear positioning member comprises at least two longitudinal chambers wherein one longitudinal chamber is located adjacent one of the two adjacent packages and the other longitudinal chamber is located adjacent the other of the two adjacent packages.

53. The apparatus of claim 43, wherein the linear positioning member comprises at least three longitudinal chambers, wherein a first longitudinal chamber is located adjacent one of the two adjacent packages, a second longitudinal chamber is located adjacent the other of the two adjacent packages and a third longitudinal chamber is located between the first and second longitudinal chambers.

54. The apparatus of claim 43, wherein the linear positioning member comprises a lip that extends between the two adjacent packages of the plurality of packages.

55. The apparatus of claim 43, wherein the linear positioning member comprises a tray coupling assembly for coupling the linear positioning mechanism to the first tray.

56. The apparatus of claim 20, wherein packages of the plurality of packages are arranged in a plurality of rows and the first positioning assembly for holding the plurality of packages in a desired position comprises a linear positioning member positioned along the package receiving surface of the first tray within the volume at a location between two adjacent rows of packages of the plurality of rows, wherein the linear positioning member is coupled to the package receiving section of the first tray and bears against the packages of both of the adjacent rows of the plurality of rows.

57. The apparatus of claim 56, wherein the linear positioning member is positioned along the package receiving section of the first tray within the volume at a location between each pair of neighboring rows of packages of the plurality of rows.

58. The apparatus of claim 20, wherein the plurality of packages are substantially composed of a packaging material comprising an interior layer of paperboard sandwiched between two exterior layers of polymer.

59. The apparatus of claim 20, wherein the first positioning assembly comprises:
  (a) a contoured pad positionable against at least one of the plurality of packages;
  (b) a substantially rigid pad adjacent to the contoured pad; and
  (c) a first plurality of resilient members disposed between the package receiving surface of the first tray and the rigid pad.

60. The apparatus of claim 59, wherein the contoured pad comprises a plurality of divider projections extending between the packages of the plurality to separate the packages of the plurality from one another.

61. The apparatus of claim 59, wherein the rigid pad is generally planar and the first plurality of resilient members are disposed between the first tray and the substantially rigid pad along the perimeter of the rigid pad.

62. The apparatus of claim 20, wherein at least one of the first and second trays comprising at least one intermediate reinforcing structure extending across the tray to increase the load carrying capacity of said at least one of the first and second trays.

63. The apparatus of claim 20, wherein the first positioning system is supported by the first tray to nominally extend into the package receiving volume.

64. An apparatus for substantially retaining the position of a plurality of packages between a first and second tray inside the drum of an agitating retort when the agitation process is applied to the plurality of packages, the apparatus comprising:
  (a) a first positioning system for holding the plurality of packages in a desired position wherein the first positioning system is associated with one or both of the first and second trays;
  (b) the first tray stacked on the second tray;
  (c) a volume is formed between the first and second trays when the first tray is stacked on the second tray;
  (d) wherein the first positioning system is located within the volume, and the plurality of packages are positioned between the first positioning system and one or both of the first and second trays within the volume;
  (e) wherein the first positioning system for holding the plurality of packages in a desired position comprises a linear positioning member positioned along the first tray within the volume, wherein the linear positioning member is coupled to the first tray and positionable against the adjacent packages of the plurality of packages; and
  (f) wherein the first positioning system depends from the first tray and extends into the volume formed between the first and second trays.

* * * * *